US012625348B2

(12) United States Patent (10) Patent No.: US 12,625,348 B2
Chiang et al. (45) Date of Patent: May 12, 2026

(54) OPTICAL LENS, LENS MODULE, AND TERMINAL

(71) Applicant: Huawei Technologies Co., Ltd., Shenzhen (CN)

(72) Inventors: Yita Chiang, Dongguan (CN); Zhantao Li, Xi'an (CN); Rongkai Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 557 days.

(21) Appl. No.: 17/980,787

(22) Filed: Nov. 4, 2022

(65) Prior Publication Data

US 2023/0074379 A1 Mar. 9, 2023

Related U.S. Application Data

(63) Continuation of application No. PCT/CN2021/085857, filed on Apr. 8, 2021.

(30) Foreign Application Priority Data

May 6, 2020 (CN) .......................... 202010380470.0

(51) Int. Cl.
| | |
|---|---|
| *G02B 9/34* | (2006.01) |
| *G02B 9/60* | (2006.01) |
| *G02B 9/62* | (2006.01) |
| *G02B 13/00* | (2006.01) |
| *H04N 23/54* | (2023.01) |
| *H04N 23/67* | (2023.01) |
| *H04N 23/68* | (2023.01) |

(52) U.S. Cl.
CPC ................. *G02B 9/62* (2013.01); *G02B 9/34* (2013.01); *G02B 9/60* (2013.01); *G02B 13/004* (2013.01); *G02B 13/0045* (2013.01); *H04N 23/54* (2023.01); *H04N 23/67* (2023.01); *H04N 23/687* (2023.01)

(58) Field of Classification Search
CPC ................................ G02B 9/34; G02B 13/004
See application file for complete search history.

(56) References Cited

U.S. PATENT DOCUMENTS

| | | | |
|---|---|---|---|
| 4,900,141 | A | 2/1990 | Ohshita |
| 5,233,474 | A | 8/1993 | Hirakawa |

(Continued)

FOREIGN PATENT DOCUMENTS

| | | |
|---|---|---|
| CN | 101408665 A | 4/2009 |
| CN | 101441315 A | 5/2009 |

(Continued)

*Primary Examiner* — Joseph P Martinez
(74) *Attorney, Agent, or Firm* — Conley Rose, P.C.

(57) ABSTRACT

An optical lens includes a first constituent element, a second constituent element, a third constituent element, and a fourth constituent element arranged from an object side to an image side, and each of the constituent elements includes at least one lens element. The optical lens satisfies the following relations: 9.08≤BFL≤11.745; and 0.6≤BFL/TTL≤0.67. In this way, the optical lens can obtain a long back focal length (BFL) and long-focus photographing of the optical lens is implemented. In addition, an axial thickness (TTL1) of a plurality of lenses of the optical lens is small to make a thickness of the terminal including the optical lens to be small.

20 Claims, 24 Drawing Sheets

(56)          References Cited

U.S. PATENT DOCUMENTS

| | | | |
|---|---|---|---|
| 2018/0143408 A1 | 5/2018 | Chae | |
| 2018/0180847 A1 | 6/2018 | Yoo | |
| 2020/0096745 A1* | 3/2020 | Chang ..................... | G03B 5/04 |

FOREIGN PATENT DOCUMENTS

| | | |
|---|---|---|
| CN | 101762864 A | 6/2010 |
| CN | 101988985 A | 3/2011 |
| CN | 102411190 A | 4/2012 |
| CN | 203502654 U | 3/2014 |
| CN | 103852866 A | 6/2014 |
| CN | 103852869 A | 6/2014 |
| CN | 105242384 A | 1/2016 |
| CN | 205485013 U | 8/2016 |
| CN | 106291876 A | 1/2017 |
| CN | 107229112 A | 10/2017 |
| CN | 107894646 A | 4/2018 |
| CN | 109031605 A | 12/2018 |
| CN | 109557646 A | 4/2019 |
| CN | 109633870 A | 4/2019 |
| CN | 110045487 A | 7/2019 |
| CN | 110737071 A | 1/2020 |
| CN | 110989132 A | 4/2020 |
| JP | S357536 B | 6/1960 |
| JP | S5695208 A | 8/1981 |
| JP | S58142309 A | 8/1983 |
| JP | H01130116 A | 5/1989 |
| JP | H02101417 A | 4/1990 |
| JP | H02137812 A | 5/1990 |
| JP | H04230717 A | 8/1992 |
| JP | H06265780 A | 9/1994 |
| JP | H0735973 A | 2/1995 |
| JP | 2000258688 A | 9/2000 |
| JP | 2001318315 A | 11/2001 |
| JP | 2004177435 A | 6/2004 |
| JP | 2008076493 A | 4/2008 |
| KR | 20100023179 A | 3/2010 |
| KR | 20190020421 A | 3/2019 |

* cited by examiner

1000

100

200

OPTICAL LENS, LENS MODULE, AND TERMINAL

CROSS-REFERENCE TO RELATED APPLICATIONS

This is a continuation of International Patent Application No. PCT/CN2021/085857 filed on Apr. 8, 2021, which claims priority to Chinese Patent Application No. 202010380470.0 filed on May 6, 2020. The disclosures of the aforementioned applications are hereby incorporated by reference in their entireties.

TECHNICAL FIELD

Implementations of this disclosure relate to the lens field, and in particular, to an optical lens, a lens module, and a terminal.

BACKGROUND

Terminals are generally equipped with different optical lenses for use in different scenes, so that the terminals are applicable for photographing in various scenes. For example, some terminals are equipped with long-focus lenses for implementing long-focus photographing. However, to achieve a better effect of long-focus photographing, a quantity of lens elements in an optical lens increases and thicknesses of the lens elements also increase. As a result, a thickness of the optical lens increases. The thickness of the optical lens is often a main factor that hinders the terminal from thinning. Therefore, how to reduce the thickness of the optical lens while achieving the long-focus effect of the optical lens has become a hot topic of research.

SUMMARY

Implementations of this disclosure provide an optical lens, a lens module including the optical lens, and a terminal including the lens module, to obtain an optical lens and a lens module with thin lens elements and a thin terminal while achieving a long-focus effect.

According to a first aspect, an optical lens is provided. The optical lens includes a plurality of constituent elements, the plurality of constituent elements include a first constituent element, a second constituent element, a third constituent element, and a fourth constituent element arranged from an object side to an image side, each of the constituent elements includes at least one lens element, the first constituent element has positive refractive power, the second constituent element has negative refractive power, each lens element includes an object side surface facing the object side and an image side surface facing the image side, and the optical lens satisfies the following relations:

$$9.08 \leq BFL \leq 11.745; \text{ and}$$

$$0.6 \leq BFL/TTL \leq 0.67,$$

where the BFL is a back focal length of the optical lens, that is, a distance from a lens element closest to the image side of the optical lens to an image plane of the optical lens, and the TTL is a TTL of the optical lens, that is, a total length from an object side surface of a lens element closest to the object side of the optical lens to the image plane.

It should be noted that in this implementation of this disclosure, using a lens element as a boundary, one side on which a photographed object is located is the object side, and on the lens element, a surface facing the object side may be referred to as an object side surface, and using the lens element as the boundary, one side on which an image obtained after the photographed object is imaged by the lens is the image side, and on the lens element, a surface facing the image side may be referred to as an image side surface.

In this implementation of this disclosure, when the BFL and the TTL of the optical lens satisfy the foregoing relations, the optical lens can have a relatively long BFL. A thickness of the optical lens is affected by an axial thickness (TTL1) of a plurality of lens elements of the optical lens. If the axial thickness of the plurality of lens elements of the optical lens is greater, the thickness of the optical lens is greater. The axial thickness of the plurality of lens elements is an axial distance from the object side surface of the lens element closest to the object side to an image side surface of the lens element closest to the image side in the plurality of lens elements. In other words, the axial thickness of the plurality of lens elements is a difference between the TTL of the optical lens and the BFL of the optical lens. In this disclosure, because the optical lens can have a relatively long BFL, the TTL1 of the plurality of lens elements of the optical lens is relatively small, and further, the optical lens can have a relatively small thickness. Because the thickness of the optical lens is often a main factor that hinders the terminal from thinning, in this disclosure, making the thickness of the optical lens relatively small also enables a terminal including the optical lens to have a relatively small thickness, so that thinning of the terminal including the optical lens is implemented.

In some implementations, a first lens element of the first constituent element has positive refractive power, an object side surface of the first lens element of the first constituent element is convex near an axis, an image side surface of the first lens element of the first constituent element is convex or concave near the axis, and the optical lens satisfies the following relation:

$$0.432 \leq f_{S1}/f \leq 0.689,$$

where the first lens element of the first constituent element is a lens element, in the first constituent element, closest to the object side of the optical lens, $f_{S1}$ is a focal length of the first lens element of the first constituent element, and f is a total focal length of the optical lens.

In this implementation, a range of a ratio of the focal length of the first lens element of the first constituent element to the focal length of the optical lens is specified and indicates a light concentration capability of the first lens element of the first constituent element, so that an amount of incident light in the optical lens can be sufficient and that a good photographing effect is achieved. In addition, in this implementation, when the ratio of the focal length of the first lens element of the first constituent element to the focal length of the optical lens satisfies the foregoing relation, a chromatic aberration of the optical lens can be corrected advantageously, so that the optical lens can obtain better imaging. In this implementation, the ratio of the focal length of the first lens element of the first constituent element to the focal length of the optical lens, specified by the foregoing relation, can facilitate cooperation between the first lens element of the first constituent element and other lens elements, so that the desired optical lens is obtained and that the optical lens has a long BFL and a small thickness.

In some implementations, the first lens element of the first constituent element satisfies the following relations:

$$-0.345 \leq R_{S11}/R_{S12} < 0 \text{ or } 0 < R_{S11}/R_{S12} \leq 0.348; \text{ and}$$

$$0.2 \leq d_{S1}/\Sigma d \leq 0.4,$$

where $R_{S11}$ is a curvature radius of the object side surface of the first lens element of the first constituent element, $R_{S12}$ is a curvature radius of the image side surface of the first lens element of the first constituent element, $d_{S1}$ is an axial thickness of the first lens element of the first constituent element, and $\Sigma d$ is a sum of axial thicknesses of all lens elements in the plurality of constituent elements.

The foregoing relation specifies a ratio of the curvature radius of the object side surface to the curvature radius of the image side surface of the first lens element of the first constituent element and indicates convexity or concavity of the image side surface and the object side surface of the first lens element of the first constituent element, so that the focal length of the first lens element of the first constituent element and the focal length of the optical lens satisfy the foregoing relation. In addition, based on the foregoing specified ratio of the curvature radius of the object side surface to the curvature radius of the image side surface of the first lens element of the first constituent element, a thickness of the first lens element of the first constituent element can be reduced as much as possible, and further, the thickness of the optical lens is reduced. The foregoing relation further specifies that a shape of the lens element can be limited by controlling a ratio of the axial thickness of the first lens element of the first constituent element to the sum of the axial thicknesses of all the lens elements, to ensure an appropriate lens element thickness. In addition, allowing the thickness of the first lens element of the first constituent element to satisfy the foregoing relation enables the focal length of the first lens element of the first constituent element and the focal length of the optical lens to satisfy the foregoing relation.

In some implementations, a first lens element of the second constituent element has negative refractive power, an object side surface of the first lens element of the second constituent element is convex near the axis, an image side surface of the first lens element of the second constituent element is concave near the axis, and the optical lens satisfies the following relation:

$$-7.559 \leq f_{S2}/f \leq -0.494,$$

where the first lens element of the second constituent element is a lens element, in the second constituent element, closest to the object side of the optical lens, $f_{S2}$ is a focal length of the first lens element of the second constituent element, and f is the total focal length of the optical lens.

The foregoing relation specifies a range of a ratio of the focal length of the first lens element of the second constituent element to the focal length of the optical lens and indicates a light concentration capability of the first lens element of the second constituent element. This helps reduce an angle of emergence of light from an aperture stop, so that the optical lens can obtain better imaging. In addition, in this implementation, the ratio of the focal length of the first lens element of the second constituent element to the focal length of the optical lens, specified by the foregoing relation, can facilitate cooperation between the first lens element of the second constituent element and other lens elements, so that the desired optical lens is obtained and that the optical lens has a long BFL and a small thickness.

In some implementations, the optical lens satisfies the following relations:

$$1 < R_{S21}/R_{S22} \leq 3; \text{ and}$$

$$0.1 \leq d_{S2}/\Sigma d \leq 0.2,$$

where $R_{S21}$ is a curvature radius of the object side surface of the first lens element of the second constituent element, $R_{S22}$ is a curvature radius of the image side surface of the first lens element of the second constituent element, $d_{S2}$ is an axial thickness of the first lens element of the second constituent element, and $\Sigma d$ is the sum of the axial thicknesses of all the lens elements in the plurality of constituent elements.

The foregoing relation specifies a ratio of the curvature radius of the object side surface to the curvature radius of the image side surface of the first lens element of the second constituent element and indicates convexity or concavity of the image side surface and the object side surface of the first lens element of the second constituent element, so that the focal length of the first lens element of the second constituent element and the focal length of the optical lens satisfy the foregoing relation. In addition, based on the foregoing specified ratio of the curvature radius of the object side surface to the curvature radius of the image side surface of the first lens element of the second constituent element, a thickness of the first lens element of the second constituent element can be reduced as much as possible, and further, the thickness of the optical lens is reduced. The foregoing relation further specifies that a shape of the lens element can be limited by controlling a ratio of the axial thickness of the first lens element of the second constituent element to the sum of the axial thicknesses of all the lens elements, to ensure an appropriate lens element thickness. In addition, allowing the thickness of the first lens element of the second constituent element to satisfy the foregoing relation enables the focal length of the first lens element of the second constituent element and the focal length of the optical lens to satisfy the foregoing relation.

In some implementations, a first lens element of the third constituent element has positive or negative refractive power, an object side surface of the first lens element of the third constituent element is convex or concave near the axis, an image side surface of the first lens element of the third constituent element is convex near the axis, and the optical lens satisfies the following relation:

$$-15.2 \leq f_{S3}/f \leq 7.3,$$

where the first lens element of the third constituent element is a lens element, in the third constituent element, closest to the object side of the optical lens, $f_{S3}$ is a focal length of the first lens element of the third constituent element, and f is the total focal length of the optical lens.

The foregoing relation specifies a range of a ratio of the focal length of the first lens element of the third constituent element to the focal length of the optical lens and indicates a light concentration capability of the first lens element of the third constituent element. This helps diverge light to a larger image plane, so that the optical lens can capture a larger image plane, thereby improving imaging quality. In this implementation, the ratio of the focal length of the first lens element of the third constituent element to the focal length of the optical lens, specified by the foregoing relation, can facilitate cooperation between the first lens element of the third constituent element and other lens elements, so that the desired optical lens is obtained and that the optical lens has a long BFL and a small thickness.

In some implementations, the optical lens satisfies the following relations:

$$0.66 \le R_{S31}/R_{S32} < 1.0; \text{ and}$$

$$0.1 \le d_{S3}/\Sigma d \le 0.3,$$

where $R_{S31}$ is a curvature radius of the object side surface of the first lens element of the third constituent element, $R_{S32}$ is a curvature radius of the image side surface of the first lens element of the third constituent element, $d_{S3}$ is an axial thickness of the first lens element of the third constituent element, and $\Sigma d$ is the sum of the axial thicknesses of all the lens elements in the plurality of constituent elements.

The foregoing relation specifies a ratio of the curvature radius of the object side surface to the curvature radius of the image side surface of the first lens element of the third constituent element and indicates convexity or concavity of the image side surface and the object side surface of the first lens element of the third constituent element, so that the focal length of the first lens element of the third constituent element and the focal length of the optical lens satisfy the foregoing relation. In addition, based on the foregoing specified ratio of the curvature radius of the object side surface to the curvature radius of the image side surface of the first lens element of the third constituent element, a thickness of the first lens element of the third constituent element can be reduced as much as possible, and further, the thickness of the optical lens is reduced. The foregoing relation further specifies that a shape of the first lens element of the third constituent element can be limited by controlling a ratio of the axial thickness of the first lens element of the third constituent element to the sum of the axial thicknesses of all the lens elements, to ensure an appropriate lens element thickness. In addition, allowing the thickness of the first lens element of the third constituent element to satisfy the foregoing relation enables the focal length of the first lens element of the third constituent element and the focal length of the optical lens to satisfy the foregoing relation.

In some implementations, a first lens element of the fourth constituent element has positive or negative refractive power, an object side surface of the first lens element of the fourth constituent element is convex or concave near the axis, an image side surface of the first lens element of the fourth constituent element is convex or concave near the axis, and the optical lens satisfies the following relation:

$$-28 \le f_{S4}/f \le 8,$$

where the first lens element of the fourth constituent element is a lens element, in the fourth constituent element, closest to the object side of the optical lens, $f_{S4}$ is a focal length of the first lens element of the fourth constituent element, and f is the total focal length of the optical lens.

The foregoing relation specifies a range of a ratio of the focal length of the first lens element of the fourth constituent element to the focal length of the optical lens and indicates a light concentration capability of the first lens element of the fourth constituent element. This helps correct a field curvature and astigmatism of an optical system, so that the optical lens can obtain better imaging. In addition, in this implementation, the ratio of the focal length of the first lens element of the fourth constituent element to the focal length of the optical lens, specified by the foregoing relation, can facilitate cooperation between the first lens element of the fourth constituent element and other lens elements, so that the desired optical lens is obtained and that the optical lens has a long BFL and a small thickness.

In some implementations, the first lens element of the fourth constituent element satisfies the following relations:

$$0.9 \le R_{S41}/R_{S42} \le 1.8; \text{ and}$$

$$0.1 \le d_{S4}/\Sigma d \le 0.2,$$

where $R_{S41}$ is a curvature radius of the object side surface of the first lens element of the fourth constituent element, $R_{S42}$ is a curvature radius of the image side surface of the first lens element of the fourth constituent element, $d_{S4}$ is an axial thickness of the first lens element of the fourth constituent element, and $\Sigma d$ is the sum of the axial thicknesses of all the lens elements in the plurality of constituent elements.

The foregoing relation specifies a ratio of the curvature radius of the object side surface to the curvature radius of the image side surface of the first lens element of the fourth constituent element and indicates convexity or concavity of the image side surface and the object side surface of the first lens element of the fourth constituent element, so that the focal length of the first lens element of the fourth constituent element and the focal length of the optical lens satisfy the foregoing relation. In addition, based on the foregoing specified ratio of the curvature radius of the object side surface to the curvature radius of the image side surface of the first lens element of the fourth constituent element, a thickness of the first lens element of the fourth constituent element can be reduced as much as possible, and further, the thickness of the optical lens is reduced. The foregoing relation further specifies that a shape of the lens element can be limited by controlling a ratio of the axial thickness of the first lens element of the fourth constituent element to the sum of the axial thicknesses of all the lens elements, to ensure an appropriate lens element thickness. In addition, allowing the thickness of the first lens element of the fourth constituent element to satisfy the foregoing relation enables the focal length of the first lens element of the fourth constituent element and the focal length of the optical lens to satisfy the foregoing relation.

In some implementations, the optical lens satisfies the following relations:

$$20.9 \le v_{S1} - v_{S2} \le 36.8;$$

$$-2.7 \le v_{S1} - v_{S3} \le 33.7; \text{ and}$$

$$-2.7 \le v_{S1} - v_{S4} \le 27.2,$$

Where $v_{S1}$ is an Abbe number of the first lens element of the first constituent element, $v_{S2}$ is an Abbe number of the first lens element of the second constituent element, $v_{S3}$ is an Abbe number of the first lens element of the third constituent element, and $v_{S4}$ is an Abbe number of the first lens element of the fourth constituent element.

In this disclosure, because Abbe numbers of lens elements of different constituent elements are different, the lens elements of the constituent elements have different refractive indices, and each lens element can achieve a desired optical effect. Ranges of differences between Abbe numbers of lens elements, specified by the foregoing relations, enable cooperation between the lens elements, so that the desired optical lens is obtained and that the optical lens can have a better imaging effect.

In some implementations, a refractive index n1 of the first lens element of the first constituent element satisfies: $1.5 \le n1 \le 1.9$.

The first lens element of the first constituent element is closer to the object side of the optical lens than any other lens element. Because a lens element closer to the object side undertakes heavier optical path adjustment work, the lens element closer to the object side is more important for adjusting the optical effect. The foregoing relation specifies that the refractive index of the first lens element can be selected within a relatively wide range. Therefore, a thinner lens element with better performance is obtained more easily, and the optical lens can have a better imaging effect. This also helps reduce the axial thickness of the plurality of lens elements of the optical lens.

In some implementations, the optical lens satisfies the following relation:

$$0.69 \leq TTL1/MIC \leq 0.76,$$

where the TTL1 is an axial thickness of the plurality of lens elements of the optical lens, and the MIC is a maximum image circle diameter of the optical lens.

A range of a ratio of the axial thickness of the plurality of lens elements of the optical lens to the maximum image circle diameter of the optical lens in this implementation, specified by the foregoing relation, enables the optical lens in this disclosure to have a relatively large image height and achieve a better imaging effect.

In some implementations, at least one of the lens elements is a glass lens element. A majority of ordinary lens elements are plastic lens elements or other composite lens elements. In this implementation, the plurality of lens elements includes at least one glass lens element. A range within which a refractive index of a lens element made of a glass material can be selected is wider than that of a plastic lens element. Therefore, a thinner lens element with better performance is obtained more easily. This helps reduce the axial thickness of the plurality of lens elements of the optical lens, so that thinning of the optical lens is implemented.

According to a second aspect, this disclosure provides a lens module, including a photosensitive element, a driving part, and the foregoing optical lens, where the photosensitive element is located on the image side of the optical lens, and the driving part is configured to drive the optical lens to move close to or away from the photosensitive element.

The lens module in this disclosure includes the optical lens and the photosensitive element, and the optical lens is enabled to move close to or away from the photosensitive element. When the lens module works, the optical lens can be moved away from the photosensitive element, so that the photosensitive element is located on the image plane of the optical lens and that photographing can be performed. When the lens module does not work, the optical lens is moved, and lens elements of the optical lens are moved close to the photosensitive element, that is, at least a part of the plurality of lens elements are located in a back focal position at which the optical lens works. In this case, a thickness of the lens module may be approximately a sum of the thickness of the optical lens and a thickness of the photosensitive element. In comparison with a thickness of an ordinary lens module (the thickness of the ordinary lens module needs to include a thickness of an optical lens, a thickness of a photosensitive element, and a BFL), the thickness of the lens module is greatly reduced and is mainly determined by the thickness of the optical lens. The thickness of the optical lens is mainly determined by TTL1 of the plurality of lens elements of the optical lens. In this disclosure, because TTL1 of the plurality of lens elements is relatively small, the thickness of the lens module is further reduced. In addition, in this disclosure, because the optical lens has a relatively large BFL, the lens module can have a relatively small thickness, and the lens module can achieve an effect of long-focus photographing.

According to a third aspect, this disclosure provides a terminal. The terminal includes an image processor and the lens module, where the image processor is communicatively connected to the lens module, the lens module is configured to obtain image data and input the image data to the image processor, and the image processor is configured to process the image data output to the image processor.

When the lens module is applied to the terminal and the lens module does not work, the optical lens can be moved, and lens elements of the optical lens are moved close to the photosensitive element, that is, at least a part of the plurality of lens elements are located in a back focal position at which the optical lens works. In this case, a thickness of the terminal may be approximately the thickness of the optical lens plus the photosensitive element. Because the thickness of the optical lens in this disclosure is relatively small, the thickness of the terminal can be relatively small. In addition, the lens module in this implementation of this disclosure can achieve an effect of long-focus photographing, so that the terminal in this disclosure can be used in a long-focus photographing scene.

DESCRIPTION OF EMBODIMENTS

Figure 1:
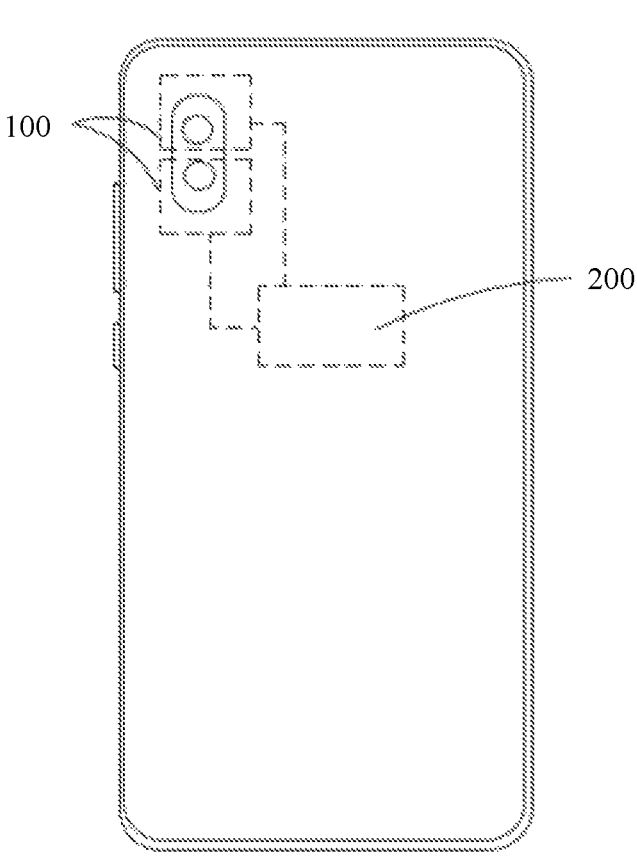
FIG. 1 is a schematic diagram of a structure of a terminal.

The following describes technical solutions of embodiments in this disclosure with reference to accompanying drawings.

For ease of understanding, the following first explains and describes technical terms used in this disclosure.

Focal length: It is a measure of concentration or divergence of light in an optical system. It is a vertical distance from an optical center of a lens element or a lens element group to an image plane when an object at infinity is formed into a clear image on the image plane by using the lens element or the lens element group. A position of an optical center of a fixed focus lens is fixed, but for a zoom lens, a change of an optical center of the lens brings about a change of a focal length of the lens.

Aperture: It is an apparatus configured to control an amount of light passing through a lens and entering a photosensitive surface in a body of a camera. It is usually inside the lens. F/number is used to represent an aperture size.

Aperture F value: It is a relative value (reciprocal of a relative aperture) derived from the focal length of the lens divided by an aperture diameter of the lens. If the aperture F value is smaller, there is more incident light within a unit time. If the aperture F value is larger, a depth of field is smaller, and background content of a photoshoot is blurred. This is similar to an effect of a long-focus lens.

BFL: It is a distance from a lens element closest to an image side of an optical lens to an image plane of the optical lens.

Positive dioptric power: It may also be referred to as positive refractive power, and means that a lens element has a positive focal length and has a light concentration effect.

Negative dioptric power: It may also be referred to as negative refractive power, and means that a lens element has a negative focal length and has a light divergence effect.

TTL: It is a total length from an object side surface of a lens element closest to an object side of the optical lens to the image plane, and is a main factor forming a height of the camera.

Focal ratio F#: It is the focal length divided by an aperture size. From this value, an amount of incident light in the optical system can be known.

Abbe number: It is a dispersion coefficient. It is a ratio of variations of refractive indices of an optical material at different wavelengths, and represents a degree of dispersion of the material.

Field of view (FOV): In an optical instrument, using a lens of the optical instrument as a vertex, an included angle formed by two edges of a maximum range within which a target object can be observed through the lens is referred to as the field of view. A size of the field of view determines a range of vision of the optical instrument. The larger the field of view, the broader the vision, and the smaller the optical magnification.

An optical axis is a line along which light passes through a center of an ideal lens element perpendicularly. When light parallel to an optical axis enters a convex lens element, an ideal convex lens should concentrate all the light at a point behind the lens element. The point at which all the light is concentrated is a focal point.

Object side: Using a lens element as a boundary, one side on which a to-be-imaged object is located is the object side.

Image side: Using the lens element as the boundary, one side on which an image of the to-be-imaged object is located is the image side.

Object side surface: On the lens element, a surface close to the object side is referred to as the object side surface.

Image side surface: On the lens element, a surface close to the image side is referred to as the image side surface.

Using the lens element as the boundary, one side on which the photographed object is located is the object side, and on the lens element, the surface close to the object side may be referred to as the object side surface. Using the lens element as the boundary, one side on which the image of the photographed object is located is the image side, and on the lens element, the surface close to the image side may be referred to as the image side surface.

Axial chromatic aberration: It is also referred to as a longitudinal chromatic aberration, a positional chromatic aberration, or an axial aberration. A beam of light parallel to the optical axis, after passing through the lens, converges at different positions on the optical axis. This aberration is referred to as positional chromatic aberration or axial chromatic aberration. This is because the lens has different imaging positions for light of various wavelengths. As a result, image planes for light of different colors cannot overlap during final imaging, and dispersion is formed by divergence of polychromatic light.

Lateral chromatic aberration: It is also referred to as a chromatic aberration of magnification. A difference in magnification of light of different colors by the optical system is referred to as the chromatic aberration of magnification. A wavelength causes the magnification of the optical system to change, and a size of an image changes accordingly.

Distortion: It is a degree of a distortion of an image formed by the optical system for an object relative to the object itself. Due to adverse impact of a stop spherical aberration, a height at which chief rays of different fields of view intersect with a Gaussian image plane after passing through the optical system is not equal to an ideal image height, and a difference between the two is a distortion. Therefore, the distortion changes only an imaging position of an off-axis object point on the ideal plane, causing a distortion of an image shape, without affecting image definition.

Optical distortion: It is a degree of deformation obtained through calculation in optical theory.

Diffraction limit: It means that when an ideal object point is imaged by the optical system, an ideal image point cannot be obtained due to a diffraction limit, but a Fraunhofer diffraction image is obtained. Because an aperture of an ordinary optical system is circular, the Fraunhofer diffraction image is an airy disc. Therefore, an image of every object point is a disc of confusion, and it is difficult to distinguish between two discs of confusion when the two discs of confusion are close. This limits a resolution of the system. If the disc is larger, the resolution is lower.

TTL1: It is a distance from an intersection point between the axis of the optical lens and an object side surface of a first lens element to an intersection point between the axis of the optical lens and an image side surface of a last lens element.

This disclosure provides a terminal. The terminal may be a mobile phone, a smartphone, a tablet computer, a laptop, a camcorder, a video recorder, a camera, or a device in another form that has a photographing or shooting function. The terminal includes at least one optical lens, and the optical lens includes a long-focus lens, so that the terminal can achieve an effect of long-focus photographing. FIG. 1 is a schematic rear view of a terminal 1000 according to an implementation of this disclosure. In this implementation, the terminal 1000 is a mobile phone. In this implementation of this disclosure, a mobile phone is used as an example of the terminal 1000 for description.

The terminal 1000 includes a lens module 100 and an image processor 200 communicatively connected to the lens module 100. The lens module 100 is configured to obtain image data and input the image data to the image processor 200, so that the image processor 200 processes the image data. The communications connection between the lens module 100 and the image processor 200 may include an electrical connection such as a cable connection for performing data transmission, or may include a coupling or the like for implementing data transmission. It may be understood that the communications connection between the lens module 100 and the image processor 200 may be further implemented in other manners that can implement data transmission.

A function of the image processor 200 is to perform optimization processing on a digital image signal through a series of complex mathematical algorithm operations and finally transmit the processed signal to a display. The image processor 200 may be an image processing chip or a digital signal processing (DSP) chip. A function of the DSP chip is to transfer data obtained by a photosensitive chip to a central processing unit quickly in time and refresh the photosensitive chip. Therefore, quality of the DSP chip directly affects quality of a picture (such as color saturation or definition).

In the implementation shown in FIG. 1, the lens module 100 is disposed on a rear side of the terminal 1000, and is a rear-facing lens of the terminal 1000. It may be understood that in some implementations, the lens module 100 may alternatively be disposed on a front side of the terminal 1000, and is used as a front-facing lens of the terminal 1000. Both the front-facing lens and the rear-facing lens may be used for self-photographing, and may also be used by a photographer to photograph other objects.

In some implementations, there are a plurality of lens modules 100, where "a plurality of" indicates two or more than two. Functions of different lens modules may be different, so that different photographing scenes can be satisfied. For example, in some implementations, the plurality of lens modules includes a long-focus lens module or a wide-angle lens module, to separately implement functions of long-focus photographing and wide-angle photographing. In the implementation shown in FIG. 1, there are two rear-facing lens modules of the terminal 1000, and the two lens modules 100 are respectively an ordinary lens module and a long-focus lens module. The ordinary lens module can be applied to daily common photographing, and the long-focus lens module can be applied to a scene in which long-focus photographing needs to be performed. In some implementations, the plurality of different lens modules 100 may all be communicatively connected to the image processor 200, so that the image processor 200 processes image data obtained by photographing by each lens module 100.

It should be understood that a mounting position of the lens module 100 of the terminal 1000 in the implementation shown in FIG. 1 is only an example. In other implementations, the lens module 100 may alternatively be mounted in other positions of the mobile phone. For example, the lens module 100 may be mounted in a middle of an upper part or an upper right corner on the rear side of the mobile phone. Alternatively, the lens module 100 may not be disposed on a body of the mobile phone, but disposed on a component capable of moving or rotating relative to the mobile phone. For example, the component can extend externally from the body of the mobile phone, retract, or rotate. The mounting position of the lens module 100 is not limited in this disclosure.

Figure 2:
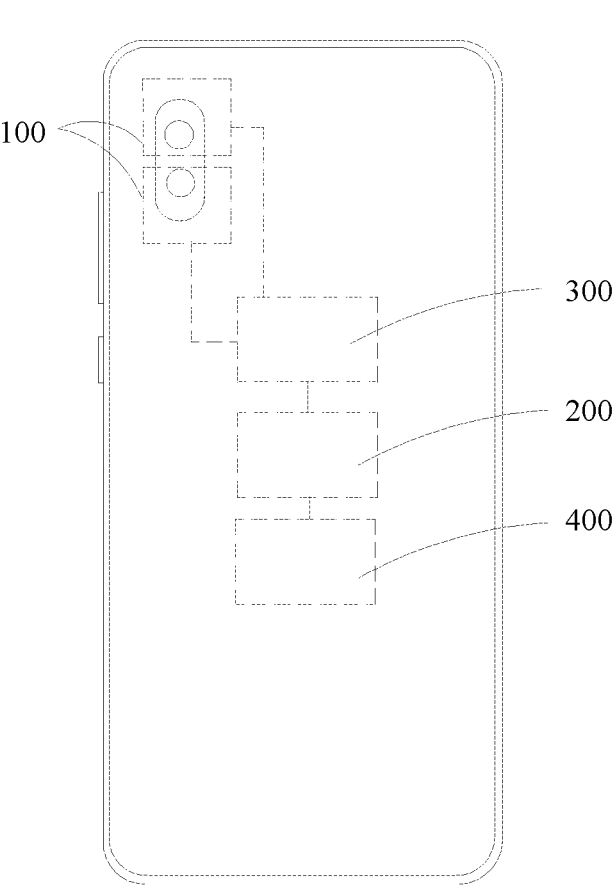
FIG. 2 is a schematic diagram of another structure of a terminal.

Refer to FIG. 2. In some implementations, the terminal 1000 further includes an analog to digital (A/D) converter 300. The analog to digital converter 300 is connected between the lens module 100 and the image processor 200. The analog to digital converter 300 is configured to convert a signal generated by the lens module 100 into a digital image signal and transmit the digital image signal to the image processor 200. Then the digital image signal is processed by the image processor 200, and finally, an image or a picture is displayed by using a display screen or a display.

In some implementations, the terminal 1000 further includes a memory 400. The memory 400 is communicatively connected to the image processor 200. After the image processor 200 processes a digital image signal, the image processor 200 transmits an image to the memory 400, so that when the image needs to be viewed subsequently, the image can be found from the memory at any time and displayed on the display screen. In some implementations, the image processor 200 further compresses the processed digital image signal, and then stores the image in the memory 400, to save space of the memory 400. It should be noted that FIG. 2 is only a schematic diagram of a structure of this implementation of this disclosure, where positions and structures of the lens module 100, the image processor 200, the analog to digital converter 300, the memory 400, and the like are only examples.

Figure 3A:
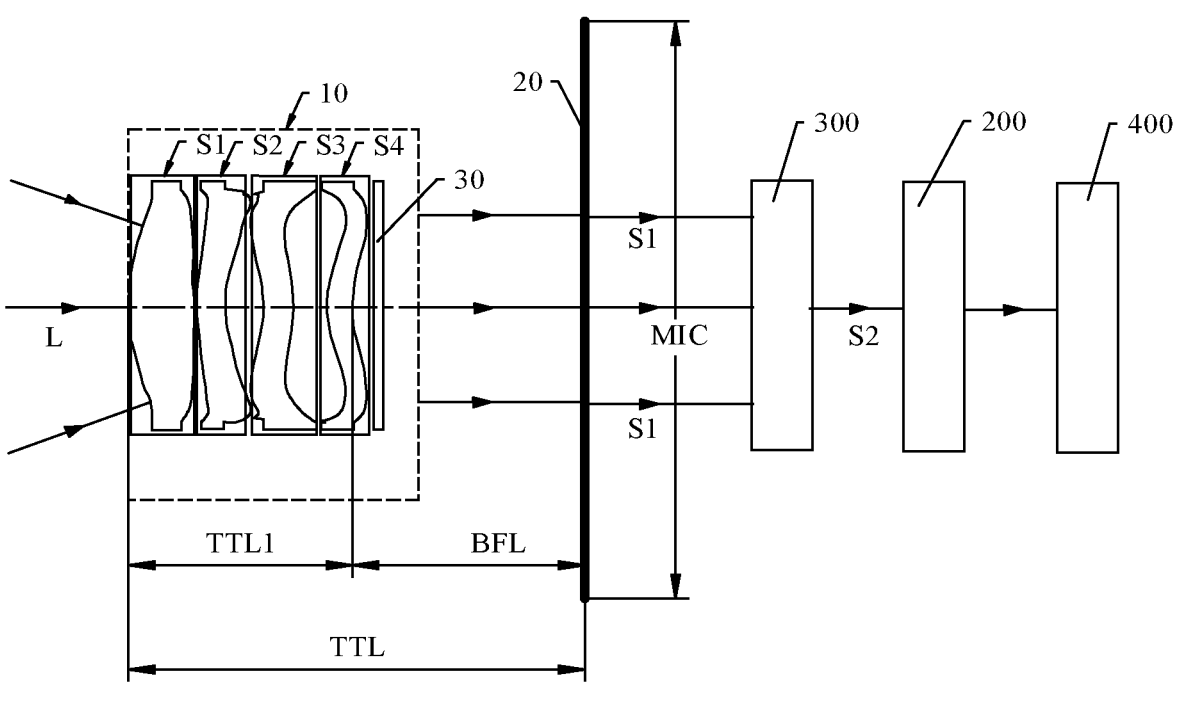
FIG. 3A is a schematic exploded diagram of a lens module according to an implementation of this disclosure.

Refer to FIG. 3A. The lens module 100 includes an optical lens 10 and a photosensitive element 20. The photosensitive element 20 is located on an image side of the optical lens 10, and when the lens module 100 works, a to-be-imaged object is imaged on the photosensitive element 20 through the optical lens 10. Further, an operating principle of the lens module 100 is as follows. Light L reflected by a photographed object passes through the optical lens 10, and an optical image is generated and projected to a surface of the photosensitive element 20. The photosensitive element 20 converts the optical image into an electrical signal, that is, an analog image signal S1, and transmits the analog image signal S1 obtained through conversion to the analog to digital converter 300, so that the analog to digital converter 300 converts the analog image signal S1 into a digital image signal S2 and transmits the digital image signal S2 to the image processor 200.

The photosensitive element 20 is a semiconductor chip, and its surface includes hundreds of thousands to several millions of photodiodes. The photosensitive element 20 generates an electric charge when being illuminated by light, where the electric charge is converted by the analog to digital converter 300 into a digital signal. The photosensitive element 20 may be a charge-coupled device (CCD), or may be a complementary metal-oxide-semiconductor (CMOS). As a CCD, the photosensitive element 20 is made of a semiconductor material with high light sensitivity, and can convert light into an electric charge, where the electric charge is converted by the analog to digital converter 300 into a digital signal. The CCD includes a plurality of photosensitive units, and generally uses a megapixel as a unit. When a surface of the CCD is illuminated by light, each photosensitive unit reflects an electric charge on the constituent element. Signals generated by all the photosensitive units are added together to form a complete picture. The CMOS mainly uses semiconductors made of two elements, silicon and germanium, so that an N-type (negatively charged) semiconductor and a P-type (positively charged) semiconductor coexist on the CMOS. A current generated by the two complementary effects may be recorded and decoded by the processing chip as an image.

The optical lens 10 affects imaging quality and an imaging effect. The optical lens 10 mainly uses a refraction principle of a lens element to perform imaging. To be specific, light from an object passes through the optical lens 10 to form a clear image on an image plane, and the image of the object is recorded by using the photosensitive element 20 located on the image plane. The image plane refers to a plane on which an object is imaged after being imaged by the optical lens 10. The optical lens 10 includes a plurality of constituent elements arranged from an object side to the image side, each constituent element includes at least one lens element, and an image with a better imaging effect is formed through cooperation of the plurality of lens elements in each constituent element. The object side is a side on which the photographed object is located, and the image side is a side on which the image plane is located.

In this disclosure, the optical lens 10 may be a lens with a fixed focal length or a zoom lens. The lens with the fixed focal length means that positions of lens elements in each constituent element are relatively fixed, to ensure that the focal length of the optical lens 10 is fixed. The zoom lens means that lens elements in each constituent element or lens elements between constituent elements are capable of relative movement, and the focal length of the optical lens 10 is changed by moving relative positions of different lens elements.

In some implementations, the optical lens 10 can axially move relative to the photosensitive element 20, so that the optical lens 10 is close to or away from the photosensitive element 20. When the optical lens 10 does not work, that is, when the lens module 100 does not need to shoot an image or a picture, the optical lens 10 can be moved toward the photosensitive element 20, so that the lens elements are close to the image plane, or when the optical lens 10 works, the optical lens 10 is moved away from the photosensitive element 20, so that the photosensitive element 20 is located on the image plane of the optical lens 10 and that photographing can be performed. In the implementation shown in FIG. 1, the optical lens 10 of the long-focus lens module can move relative to the photosensitive element 20. Because the long-focus lens module has a relatively long BFL and a thickness of the optical lens of the long-focus lens module is relatively small, when the long-focus lens module does not need to work, after the optical lens 10 of the long-focus lens module retracts relative to the photosensitive element 20, the optical lens 10 can be substantially accommodated in back focus space in which the optical lens 10 works, so that a thickness of the terminal 1000 including the optical lens 10 is substantially the same as the thickness of the optical lens 10. In comparison with an ordinary terminal whose thickness is determined by a sum of a thickness of an optical lens 10 and a BFL of the optical lens 10 when the optical lens 10 works, the terminal 1000 in this implementation of this disclosure can be thinner, so that thinning of the terminal 1000 is implemented. In addition, in comparison with an ordinary long-focus lens module disposed as a periscope lens module, the optical lens does not need to be provided with a refracting prism or a reflector for changing an optical path, thereby reducing difficulty in a production process, simplifying the structure of the lens module 100, and reducing costs. In addition, space occupied by the lens module can be reduced. Moreover, in this implementation, a direction of the optical path of the lens module 100 is a thickness direction of the terminal 1000, that is, a direction of an optical axis of the lens element of the lens module 100 is the thickness direction of the terminal 1000. Therefore, in comparison with the periscope lens module, there is no need to cut a lens element so that the lens element adapts to the thickness of the terminal. Therefore, a luminous flux in the lens module 100 can be improved, and imaging quality of the lens module 100 can be improved. In addition, in this implementation of this disclosure, because the direction of the optical path of the lens module 100 is the thickness direction of the terminal 1000, a plane on which the photosensitive element 20 is located in the lens module 100 is perpendicular to the thickness direction of the terminal 1000. In comparison with the periscope lens module in which a size of the photosensitive element 20 is relatively small to adapt to the thickness of the terminal because the plane on which the photosensitive element 20 is located is parallel to the thickness direction of the terminal, the size of the photosensitive element 20 of the lens module 100 in this implementation can be larger. Therefore, the lens module 100 can have better imaging quality and can also have a relatively high photographing rate under impact of shaking of the lens module 100.

It may be understood that, when the optical lens 10 is a zoom lens, and the focal length of the optical lens 10 is changed, the optical lens 10 can be moved axially relative to the photosensitive element 20 accordingly to ensure that the optical lens 10 can perform better imaging at any focal length.

Figure 3B:
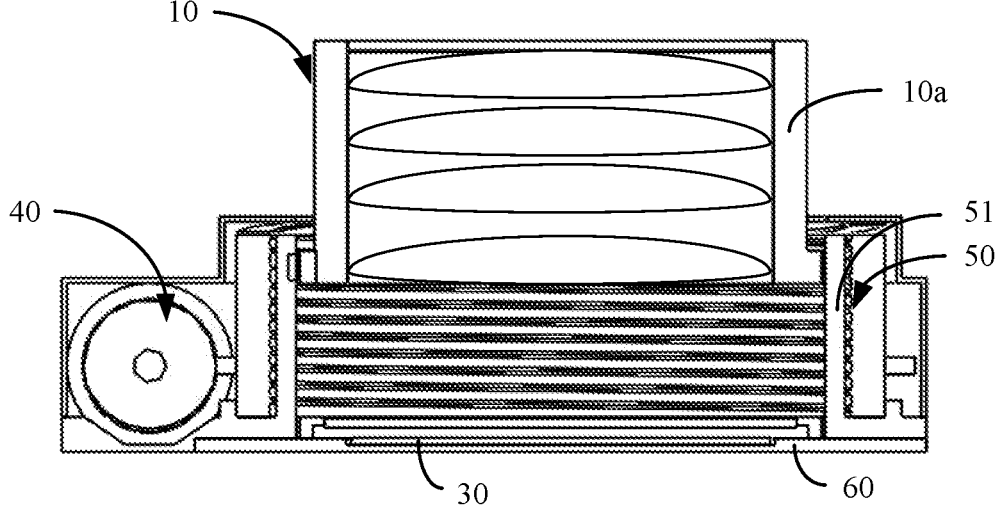
FIG. 3B is a schematic diagram of a structure of a lens module according to an implementation of this disclosure.

Refer to FIG. 3B. In some implementations, the lens module 100 includes a driving part 40. The driving part 40 includes one or more driving members. The driving member of the driving part 40 can be used to drive the optical lens 10 to perform focusing and/or optical image stabilization, and/or the driving part 40 is used to drive the optical lens 10 to axially move relative to the photosensitive element 20. Therefore, when the optical lens 10 is not used, a lens element group can be moved close to the photosensitive element 20, or when the optical lens 10 needs to be used to perform photographing, a lens element group can be moved away from the photosensitive element 20 to a position to perform photographing. When the driving part 40 drives the optical lens 10 to perform focusing, the driving member drives the lens elements of the optical lens 10 to perform relative movement to implement focusing. When the driving part 40 drives the optical element to perform optical image stabilization, the optical lens 10 is driven to move or rotate relative to the photosensitive element 20, and/or the lens elements of the optical lens 10 are driven to move or rotate relative to each other, to implement optical image stabilization. The driving part 40 may be a driving structure such as a motor.

In some implementations, the lens module 100 further includes structures such as a holder 50, an infrared cut-off filter 30, and a line board 60. The optical lens 10 further includes a lens barrel 10a, the lens elements of each constituent element of the optical lens 10 are fixed in the lens barrel 10a, and the lens elements fixed in the lens barrel 10a are coaxially disposed.

The photosensitive element 20 is fixed on the line board 60 in a manner of bonding, surface mounting, or the like. In addition, the analog to digital converter 300, the image processor 200, the memory 400, and so on are also fixed on the line board 60 in a manner of bonding, surface mounting, or the like. Therefore, communications connections between the photosensitive element 20, the analog to digital converter 300, the image processor 200, the memory 400, and so on are implemented by using the line board 60. In some implementations, the holder is fixed on the line board 60. The line board 60 may be a flexible circuit board (FPC) or a printed circuit board (PCB), and is configured to transmit an electrical signal. The FPC may be a single-sided flexible board, a double-sided flexible board, a multi-layer flexible board, a rigid flexible board, a flexible circuit board of a hybrid structure, or the like. Other elements included in the lens module 100 are not described in detail herein.

In some implementations, the infrared cut-off filter 30 may be fixed on the line board 60, and is located between the optical lens 10 and the photosensitive element 20. Light passing through the optical lens 10 illuminates the infrared cut-off filter 30, and is transmitted to the photosensitive element 20 through the infrared cut-off filter 30. The infrared cut-off filter may eliminate unnecessary light projected on the photosensitive element 20, and prevent the photosensitive element 20 from generating a false color or a ripple, to improve an effective resolution and color restoration of the photosensitive element 20. In some implementations, the infrared cut-off filter 30 may alternatively be fixed at one end of the optical lens 10 facing the image side.

In some implementations, the holder 50 is fixed on the line board 60, the optical lens 10, the infrared cut-off filter 30, and the photosensitive element 20 are all accommodated in the holder 50, and the photosensitive element 20, the infrared cut-off filter 30, and the optical lens 10 are stacked in sequence over the line board 60, so that light passing through the optical lens 10 can illuminate the infrared cut-off filter 30 and can be transmitted to the photosensitive element 20 through the infrared cut-off filter 30. The lens barrel 10a of the optical lens 10 is connected to the holder 50 and can move relative to the holder 50, thereby changing a distance between the optical lens 10 and the photosensitive element 20. Further, in some implementations of this disclosure, the holder 50 includes a fixing barrel 51. Inner threads are provided on an inner wall of the fixing barrel 51, and outer threads are provided on an outer wall of the lens barrel 10a. The lens barrel 10a and the fixing barrel 51 are thread-connected. The lens barrel 10a is driven by the driving member of the driving part 40 to rotate, so that the lens barrel 10a moves in an axial direction relative to the fixing barrel 51 and that the lens elements of the optical lens 10 move close to or away from the photosensitive element 20. It may be understood that the lens barrel 10a may alternatively be connected to the holder 50 in another manner and implement movement relative to the holder 50. For example, the lens barrel 10a and the holder 50 are connected by a slide rail. In some implementations, the lens elements of the optical lens 10 are disposed in the lens barrel 10a, and can move relative to the lens barrel 10a, so that different lens elements can move relative to each other to perform focusing.

In this implementation of this disclosure, when the lens module 100 does not work, the lens elements of the optical lens 10 can be moved close to the photosensitive element 20, so that the thickness of the terminal 1000 can be approximately the thickness (that is, a size of the optical lens 10 in the axial direction) of the optical lens 10 plus the thickness of the photosensitive element 20. Therefore, the thickness of the optical lens 10 can be reduced as much as possible to make the terminal 1000 thinner. However, TTL1 of the plurality of lens elements basically determines the thickness of the optical lens 10. Therefore, adjustments can be made to a BFL of the optical lens and TTL1 of the plurality of lens elements of the optical lens to increase BFL and reduce TTL1 of the plurality of lens elements of the optical lens 10, thereby reducing the thickness of the optical lens 10, and finally reducing the thickness of the terminal 1000.

In some implementations of this disclosure, the plurality of constituent elements of the optical lens 10 in this disclosure includes a first constituent element S1, a second constituent element S2, a third constituent element S3, and a fourth constituent element S4, and each of the constituent elements includes at least one lens element. The lens elements in each constituent element are coaxially disposed. Each lens element includes an object side surface facing the object side and an image side surface facing the image side. It may be understood that the lens elements in this disclosure are all lens elements having positive refractive power or negative refractive power, and that when a flat mirror is inserted between the lens elements, the flat mirror is not considered as a lens element of the optical lens 10 in this disclosure. For example, when the first constituent element S1 has a first lens element and a second lens element, and a flat mirror is inserted between the first lens element and the second lens element, the first constituent element S1 cannot be considered as having three lens elements, and the flat mirror is not considered as a third lens element of the first constituent element S1.

In this disclosure, the optical lens 10 satisfies the following relations:

$$9.08 \leq BFL \leq 11.745; \text{ and}$$

$$0.6 \leq BFL/TTL \leq 0.67,$$

where the BFL is the BFL of the optical lens 10, and the TTL is a TTL of the optical lens 10.

In this implementation of this disclosure, when the BFL and the TTL of the optical lens 10 satisfy the foregoing relations, the optical lens 10 can have a relatively long BFL. The thickness of the optical lens 10 is affected by TTL1 of the plurality of lens elements of the optical lens. If the axial thickness of the plurality of lens elements of the optical lens 10 is greater, the thickness of the optical lens 10 is greater. The axial thickness of the plurality of lens elements is an axial distance from an object side surface of a lens element closest to the object side to an image side surface of a lens element closest to the image side in the plurality of lens elements of the optical lens 10. In other words, the axial thickness of the plurality of lens elements is a difference between the TTL of the optical lens 10 and the BFL of the optical lens. In this disclosure, because the optical lens 10 can have a relatively long BFL, TTL1 of the plurality of lens elements of the optical lens 10 is relatively small, and further, the optical lens 10 can have a relatively small thickness. Because the thickness of the optical lens 10 is often a main factor that hinders the terminal 1000 from thinning, in this disclosure, making the thickness of the optical lens 10 relatively small also enables the terminal 1000 including the optical lens 10 to have a relatively small thickness, so that thinning of the terminal including the optical lens 10 is implemented.

Further, in this implementation, the BFL of the optical lens 10 satisfies 9.08 millimeters (mm)≤BFL≤11.745 mm, and is far greater than a BFL of an ordinary optical lens 10 (generally less than 6 mm). Therefore, the lens module 100 including the optical lens 10 can achieve a better effect of long-focus photographing. The BFL of the optical lens 10 and the TTL of the optical lens 10 satisfy the relation: 0.6≤BFL/TTL≤0.67, that is, a proportion of the BFL of the optical lens 10 to the TTL of the optical lens 10 is relatively high. Therefore, the axial thickness of the plurality of lens elements of the optical lens 10 is relatively small, and the lens thickness of the optical lens 10 can be relatively small, so that the thickness of the terminal including the optical lens 10 is relatively small.

In this disclosure, different constituent elements of the optical lens 10 (including the first constituent element S1, the second constituent element S2, the third constituent element S3, and the fourth constituent element S4) have different optical properties, and the optical lens 10 has a long BFL and a small thickness through cooperation between constituent elements with different optical properties, so that the optical lens 10 has a better imaging effect. In some implementations of this disclosure, the first constituent element S1 has positive refractive power, and is mainly used for light concentration and chromatic aberration correction, so that the optical lens 10 can obtain a better photographing effect, the second constituent element S2 has negative refractive power, and is mainly used to reduce an angle of emergence of light from an aperture stop, so that the optical lens 10 can obtain a larger aperture, the third constituent element S3 has positive refractive power or negative refractive power, and is mainly used to diverge light to a larger image plane, thereby obtaining a larger image height, the fourth constituent element S4 has positive refractive power or negative refractive power, and is mainly used to correct a field curvature and astigmatism of an optical system to obtain better imaging.

In this disclosure, the lens elements in each constituent element have different optical properties. Therefore, the constituent elements can obtain desired optical properties, the constituent elements cooperate with each other so that the optical lens 10 has a long BFL and a small thickness, and the optical lens 10 has a better imaging effect.

In some implementations of this disclosure, a first lens element of the first constituent element S1 has positive refractive power, an object side surface of the first lens element of the first constituent element S1 is convex near an axis, an image side surface of the first lens element of the first constituent element S1 is convex or concave near the axis, and the optical lens 10 satisfies the following relation:

$$0.432 \leq f_{S1}/f \leq 0.689,$$

where the first lens element of the first constituent element S1 is the lens element, in the first constituent element S1, closest to the object side of the optical lens 10, $f_{S1}$ is a focal length of the first lens element of the first constituent element S1, and f is a total focal length of the optical lens 10.

In this implementation, a range of a ratio of the focal length of the first lens element of the first constituent element S1 to the focal length of the optical lens 10 is specified and indicates a light concentration capability of the first lens element of the first constituent element S1, so that an amount of incident light in the optical lens 10 can be sufficient and that a good photographing effect is achieved. In addition, in this implementation, when the ratio of the focal length of the first lens element of the first constituent element S1 to the focal length of the optical lens 10 satisfies the foregoing relation, a chromatic aberration of the optical lens 10 can be corrected advantageously, so that the optical lens 10 can obtain better imaging. In this implementation, the ratio of the focal length of the first lens element of the first constituent element S1 to the focal length of the optical lens 10, specified by the foregoing relation, can facilitate cooperation between the first lens element of the first constituent element S1 and other lens elements, so that the desired optical lens 10 is obtained and that the optical lens 10 has a long BFL and a small thickness.

In some implementations of this disclosure, the optical lens 10 further satisfies the following relations:

$$-0.345 \leq R_{S11}/R_{S12} < 0, \text{ or } 0 < R_{S11}/R_{S12} \leq 0.348; \text{ and}$$

$$0.2 \leq d_{S1}/d \leq 0.4,$$

where $R_{S11}$ is a curvature radius of the object side surface of the first lens element of the first constituent element S1, $R_{S12}$ is a curvature radius of the image side surface of the first lens element of the first constituent element S1, $d_{S1}$ is an axial thickness of the first lens element of the first constituent element S1, and $\Sigma d$ is a sum of axial thicknesses of all lens elements in the plurality of constituent elements.

The foregoing relation specifies a ratio of the curvature radius of the object side surface to the curvature radius of the image side surface of the first lens element of the first constituent element S1 and indicates convexity or concavity of the image side surface and the object side surface of the first lens element of the first constituent element S1, so that the focal length of the first lens element of the first constituent element S1 and the total focal length of the optical lens 10 satisfy the foregoing relation. In addition, based on the foregoing specified ratio of the curvature radius of the object side surface to the curvature radius of the image side surface of the first lens element of the first constituent element S1, a thickness of the first lens element of the first constituent element S1 can be reduced as much as possible, and further, the thickness of the optical lens 10 is reduced. The foregoing relation further specifies that a shape of the lens element can be limited by controlling a ratio of the axial thickness of the first lens element of the first constituent element S1 to the sum of the axial thicknesses of all the lens elements, to ensure an appropriate lens element thickness.

A first lens element of the second constituent element S2 has negative refractive power, an object side surface of the first lens element of the second constituent element S2 is convex near the axis, an image side surface of the first lens element of the second constituent element S2 is concave near the axis, and the optical lens 10 satisfies the following relation:

$$-7.559 \leq f_{S2}/f \leq -0.494,$$

where the first lens element of the second constituent element S2 is the lens element, in the second constituent element S2, closest to the object side of the optical lens 10, $f_{S2}$ is a focal length of the first lens element of the second constituent element S2, and f is the total focal length of the optical lens 10.

The foregoing relation specifies a range of a ratio of the focal length of the first lens element of the second constituent element S2 to the focal length of the optical lens 10 and indicates a light concentration capability of the first lens element of the second constituent element S2. This helps reduce the angle of emergence of light from the aperture stop, so that the optical lens 10 can obtain better imaging. In addition, in this implementation, the ratio of the focal length of the first lens element of the second constituent element S2 to the focal length of the optical lens 10, specified by the foregoing relation, can facilitate cooperation between the first lens element of the second constituent element S2 and other lens elements, so that the desired optical lens 10 is obtained and that the optical lens 10 has a long BFL and a small thickness.

The optical lens 10 further satisfies the following relations:

$$1 < R_{S21}/R_{S22} \leq 3; \text{ and}$$

$$0.1 \leq d_{S2}/\Sigma d \leq 0.2,$$

where $R_{S21}$ is a curvature radius of the object side surface of the first lens element of the second constituent element S2, $R_{S22}$ is a curvature radius of the image side surface of the first lens element of the second constituent element S2, $d_{S2}$ is an axial thickness of the first lens element of the second constituent element S2, and $\Sigma d$ is the sum of the axial thicknesses of all the lens elements in the plurality of constituent elements.

The foregoing relation specifies a ratio of the curvature radius of the object side surface to the curvature radius of the image side surface of the first lens element of the second constituent element S2 and indicates convexity or concavity of the image side surface and the object side surface of the first lens element of the second constituent element S2, so that the focal length of the first lens element of the second constituent element S2 and the focal length of the optical lens 10 satisfy the foregoing relation. In addition, based on the foregoing specified ratio of the curvature radius of the object side surface to the curvature radius of the image side surface of the first lens element of the second constituent element S2, a thickness of the first lens element of the second constituent element S2 can be reduced as much as possible, and further, the thickness of the optical lens 10 is reduced. The foregoing relation further specifies that a shape of the lens element can be limited by controlling a ratio of the axial thickness of the first lens element of the second constituent element S2 to the sum of the axial thicknesses of all the lens elements, to ensure an appropriate lens element thickness. In addition, allowing the thickness of the first lens element of the second constituent element S2 to satisfy the foregoing relation enables the focal length of the first lens element of the second constituent element and the focal length of the optical lens 10 to satisfy the foregoing relation.

A first lens element of the third constituent element S3 has positive or negative refractive power, an object side surface of the first lens element of the third constituent element S3 is convex or concave near the axis, an image side surface of the first lens element of the third constituent element S3 is convex near the axis, and the optical lens 10 satisfies the following relation:

$$-15.2 \leq f_{S3}/f \leq 7.3,$$

where the first lens element of the third constituent element S3 is the lens element, in the third constituent element S3, closest to the object side of the optical lens 10, $f_{S3}$ is a focal length of the first lens element of the third constituent element S3, and f is the total focal length of the optical lens 10.

The foregoing relation specifies a range of a ratio of the focal length of the first lens element of the third constituent element S3 to the focal length of the optical lens 10 and indicates a light concentration capability of the first lens element of the third constituent element S3. This helps diverge light to a larger image plane, so that the optical lens 10 can capture a larger image plane, thereby improving imaging quality. In this implementation, the ratio of the focal length of the first lens element of the third constituent element S3 to the focal length of the optical lens 10, specified by the foregoing relation, can facilitate cooperation between the first lens element of the third constituent element S3 and other lens elements, so that the desired optical lens 10 is obtained and that the optical lens 10 has a long BFL and a small thickness.

In some implementations of this disclosure, the optical lens 10 further satisfies the following relations:

$$0.66 \leq R_{S31}/R_{S32} < 1.0; \text{ and}$$

$$0.1 \leq d_{S3}/\Sigma d \leq 0.3,$$

where $R_{S31}$ is a curvature radius of the object side surface of the first lens element of the third constituent element S3, $R_{S32}$ is a curvature radius of the image side surface of the first lens element of the third constituent element S3, $d_{S3}$ is an axial thickness of the first lens element of the third constituent element S3, and $\Sigma d$ is the sum of the axial thicknesses of all the lens elements in the plurality of constituent elements.

The foregoing relation specifies a ratio of the curvature radius of the object side surface to the curvature radius of the image side surface of the first lens element of the third constituent element S3 and indicates convexity or concavity of the image side surface and the object side surface of the first lens element of the third constituent element S3, so that the focal length of the first lens element of the third constituent element S3 and the focal length of the optical lens 10 satisfy the foregoing relation. In addition, based on the foregoing specified ratio of the curvature radius of the object side surface to the curvature radius of the image side surface of the first lens element of the third constituent element S3, a thickness of the first lens element of the third constituent element S3 can be reduced as much as possible, and further, the thickness of the optical lens 10 is reduced. The foregoing relation further specifies that a shape of the first lens element of the third constituent element S3 can be limited by controlling a ratio of the axial thickness of the first lens element of the third constituent element S3 to the sum of the axial thicknesses of all the lens elements, to ensure an appropriate lens element thickness. In addition, allowing the thickness of the first lens element of the third constituent element S3 to satisfy the foregoing relation enables the focal length of the first lens element of the third constituent element S3 and the focal length of the optical lens 10 to satisfy the foregoing relation.

A first lens element of the fourth constituent element S4 has positive or negative refractive power, an object side surface of the first lens element of the fourth constituent element S4 is convex or concave near the axis, an image side surface of the first lens element of the fourth constituent element S4 is convex or concave near the axis, and the optical lens 10 satisfies the following relation:

$$-28 \leq f_{S4}/f \leq 8,$$

where the first lens element of the fourth constituent element S4 is the lens element, in the fourth constituent element S4, closest to the object side of the optical lens 10, $f_{S4}$ is a focal length of the first lens element of the fourth constituent element S4, and f is the total focal length of the optical lens 10.

The foregoing relation specifies a range of a ratio of the focal length of the first lens element of the fourth constituent element S4 to the focal length of the optical lens 10 and indicates a light concentration capability of the first lens element of the fourth constituent element S4. This helps correct a field curvature and astigmatism of the optical system, so that the optical lens 10 can obtain better imaging. In addition, in this implementation, the ratio of the focal length of the first lens element of the fourth constituent element S4 to the focal length of the optical lens 10, specified by the foregoing relation, can facilitate cooperation between the first lens element of the fourth constituent element S4 and other lens elements, so that the desired optical lens 10 is obtained and that the optical lens 10 has a long BFL and a small thickness.

The optical lens 10 further satisfies the following relations:

$$0.9 \leq R_{S41}/R_{S42} \leq 1.8; \text{ and}$$

$$0.1 \leq d_{S4}/\Sigma d \leq 0.2,$$

where $R_{S11}$ is a curvature radius of the object side surface of the first lens element of the fourth constituent element S4, $R_{S42}$ is a curvature radius of the image side surface of the first lens element of the fourth constituent element S4, $d_{S4}$ is an axial thickness of the first lens element of the fourth constituent element S4, and $\Sigma d$ is the sum of the axial thicknesses of all the lens elements in the plurality of constituent elements.

The foregoing relation specifies a ratio of the curvature radius of the object side surface to the curvature radius of the image side surface of the first lens element of the fourth constituent element S4 and indicates convexity or concavity of the image side surface and the object side surface of the first lens element of the fourth constituent element S4, so that the focal length of the first lens element of the fourth constituent element S4 and the focal length of the optical lens satisfy the foregoing relation. In addition, based on the foregoing specified ratio of the curvature radius of the object side surface to the curvature radius of the image side surface of the first lens element of the fourth constituent element S4, a thickness of the first lens element of the fourth constituent element S4 can be reduced as much as possible, and further, the thickness of the optical lens 10 is reduced. The foregoing relation further specifies that a shape of the lens element can be limited by controlling a ratio of the axial thickness of the first lens element of the fourth constituent element S4 to the sum of the axial thicknesses of all the lens elements, to ensure an appropriate lens element thickness. In addition, allowing the thickness of the first lens element of the fourth constituent element S4 to satisfy the foregoing relation enables the focal length of the first lens element of the fourth constituent element S4 and the focal length of the optical lens 10 to satisfy the foregoing relation.

In some implementations of this disclosure, the first lens element of the first constituent element S1, the first lens element of the second constituent element S2, the first lens element of the third constituent element S3, and the first lens element of the fourth constituent element S4 of the optical lens 10 further satisfy the following relations:

$$20.9 \leq v_{S1} - v_{S2} \leq 36.8;$$

$$-2.7 \leq v_{S1} - v_{S3} \leq 33.7; \text{ and}$$

$$-2.7 \leq v_{S1} - v_{S4} \leq 27.2,$$

where $v_{S1}$ is an Abbe number of the first lens element of the first constituent element S1, $v_{S2}$ is an Abbe number of the first lens element of the second constituent element S2, $v_{S3}$ is an Abbe number of the first lens element of the third constituent element S3, and $v_{S4}$ is an Abbe number of the first lens element of the fourth constituent element S4.

The foregoing relations specify a range of a difference between Abbe numbers of the first lens element of the first constituent element S1 and the first lens element of the second constituent element S2, a range of a difference between Abbe numbers of the first lens element of the first constituent element S1 and the first lens element of the third constituent element S3, and a range of a difference between Abbe numbers of the first lens element of the first constituent element S1 and the first lens element of the fourth constituent element S4. Because Abbe numbers of lens elements of different constituent elements are different, the lens elements of the constituent elements have different refractive indices, and each lens element can achieve a desired optical effect. Ranges of differences between Abbe numbers of lens elements, specified by the foregoing relations, enable cooperation between the lens elements, so that the desired optical lens 10 is obtained and that the optical lens 10 can have a better imaging effect.

In some implementations of this disclosure, each lens element of each constituent element of the optical lens 10 may be made of a plastic material, a glass material, or another composite material. A range within which a refractive index n1 of a lens element made of a glass material can be selected is wider than that of a plastic lens element. Therefore, a thinner lens element with better performance is obtained more easily. This helps reduce the axial thickness TTL1 of the plurality of lens elements of the optical lens 10, so that thinning of the optical lens 10 is implemented.

In some implementations of this disclosure, the first lens element of the first constituent element S1 of the optical lens 10 is made of a glass material, and its refractive index n1 satisfies: $1.5 \leq n1 \leq 1.9$. In this implementation, a range within which the refractive index n1 of the first lens element of the first constituent element S1 can be selected is relatively large. Therefore, a better light concentration effect can be achieved when the thickness of the first lens element of the first constituent element S1 is relatively small. Because a lens element closer to the object side or the image side in the optical lens 10 undertakes heavier optical path adjustment work, the lens element closer to the object side or the image side is more important for adjusting an optical effect. Therefore, in some implementations of this disclosure, a best photographing effect can be achieved by using the first lens element 11 made of a glass material while used lens elements made of glass materials are minimized. It may be understood that the first lens element of the first constituent element S1 may alternatively be made of a plastic material or another composite material.

In some implementations of this disclosure, the optical lens 10 further satisfies: $0.69 \leq TTL1/MIC \leq 0.76$, so that the optical lens 10 in this disclosure can have a relatively large image height and can achieve a better imaging effect. The TTL1 is the axial thickness of the plurality of lens elements, and the MIC is a maximum image circle diameter of the optical lens 10.

In some implementations of this disclosure, the image side surface and the object side surface of each lens element are both aspherical, and the image side surface and the object side surface of each lens element satisfy the following formula:

$$x = \frac{cr^2}{1 + \sqrt{1 - Kc^2 r^2}} + u^4 \sum_{m=0}^{M} a_m Q_m^{con}(u^2)$$

where x is an aspherical sagitta, r is an aspherical radial coordinate, c is a spherical curvature of an aspherical vertex, K is a quadratic surface constant, am is an aspherical coefficient, and $u = r/r_{max}$, where $r_{max}$ is a maximum value of a radial coordinate.

The foregoing relation is used to obtain different aspherical lens elements, so that different lens elements can achieve different optical effects. Therefore, a good photographing effect is achieved through cooperation of various aspherical lens elements.

Based on the relations and ranges provided in some implementations of this disclosure, a configuration mode of the lens elements in each constituent element and a combination of lens elements having specific optical design can enable the optical lens 10 to satisfy requirements for a long BFL and a relatively small thickness of the optical lens and achieve relatively high imaging performance.

The following describes in more detail some specific but nonrestrictive examples of implementations of this disclosure with reference to FIG. 4 to FIG. 43.

Figure 4:
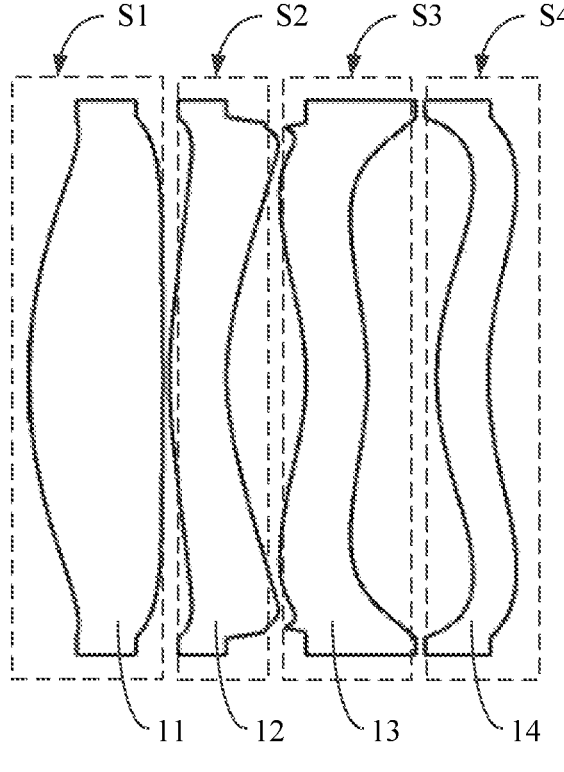
FIG. 4 is a schematic diagram of a partial structure of an optical lens according to a first implementation of this disclosure.

FIG. 4 is a schematic diagram of a structure of an optical lens 10 according to a first implementation of this disclosure. In this implementation, the optical lens 10 includes four constituent elements, which are respectively a first constituent element S1, a second constituent element S2, a third constituent element S3, and a fourth constituent element S4. The first constituent element S1, the second constituent element S2, the third constituent element S3, and the fourth constituent element S4 are disposed in sequence from an object side to an image side. In this implementation, each of the first constituent element S1, the second constituent element S2, the third constituent element S3, and the fourth constituent element S4 includes one lens element, and the lens elements in the constituent elements are coaxially disposed. The first constituent element S1 includes a first lens element 11, and a first lens element of the first constituent element S1 is the first lens element 11, the second constituent element S2 includes a second lens element 12, and a first lens element of the second constituent element S2 is the second lens element 12, the third constituent element S3 includes a third lens element 13, and a first lens element of the third constituent element S3 is the third lens element 13, and the fourth constituent element S4 includes a fourth lens element 14, and a first lens element of the fourth constituent element S4 is the fourth lens element 14.

The first lens element 11 has positive refractive power, an object side surface of the first lens element 11 is convex near an axis, and an image side surface of the first lens element 11 is convex near the axis. The second lens element 12 has negative refractive power, an object side surface of the second lens element 12 is convex near the axis, and an image side surface of the second lens element 12 is concave near the axis. The third lens element 13 has negative refractive power, an object side surface of the third lens element 13 is concave near the axis, and an image side surface of the third lens element 13 is convex near the axis. The fourth lens element 14 has positive refractive power, an object side surface of the fourth lens element 14 is convex near the axis, and an image side surface of the fourth lens element 14 is concave near the axis.

In this implementation, the first lens element 11 is made of a glass material. The second lens element 12, the third lens element 13, and the fourth lens element 14 are all made of plastic materials.

Based on the foregoing relations, design parameters in the first implementation of this disclosure are shown in the following Table 1.

TABLE 1

| Design parameters of the optical lens 10 in the first implementation | | | | | |
|---|---|---|---|---|---|
| BFL | 9.08 | BFL/TTL | 0.6 | TTL1/MIC | 0.72 |
| n1 | 1.69 | $R_{S11}/R_{S12}$ | −0.160 | $R_{S21}/R_{S22}$ | 1.94 |
| v1-v2 | 33.7 | $f_{S1}/f$ | 0.496 | $f_{S2}/f$ | −0.681 |
| v1-v3 | −2.7 | $R_{S31}/R_{S32}$ | 0.811 | $R_{S41}/R_{S42}$ | 0.87 |
| v1-v4 | 27.2 | $f_{S3}/f$ | −3.083 | $f_{S4}/f$ | 2.031 |
| $d_{S1}/(d1 + d2 + d3 + d4)$ | 0.440 | $d_{S2}/(d1 + d2 + d3 + d4)$ | | | 0.188 |
| $d_{S3}/(d1 + d2 + d3 + d4)$ | 0.203 | $d_{S4}/(d1 + d2 + d3 + d4)$ | | | 0.170 |

Meanings of symbols in the table are as follows:

$R_{S11}$: A curvature radius of the object side surface of the first lens element of the first constituent element S1. In this implementation, because the first constituent element S1 includes only the first lens element 11, $R_{S11}$ is the curvature radius of the object side surface of the first lens element 11.

$R_{S12}$: A curvature radius of the image side surface of the first lens element of the first constituent element S1. In this implementation, because the first constituent element S1 includes only the first lens element 11, $R_{S12}$ is the curvature radius of the image side surface of the first lens element 11.

$R_{S21}$: A curvature radius of the object side surface of the first lens element of the second constituent element S2. In this implementation, because the second constituent element S2 includes only the second lens element 12, $R_{S21}$ is the curvature radius of the object side surface of the second lens element 12.

$R_{S22}$: A curvature radius of the image side surface of the first lens element of the second constituent element S2. In this implementation, because the second constituent element S2 includes only the second lens element 12, $R_{S22}$ is the curvature radius of the image side surface of the second lens element 12.

$R_{S31}$: A curvature radius of the object side surface of the first lens element of the third constituent element S3. In this implementation, because the third constituent element S3 includes only the third lens element 13, $R_{S31}$ is the curvature radius of the object side surface of the third lens element 13.

$R_{S32}$: A curvature radius of the image side surface of the first lens element of the third constituent element S3. In this implementation, because the third constituent element S3 includes only the third lens element 13, $R_{S32}$ is the curvature radius of the image side surface of the third lens element 13.

$R_{S41}$: A curvature radius of the object side surface of the first lens element of the fourth constituent element S4. In this implementation, because the fourth constituent element S4 includes only the fourth lens element 14, $R_{S41}$ is the curvature radius of the object side surface of the fourth lens element 14.

$R_{S42}$: A curvature radius of the image side surface of the first lens element of the fourth constituent element S4. In this implementation, because the fourth constituent element S4 includes only the fourth lens element 14, $R_{S42}$ is the curvature radius of the image side surface of the fourth lens element 14.

n1: A refractive index of the first lens element 11.

v1: An Abbe number of the first lens element 11. In this implementation, because the first constituent element S1 includes only the first lens element 11, v1 is the Abbe number $v_{S1}$ of the first lens element of the first constituent element S1.

v2: An Abbe number of the second lens element 12. In this implementation, because the second constituent element S2 includes only the second lens element 12, v2 is the Abbe number $v_{S2}$ of the first lens element of the second constituent element S2.

v3: An Abbe number of the third lens element 13. In this implementation, because the third constituent element S3 includes only the third lens element 13, v3 is the Abbe number $v_{S3}$ of the first lens element of the third constituent element S3.

v4: An Abbe number of the fourth lens element 14. In this implementation, because the fourth constituent element S4 includes only the fourth lens element 14, v4 is the Abbe number $v_{S4}$ of the first lens element of the fourth constituent element S4.

f: A total focal length of the optical lens 10.

$f_{S1}$: A focal length of the first lens element of the first constituent element S1. In this implementation, because the first constituent element S1 includes only the first lens element 11, $f_{S1}$ is the focal length of the first lens element 11.

$f_{S2}$: A focal length of the first lens element of the second constituent element S2. In this implementation, because the second constituent element S2 includes only the second lens element 12, $f_{S2}$ is the focal length of the second lens element 12.

$f_{S3}$: A focal length of the first lens element of the third constituent element S3. In this implementation, because the third constituent element S3 includes only the third lens element 13, $f_{S3}$ is the focal length of the third lens element 13.

$f_{S4}$: A focal length of the first lens element of the fourth constituent element S4. In this implementation, because the fourth constituent element S4 includes only the fourth lens element 14, $f_{S4}$ is the focal length of the fourth lens element 14.

d1: An axial thickness of the first lens element 11.
d2: An axial thickness of the second lens element 12.
d3: An axial thickness of the third lens element 13.
d4: An axial thickness of the fourth lens element 14.

Because the optical lens 10 in this implementation includes only the first lens element 11, the second lens element 12, the third lens element 13, and the fourth lens element 14, a sum of axial thicknesses of all the lens elements in the four constituent elements of the optical lens 10 is 2d=d1+d2+d3+d4.

$d_{S1}$: An axial thickness of the first lens element of the first constituent element S1. In this implementation, because the first constituent element S1 includes only the first lens element 11, $d_{S1}$ is the axial thickness of the first lens element 11.

$d_{S2}$: An axial thickness of the first lens element of the second constituent element S2. In this implementation, because the second constituent element S2 includes only the second lens element 12, $d_{S2}$ is the axial thickness of the second lens element 12.

$d_{S3}$: An axial thickness of the first lens element of the third constituent element S3. In this implementation, because the third constituent element S3 includes only the third lens element 13, $d_{S3}$ is the axial thickness of the third lens element 13.

$d_{S4}$: An axial thickness of the first lens element of the fourth constituent element S4. In this implementation, because the fourth constituent element S4 includes only the fourth lens element 14, $d_{S4}$ is the axial thickness of the fourth lens element 14.

TTL1: An axial thickness of the plurality of lens elements of the optical lens 10, that is, an axial thickness from the object side surface of the lens element closest to the object side, in the first constituent element S1, to the image side surface of the lens element closest to the image side, in the fourth constituent element S4.

MIC: A maximum image circle diameter of the optical lens 10.

It should be noted that meanings of the foregoing symbols are the same in this disclosure, unless otherwise specified. When the symbols appear again subsequently, their meanings are not described again.

Table 2 shows basic parameters of the optical lens 10 in this implementation of this disclosure.

TABLE 2

| Basic parameters of the optical lens 10 in the first implementation | |
| --- | --- |
| Focal length f | 14.642 mm |
| Aperture F value | 2.8 |
| Half FOV | 15° |
| Total track length TTL | 15.13 mm |
| Design wavelength | 650 nm, 610 nm, 555 nm, 510 nm, and 470 nm |

Table 3 shows a curvature radius, a thickness, a refractive index, and an Abbe number of each constituent lens element of the optical lens 10 in the first implementation of this disclosure.

TABLE 3

| Curvature radius, thickness, refractive index, and Abbe number of each constituent lens element of the optical lens 10 in the first implementation | | | | | | | |
| --- | --- | --- | --- | --- | --- | --- | --- |
| | R | | Thickness | | nd | | Vd |
| R1 | 5.8 | d1 | 1.5 | n1 | 1.69 | v1 | 53.2 |
| R2 | −35.9 | a1 | 0.1 | | | | |
| R3 | 5.7 | d2 | 0.7 | n2 | 1.67 | v2 | 19.5 |
| R4 | 2.9 | a2 | 0.9 | | | | |
| R5 | −2.9 | d3 | 0.7 | n3 | 1.54 | v3 | 55.9 |
| R6 | −3.6 | a3 | 0.8 | | | | |
| R7 | 3.4 | d4 | 0.6 | n4 | 1.61 | v4 | 26.0 |
| R8 | 3.9 | a4 | 0.5 | | | | |

Meanings of symbols in the table are as follows:

R1: The curvature radius of the object side surface of the first lens element 11. In this implementation, because the first constituent element S1 includes only the first lens element 11, R1 is the curvature radius $R_{S11}$ of the object side surface of the first lens element of the first constituent element S1.

R2: The curvature radius of the image side surface of the first lens element 11. In this implementation, because the first constituent element S1 includes only the first lens element 11, R2 is the curvature radius $R_{S12}$ of the image side surface of the first lens element of the first constituent element S1.

R3: The curvature radius of the object side surface of the second lens element 12. In this implementation, because the second constituent element S2 includes only the second lens element 12, R3 is the curvature radius $R_{S21}$ of the object side surface of the first lens element of the second constituent element S2.

R4: The curvature radius of the image side surface of the second lens element 12. In this implementation, because the second constituent element S2 includes only the second lens element 12, R4 is the curvature radius $R_{S22}$ of the image side surface of the first lens element of the second constituent element S2.

R5: The curvature radius of the object side surface of the third lens element 13. In this implementation, because the third constituent element S3 includes only the third lens element 13, R5 is the curvature radius $R_{S31}$ of the object side surface of the first lens element of the third constituent element S3.

R6: The curvature radius of the image side surface of the third lens element 13. In this implementation, because the third constituent element S3 includes only the third lens element 13, R6 is the curvature radius $R_{S32}$ of the image side surface of the first lens element of the third constituent element S3.

R7: The curvature radius of the object side surface of the fourth lens element 14. In this implementation, because the fourth constituent element S4 includes only the fourth lens element 14, R7 is the curvature radius $R_{S31}$ of the object side surface of the first lens element of the fourth constituent element S4.

R8: The curvature radius of the image side surface of the fourth lens element 14. In this implementation, because the fourth constituent element S4 includes only the fourth lens element 14, R8 is the curvature radius $R_{S42}$ of the image side surface of the first lens element of the fourth constituent element S4.

a1: An axial distance from the image side surface of the first lens element 11 to the object side surface of the second lens element 12.

a2: An axial distance from the image side surface of the second lens element 12 to the object side surface of the third lens element 13.

a3: An axial distance from the image side surface of the third lens element 13 to the object side surface of the fourth lens element 14.

a4: An axial distance from the image side surface of the fourth lens element 14 to an object side surface of an infrared cut-off filter 30.

n2: A refractive index of the second lens element 12.

n3: A refractive index of the third lens element 13.

n4: A refractive index of the fourth lens element 14.

Except R1, R2, R3, R4, R5, R6, R7, R8, a1, a2, a3, a4, n2, n3, and n4, all symbols in Table 3 are the same as those in Table 1. It should be noted that meanings of the foregoing symbols are the same in this disclosure, unless otherwise specified. When the symbols appear again subsequently, their meanings are not described again.

It should be noted that a positive/negative curvature radius indicates that an optical surface is convex toward the object side or convex toward the image side. When the optical surface (including an object side surface or an image side surface) is convex toward the object side, the curvature radius of the optical surface is a positive value, or when the optical surface (including an object side surface or an image side surface) is convex toward the image side, which means that the optical surface is concave toward the object side, the curvature radius of the optical surface is a negative value.

Table 4 shows aspherical coefficients of the optical lens 10 in this implementation.

TABLE 4

| | | Aspherical coefficients of the optical lens 10 in the first implementation | | | | | | |
|---|---|---|---|---|---|---|---|---|
| | Type | K | A0 | A1 | A2 | A3 | A4 | A5 |
| R1 | Q-type aspherical | 0.00E+00 | −1.07E−01 | −4.11E−02 | −8.13E−03 | −6.24E−04 | −4.44E−04 | −2.73E−05 |
| R2 | Q-type aspherical | 0.00E+00 | 3.56E−02 | −3.43E−02 | −1.06E−03 | −6.14E−05 | 3.13E−04 | −1.20E−04 |
| R3 | Q-type aspherical | 0.00E+00 | −3.69E−01 | 4.78E−02 | −1.39E−02 | 1.56E−03 | 4.40E−04 | −2.91E−04 |
| R4 | Q-type aspherical | 0.00E+00 | −7.47E−01 | 4.77E−02 | −2.16E−02 | 6.12E−03 | 4.28E−05 | −7.29E−04 |
| R5 | Q-type aspherical | 0.00E+00 | 1.06E+00 | −2.83E−02 | 1.68E−02 | 7.23E−03 | −2.02E−03 | −2.06E−04 |
| R6 | Q-type aspherical | 0.00E+00 | 1.06E+00 | −1.26E−02 | 2.47E−02 | 1.94E−03 | −3.99E−03 | 5.42E−04 |
| R7 | Q-type aspherical | 0.00E+00 | −8.71E−01 | −6.11E−02 | 3.81E−03 | −5.05E−03 | −1.80E−03 | 1.43E−05 |
| R8 | Q-type aspherical | 0.00E+00 | −1.19E+00 | −4.47E−02 | −5.83E−03 | −6.10E−03 | −3.61E−04 | 1.07E−03 |

K is a quadratic surface constant, and symbols such as A0, A1, A2, A3, A4, and A5 indicate polynomial factors. It should be noted that the parameters in the table are represented in scientific notation. For example, −1.07E-01 means $-1.07 \times 10^{-1}$, and −4.11E-02 means $-4.11 \times 10^{-2}$. It should be noted that meanings of the symbols such as K, A0, A1, A2, A3, A4, and A5 are the same in this disclosure, unless otherwise specified. When the symbols appear again subsequently, their meanings are not described again.

By substituting the foregoing parameters into the formula:

$$x = \frac{cr^2}{1 + \sqrt{1 - Kc^2r^2}} + u^4 \sum_{m=0}^{M} a_m Q_m^{con}(u^2)$$

the first lens element 11, the second lens element 12, the third lens element 13, and the fourth lens element 14 of the optical lens 10 in this implementation can be designed.

In this implementation, different lens elements of the optical lens 10 obtained by using the foregoing design parameters can implement different functions respectively, so that the optical lens 10 having good imaging quality is obtained through cooperation of the lens elements. Further, in this implementation, the first lens element 11 has a relatively high refractive index, and can properly implement functions of light concentration and chromatic aberration correction. The second lens element 12 can implement a function of reducing an angle of emergence of light from an aperture stop. The third lens element 13 can implement a function of diverging light to a larger image plane. The fourth lens element 14 can implement a function of correcting a field curvature and astigmatism of an optical system. It should be noted that only functions implemented by the lens elements in this implementation are provided herein. Actually, the lens elements can also implement other functions. In addition, only the functions implemented by the lens elements in this implementation are provided herein. In other implementations of this disclosure, lens elements can implement other functions. The functions are not limited herein.

Figure 5:
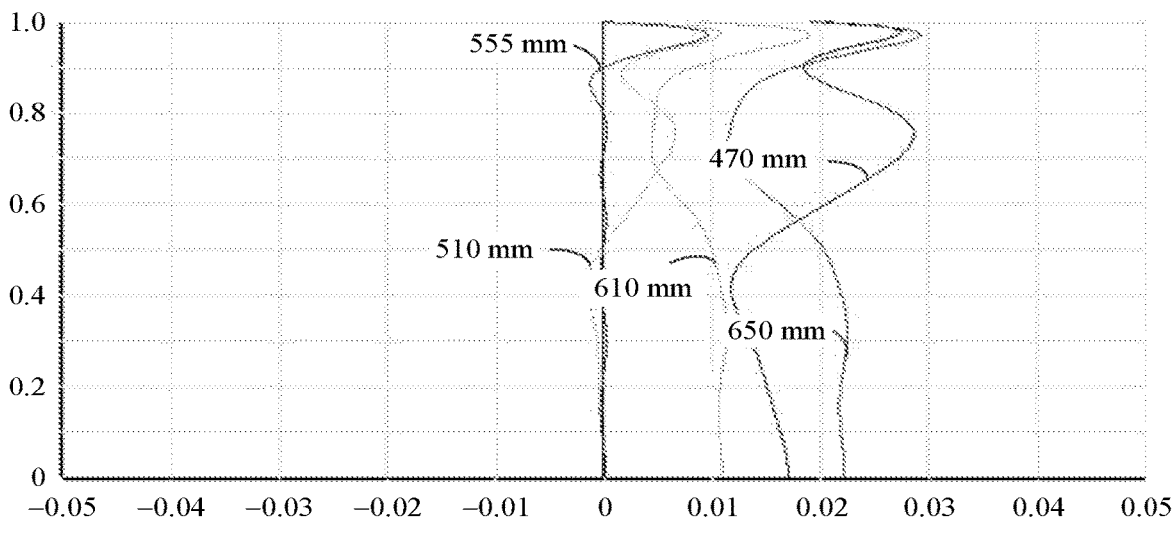
FIG. 5 is a schematic diagram of an axial chromatic aberration of the optical lens according to the first implementation of this disclosure.
Figure 6:
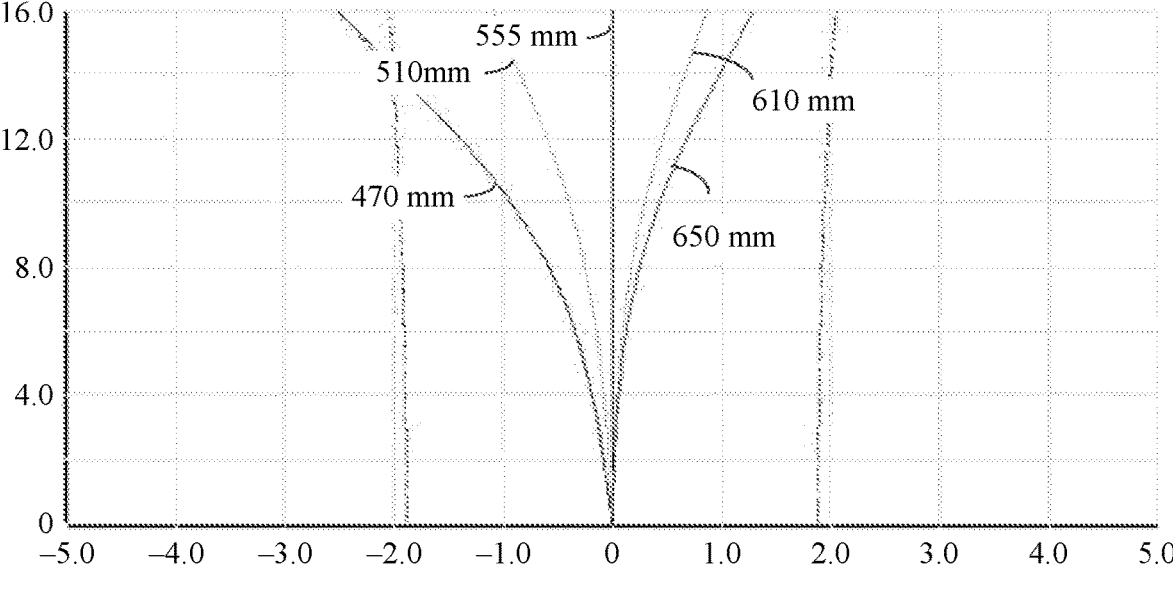
FIG. 6 is a schematic diagram of a lateral chromatic aberration of the optical lens according to the first implementation of this disclosure.
Figure 7:
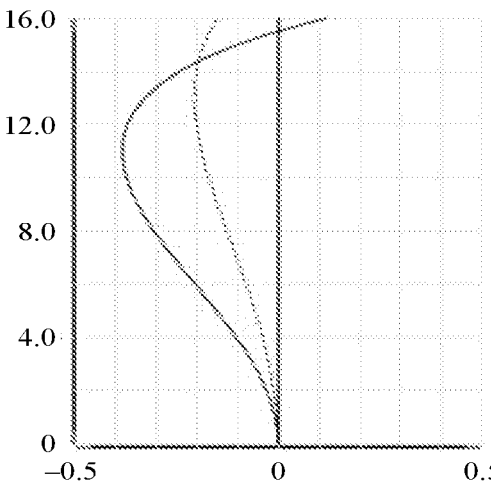
FIG. 7 is a schematic diagram of a field curvature and an optical distortion of the optical lens according to the first implementation of this disclosure.
Figure 7:
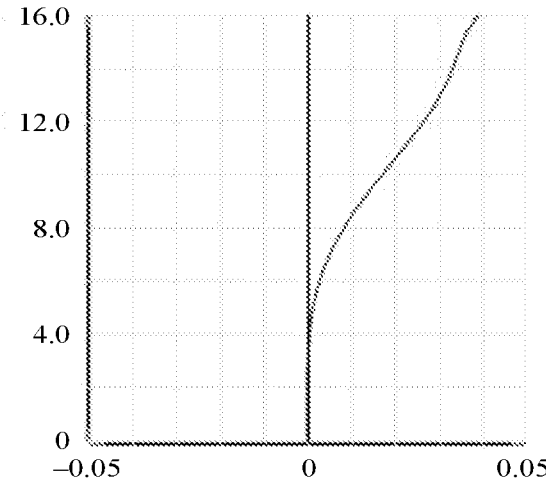

FIG. 5 to FIG. 7 are diagrams for representing optical properties of the optical lens 10 in the first implementation.

Further, FIG. 5 shows an axial aberration after light of wavelengths 650 nm, 610 nm, 555 nm, 510 nm, and 470 nm respectively passes through the optical lens 10 in the first implementation. In FIG. 5, a vertical coordinate represents a normalized pupil coordinate, and a horizontal coordinate represents an axial aberration, in units of milliseconds. As can be seen from FIG. 5, the axial aberration in this implementation is controlled within a very small range.

FIG. 6 shows a lateral chromatic aberration after light of wavelengths 650 nm, 610 nm, 555 nm, 510 nm, and 470 nm respectively passes through the optical lens 10 in the first implementation. In FIG. 6, a vertical coordinate represents a field of view, in units of degrees (°), and a horizontal coordinate represents a diffraction limit range, in units of microns (µm). A dashed line in FIG. 6 represents a diffraction limit range of the optical lens 10. As can be learned from the figure, the lateral chromatic aberration after light of each wavelength passes through the optical lens 10 in the first implementation is basically within the diffraction limit, that is, the lateral chromatic aberration after the light of each wavelength passes through the optical lens 10 in the first implementation basically does not affect imaging quality of the optical lens 10.

FIG. 7 is a schematic diagram of a field curvature and an optical distortion after light of the wavelength 555 nm passes through the optical lens 10 in the first implementation, used to indicate a difference between imaging deformation and an ideal shape after the light passes through the optical lens 10. In a left drawing in FIG. 7, a solid line is a schematic diagram of a field curvature in a meridional direction after the light of the wavelength 555 nm passes through the optical lens 10, and a dashed line is a schematic diagram of a field curvature in a sagittal direction after the light of the wavelength 555 nm passes through the optical lens 10. A right drawing in FIG. 7 is a schematic diagram of an optical distortion after the light of the wavelength 555 nm passes through the optical lens 10 in the first implementation. As can be seen from the figure, in this implementation, the optical system controls the distortion within a range recognizable by unaided eyes (2% and below unrecognizable by unaided eyes).

The BFL of the optical lens 10 provided in this implementation is 9.08 mm, and the TTL is 15.13 mm. In this case, the TTL1 is 6.05 mm. In this case, a thickness of a terminal 1000 may be slightly greater than 6.05 mm, that is, the terminal 1000 has a relatively small thickness while having good imaging quality.

Figure 8:
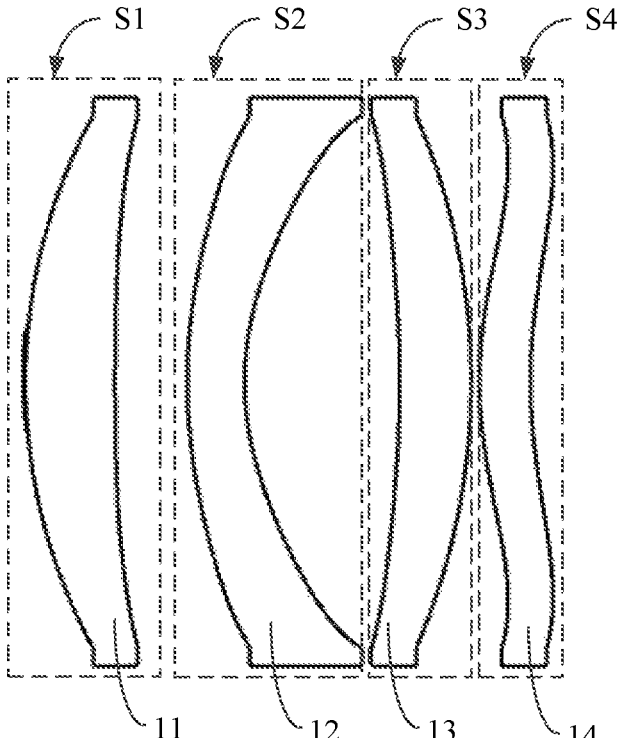
FIG. 8 is a schematic diagram of a partial structure of an optical lens according to a second implementation of this disclosure.

FIG. 8 shows an optical lens 10 according to a second implementation of this disclosure. In this implementation, the optical lens 10 includes four constituent elements, which are respectively a first constituent element S1, a second constituent element S2, a third constituent element S3, and a fourth constituent element S4. The first constituent element S1, the second constituent element S2, the third constituent element S3, and the fourth constituent element S4 are disposed in sequence from an object side to an image side. In this implementation, each of the first constituent element S1, the second constituent element S2, the third constituent element S3, and the fourth constituent element S4 includes one lens element. The first constituent element S1 includes a first lens element 11, the second constituent element S2 includes a second lens element 12, the third constituent element S3 includes a third lens element 13, and the fourth constituent element S4 includes a fourth lens element 14. The lens elements are coaxially disposed.

The first lens element 11 has positive refractive power, an object side surface of the first lens element 11 is convex near an axis, and an image side surface of the first lens element 11 is convex near the axis. The second lens element 12 has negative refractive power, an object side surface of the second lens element 12 is convex near the axis, and an image side surface of the second lens element 12 is concave near the axis. The third lens element 13 has positive refractive power, an object side surface of the third lens element 13 is concave near the axis, and an image side surface of the third lens element 13 is convex near the axis. The fourth lens element 14 has positive refractive power, an object side surface of the fourth lens element 14 is convex near the axis, and an image side surface of the fourth lens element 14 is concave near the axis.

In this implementation, the first lens element 11 is made of a glass material. The second lens element 12, the third lens element 13, and the fourth lens element 14 are all made of plastic materials.

Based on the foregoing relations, design parameters in the second implementation of this disclosure are shown in the following Table 5. For meanings of the parameters, refer to related descriptions in the first implementation.

TABLE 5

| Design parameters of the optical lens 10 in the second implementation | | | | | |
|---|---|---|---|---|---|
| BFL | 9.63 | BFL/TTL | 0.60 | TTL1/MIC | 0.76 |
| n1 | 1.69 | $R_{S11}/R_{S12}$ | −0.161 | $R_{S21}/R_{S22}$ | 1.90 |

TABLE 5-continued

| Design parameters of the optical lens 10 in the second implementation | | | | | |
|---|---|---|---|---|---|
| v1-v2 | 33.7 | $f_{S1}/f$ | 0.733 | $f_{S2}/f$ | −0.750 |
| v1-v3 | −2.7 | $R_{S31}/R_{S32}$ | 1.618 | $R_{S41}/R_{S42}$ | 0.80 |
| v1-v4 | 27.2 | $f_{S3}/f$ | 2.35 | $f_{S4}/f$ | 2.199 |
| $d_{S1}/(d1 + d2 + d3 + d4)$ | 0.332 | $d_{S2}/(d1 + d2 + d3 + d4)$ | 0.213 | | |
| $d_{S3}/(d1 + d2 + d3 + d4)$ | 0.265 | $d_{S4}/(d1 + d2 + d3 + d4)$ | 0.190 | | |

Table 6 shows basic parameters of the optical lens 10 in the second implementation of this disclosure. For meanings of the parameters in the table, refer to related descriptions in the first implementation.

TABLE 6

| Basic parameters of the optical lens 10 in the second implementation | |
|---|---|
| Focal length f | 14.650 mm |
| Aperture F value | 2.8 |
| Half FOV | 15° |
| Total track length TTL | 15.99 mm |
| Design wavelength | 650 nm, 610 nm, 555 nm, 510 nm, and 470 nm |

Table 7 shows a curvature radius, a thickness, a refractive index, and an Abbe number of each constituent lens element of the optical lens 100 in the second implementation of this disclosure. For meanings of the symbols in the table, refer to related descriptions in the first implementation.

TABLE 7

| Curvature radius, thickness, refractive index, and Abbe number of each constituent lens element of the optical lens 10 in the second implementation | | | | | | | |
|---|---|---|---|---|---|---|---|
| | R | | Thickness | | nd | | Vd |
| R1 | 6.3 | d1 | 1.0 | n1 | 1.69 | v1 | 53.2 |
| R2 | 39.3 | a1 | 0.8 | | | | |
| R3 | 6.1 | d2 | 0.6 | n2 | 1.67 | v2 | 19.5 |
| R4 | 3.2 | a2 | 1.7 | | | | |
| R5 | −12.3 | d3 | 0.8 | n3 | 1.54 | v3 | 55.9 |
| R6 | −7.6 | a3 | 0.1 | | | | |
| R7 | 4.7 | d4 | 0.6 | n4 | 1.61 | v4 | 26.0 |
| R8 | 5.8 | a4 | 0.5 | | | | |

Table 8 shows aspherical coefficients of the optical lens 10 in this implementation. For meanings of the parameters in the table, refer to related descriptions in the first implementation.

TABLE 8

| | Type | K | A0 | A1 | A2 | A3 | A4 | A5 |
|---|---|---|---|---|---|---|---|---|
| R1 | Q-type aspherical | 0.00E+00 | −1.49E+91 | 5.97E+91 | −1.45E+90 | 8.53E+90 | 7.32E+90 | −2.82E+90 |
| R2 | Q-type aspherical | 0.00E+00 | 1.16E−02 | −2.76E−04 | 6.91E−06 | −7.61E−08 | 6.51E−08 | −3.56E−09 |
| R3 | Q-type aspherical | 0.00E+00 | −1.39E−02 | 5.65E−06 | 1.61E−05 | 1.47E−06 | 1.58E−07 | −1.59E−08 |
| R4 | Q-type aspherical | 0.00E+00 | −5.77E+33 | 9.26E+32 | −1.80E+32 | 7.99E+31 | −2.78E+31 | 2.04E+31 |
| R5 | Q-type aspherical | 0.00E+00 | −1.07E+02 | 1.10E+01 | 3.95E+00 | −2.93E+00 | 2.91E−02 | −6.76E−01 |
| R6 | Q-type aspherical | 0.00E+00 | −2.52E+305 | 5.70E+304 | −4.58E+305 | −1.02E+306 | 3.47E+304 | −3.03E+303 |
| R7 | Q-type aspherical | 0.00E+00 | −1.57E+29 | 3.03E+28 | −5.69E+27 | 2.15E+27 | −1.08E+27 | 5.71E+26 |

TABLE 8-continued

| Aspherical coefficients of the optical lens 10 in the second implementation | | | | | | | |
|---|---|---|---|---|---|---|---|
| Type | K | A0 | A1 | A2 | A3 | A4 | A5 |
| R8 Q-type aspherical | 0.00E+00 | −3.36E+52 | 6.52E+51 | −1.17E+51 | 5.31E+50 | −1.49E+50 | 8.91E+49 |

By substituting the foregoing parameters into the formula:

$$x = \frac{cr^2}{1 + \sqrt{1 - Kc^2r^2}} + u^4 \sum_{m=0}^{M} a_m Q_m^{con}(u^2)$$

the first lens element 11, the second lens element 12, the third lens element 13, and the fourth lens element 14 of the optical lens 10 in this implementation can be designed.

In this implementation, different lens elements of the optical lens 10 obtained by using the foregoing design parameters can implement different functions respectively, so that the optical lens 10 having good imaging quality is obtained through cooperation of the lens elements. Further, in this implementation, the first lens element 11 has a relatively high refractive index, and can properly implement functions of light concentration and chromatic aberration correction. The second lens element 12 can implement a function of reducing an angle of emergence of light from an aperture stop. The third lens element 13 can implement a function of diverging light to a larger image plane. The fourth lens element 14 can implement a function of correcting a field curvature and astigmatism of an optical system. It should be noted that only functions implemented by the lens elements in this implementation are provided herein. Actually, the lens elements can also implement other functions. In addition, only the functions implemented by the lens elements in this implementation are provided herein. In other implementations of this disclosure, lens elements can implement other functions. The functions are not limited herein.

Figure 9:
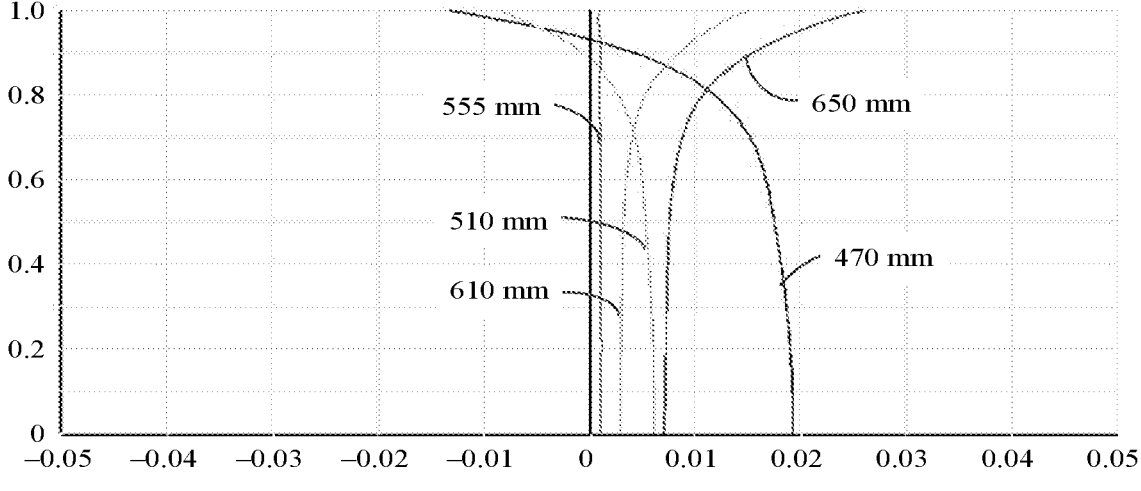
FIG. 9 is a schematic diagram of an axial chromatic aberration of the optical lens according to the second implementation of this disclosure.
Figure 10:
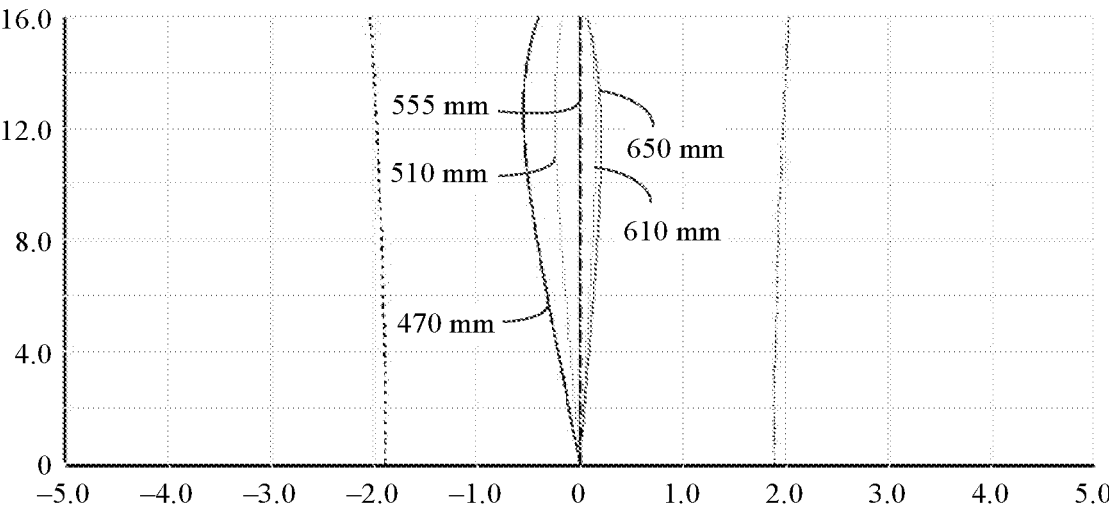
FIG. 10 is a schematic diagram of a lateral chromatic aberration of the optical lens according to the second implementation of this disclosure.
Figure 11:
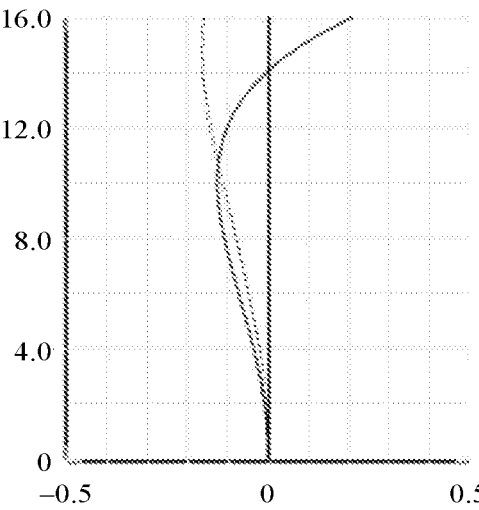
FIG. 11 is a schematic diagram of a field curvature and an optical distortion of the optical lens according to the second implementation of this disclosure.
Figure 11:
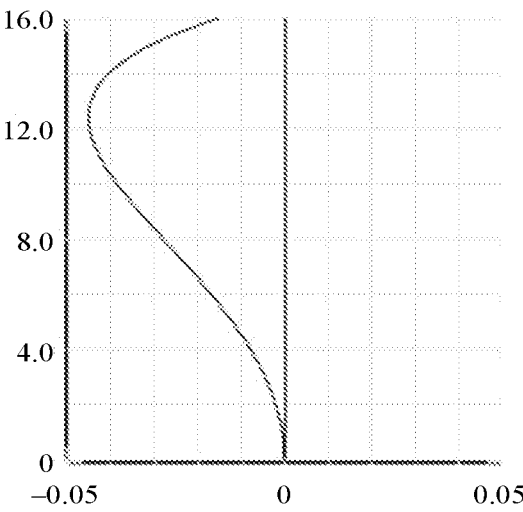

FIG. 9 to FIG. 11 are diagrams for representing optical properties of the optical lens 10 in the second implementation.

Further, FIG. 9 shows an axial aberration after light of wavelengths 650 nm, 610 nm, 555 nm, 510 nm, and 470 nm respectively passes through the optical lens 10 in the second implementation. In FIG. 9, a vertical coordinate represents a normalized pupil coordinate, and a horizontal coordinate represents an axial aberration, in units of milliseconds. As can be seen from FIG. 9, the axial aberration in this implementation is controlled within a very small range.

FIG. 10 shows a lateral chromatic aberration after light of wavelengths 650 nm, 610 nm, 555 nm, 510 nm, and 470 nm respectively passes through the optical lens 10 in the second implementation. In FIG. 10, a vertical coordinate represents a field of view, in units of degrees (°), and a horizontal coordinate represents a diffraction limit range, in units of μm. A dashed line in FIG. 10 represents a diffraction limit range of the optical lens 10. As can be learned from the figure, the lateral chromatic aberration after light of each wavelength passes through the optical lens 10 in the second implementation is within the diffraction limit, that is, the lateral chromatic aberration after the light of each wavelength passes through the optical lens 10 in the second implementation basically does not affect imaging quality of the optical lens 10.

FIG. 11 is a schematic diagram of a field curvature and an optical distortion after light of the wavelength 555 nm passes through the optical lens 10 in the second implementation, used to indicate a difference between imaging deformation and an ideal shape after the light passes through the optical lens 10. In a left drawing in FIG. 11, a solid line is a schematic diagram of a field curvature in a meridional direction after the light of the wavelength 555 nm passes through the optical lens 10, and a dashed line is a schematic diagram of a field curvature in a sagittal direction after the light of the wavelength 555 nm passes through the optical lens 10. A right drawing in FIG. 11 is a schematic diagram of an optical distortion after the light of the wavelength 555 nm passes through the optical lens 10 in the second implementation. As can be seen from the figure, in this implementation, the optical system controls the distortion within a range recognizable by unaided eyes (2% and below unrecognizable by unaided eyes), that is, the optical lens elements can achieve a high-quality imaging effect.

The BFL of the optical lens 10 provided in this implementation is 9.63 mm, and the TTL is 16.05 mm. In this case, the TTL1 is 6.42 mm. In this case, a thickness of a terminal 1000 may be slightly greater than 6.42 mm, that is, the terminal 1000 has a relatively small thickness while having good imaging quality.

Figure 12:
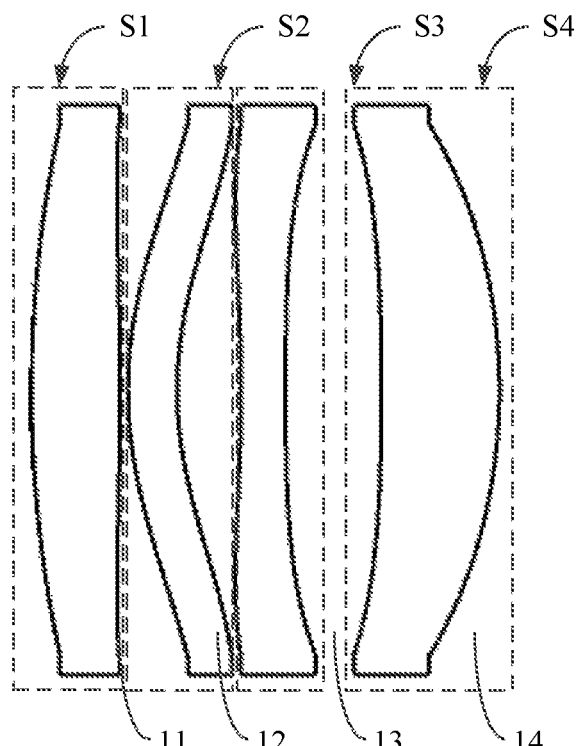
FIG. 12 is a schematic diagram of a partial structure of an optical lens according to a third implementation of this disclosure.

FIG. 12 shows an optical lens 10 according to a third implementation of this disclosure. In this implementation, the optical lens 10 includes four constituent elements, which are respectively a first constituent element S1, a second constituent element S2, a third constituent element S3, and a fourth constituent element S4. The first constituent element S1, the second constituent element S2, the third constituent element S3, and the fourth constituent element S4 are disposed in sequence from an object side to an image side. In this implementation, each of the first constituent element S1, the second constituent element S2, the third constituent element S3, and the fourth constituent element S4 includes one lens element. The first constituent element S1 includes a first lens element 11, the second constituent element S2 includes a second lens element 12, the third constituent element S3 includes a third lens element 13, and the fourth constituent element S4 includes a fourth lens element 14. The lens elements are coaxially disposed.

The first lens element 11 has positive refractive power, an object side surface of the first lens element 11 is convex near an axis, and an image side surface of the first lens element 11 is convex near the axis. The second lens element 12 has negative refractive power, an object side surface of the second lens element 12 is convex near the axis, and an image side surface of the second lens element 12 is concave near the axis. The third lens element 13 has negative refractive power, an object side surface of the third lens element 13 is concave near the axis, and an image side surface of the third lens element 13 is concave near the axis. The fourth lens element 14 has positive refractive power, an object side surface of the fourth lens element 14 is concave near the axis, and an image side surface of the fourth lens element 14 is convex near the axis.

In this implementation, the first lens element 11 is made of a glass material. The second lens element 12, the third lens element 13, and the fourth lens element 14 are all made of plastic materials.

Based on the foregoing relations, design parameters of the optical lens 10 in the third implementation of this disclosure are shown in the following Table 9. For meanings of the parameters, refer to related descriptions in the first implementation.

TABLE 9

Design parameters of the optical lens 10 in the third implementation

| BFL | 11.745 | $BFL/TTL$ | 0.67 | $TTL1/MIC$ | 0.69 |
|---|---|---|---|---|---|
| n1 | 1.69 | $R_{S11}/R_{S12}$ | −0.322 | $R_{S21}/R_{S22}$ | 1.12 |
| v1-v2 | 33.7 | $f_{S1}/f$ | 1.049 | $f_{S2}/f$ | −7.559 |
| v1-v3 | 33.7 | $R_{S31}/R_{S32}$ | 0.43 | $R_{S41}/R_{S42}$ | 4.93 |
| v1-v4 | −2.7 | $f_{S3}/f$ | −1.22 | $f_{S4}/f$ | 1.003 |
| $d_{S1}/(d1 + d2 + d3 + d4)$ | 0.295 | $d_{S2}/(d1 + d2 + d3 + d4)$ | 0.164 | | |
| $d_{S3}/(d1 + d2 + d3 + d4)$ | 0.148 | $d_{S4}/(d1 + d2 + d3 + d4)$ | 0.393 | | |

Table 10 shows basic parameters of the optical lens 10 in the third implementation of this disclosure.

TABLE 10

Basic parameters of the optical lens 10 in the third implementation

| | |
|---|---|
| Focal length f | 14.639 mm |
| Aperture F value | 2.8 |
| Half FOV | 15° |
| Total track length TTL | 17.55 mm |
| Design wavelength | 650 nm, 610 nm, 555 nm, 510 nm, and 470 nm |

Table 11 shows a curvature radius, a thickness, a refractive index, and an Abbe number of each constituent lens element of the optical lens 100 in the third implementation of this disclosure. For meanings of the symbols in the table, refer to related descriptions in the first implementation.

TABLE 11

Curvature radius, thickness, refractive index, and Abbe number of each constituent lens element of the optical lens 10 in the third implementation

| | R | Thickness | | nd | | Vd | |
|---|---|---|---|---|---|---|---|
| R1 | 14.0 | d1 | 1.0 | n1 | 1.69 | v1 | 53.2 |
| R2 | −43.5 | a1 | 0.1 | | | | |
| R3 | 4.5 | d2 | 0.6 | n2 | 1.67 | v2 | 19.5 |
| R4 | 4.1 | a2 | 0.7 | | | | |
| R5 | −17.4 | d3 | 0.5 | n3 | 1.67 | v3 | 19.5 |
| R6 | 40 | a3 | 1.1 | | | | |
| R7 | −32.1 | d4 | 1.3 | n4 | 1.54 | v4 | 55.9 |
| R8 | −6.5 | a4 | 0.3 | | | | |

Table 12 shows aspherical coefficients of the optical lens 10 in this implementation. For meanings of the parameters in the table, refer to related descriptions in the first implementation.

TABLE 12

Aspherical coefficients of the optical lens 10 in the third implementation

| | Type | K | A0 | A1 | A2 | A3 | A4 | A5 |
|---|---|---|---|---|---|---|---|---|
| R1 | Q-type aspherical | 0.00E+00 | 9.44E+299 | 1.04E+303 | −1.02E+303 | 6.16E+304 | −1.63E+305 | 2.99E+303 |
| R2 | Q-type aspherical | 0.00E+00 | 8.38E−01 | 1.02E−01 | 2.94E−03 | −4.34E−04 | 3.32E−04 | 3.35E−05 |
| R3 | Q-type aspherical | 0.00E+00 | −8.54E+272 | 1.32E+272 | −2.84E+270 | −1.95E+269 | 1.09E+269 | −5.47E+268 |
| R4 | Q-type aspherical | 0.00E+00 | −6.23E+204 | 8.04E+203 | −1.77E+203 | −3.58E+201 | 1.87E+201 | −1.02E+201 |
| R5 | Q-type aspherical | 0.00E+00 | 2.39E+229 | −2.97E+229 | 8.76E+228 | −6.39E+227 | 3.21E+227 | −1.78E+227 |
| R6 | Q-type aspherical | 0.00E+00 | 1.80E+03 | −1.15E+03 | 2.34E+002 | −6.15E+01 | 2.61E+01 | −1.14E+01 |
| R7 | Q-type aspherical | 0.00E+00 | −2.14E+00 | −5.59E−03 | 8.89E−03 | 3.52E−03 | −1.37E−03 | −2.81E−03 |
| R8 | Q-type aspherical | 0.00E+00 | −7.18E+196 | −3.49E+18 | −3.31E+16 | 1.20E+17 | −5.92E+16 | 3.34E+16 |

By substituting the foregoing parameters into the formula:

$$x = \frac{cr^2}{1 + \sqrt{1 - Kc^2r^2}} + u^4 \sum_{m=0}^{M} a_m Q_m^{con}(u^2)$$

where the first lens element 11, the second lens element 12, the third lens element 13, and the fourth lens element 14 of the optical lens 10 in this implementation can be designed.

In this implementation, different lens elements of the optical lens 10 obtained by using the foregoing design parameters can implement different functions respectively, so that the optical lens 10 having good imaging quality is obtained through cooperation of the lens elements. Further, in this implementation, the first lens element 11 has a relatively high refractive index, and can properly implement functions of light concentration and chromatic aberration correction. The second lens element 12 can implement a function of reducing an angle of emergence of light from an aperture stop. The third lens element 13 can implement a function of diverging light to a larger image plane. The fourth lens element 14 can implement a function of correcting a field curvature and astigmatism of an optical system. It should be noted that only functions implemented by the lens elements in this implementation are provided herein. Actually, the lens elements can also implement other functions. In addition, only the functions implemented by the lens elements in this implementation are provided herein. In other implementations of this disclosure, lens elements can implement other functions. The functions are not limited herein.

Figure 13:
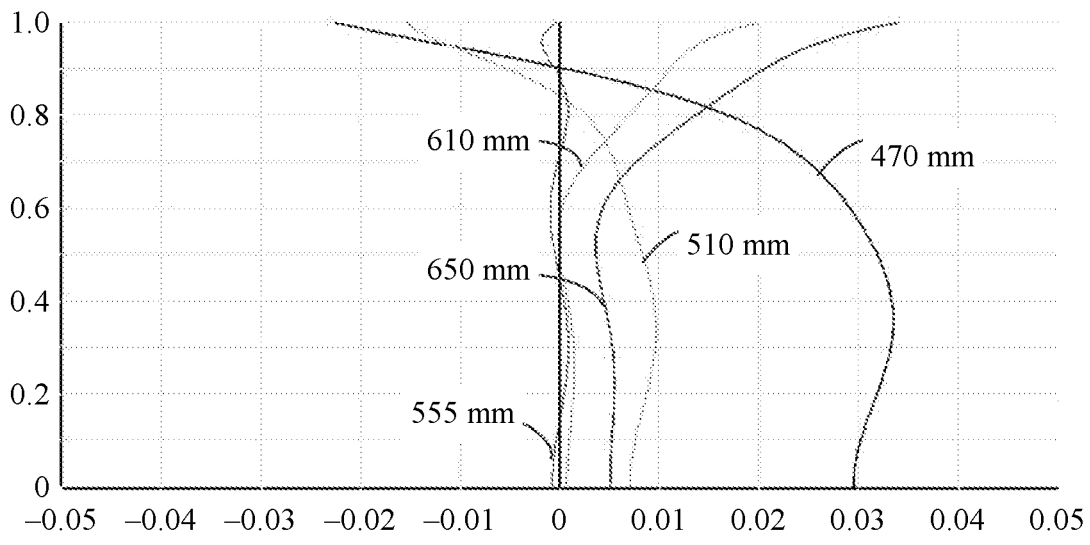
FIG. 13 is a schematic diagram of an axial chromatic aberration of the optical lens according to the third implementation of this disclosure.
Figure 14:
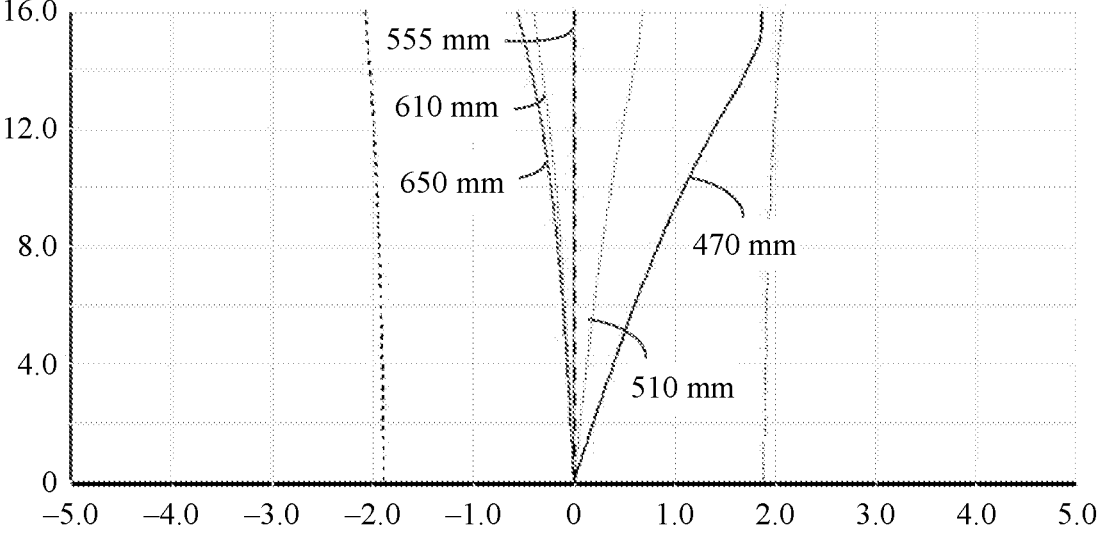
FIG. 14 is a schematic diagram of a lateral chromatic aberration of the optical lens according to the third implementation of this disclosure.
Figure 15:
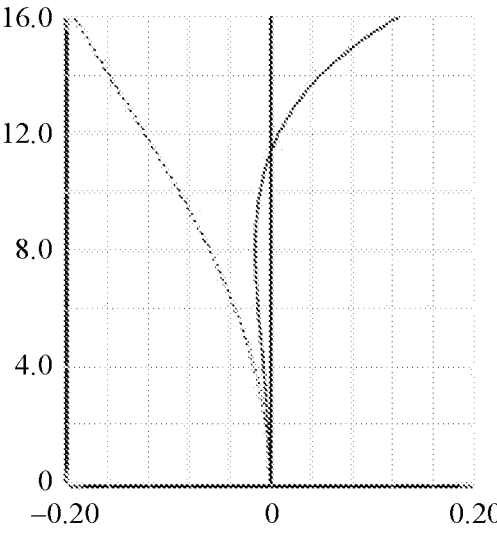
FIG. 15 is a schematic diagram of a field curvature and an optical distortion of the optical lens according to the third implementation of this disclosure.
Figure 15:
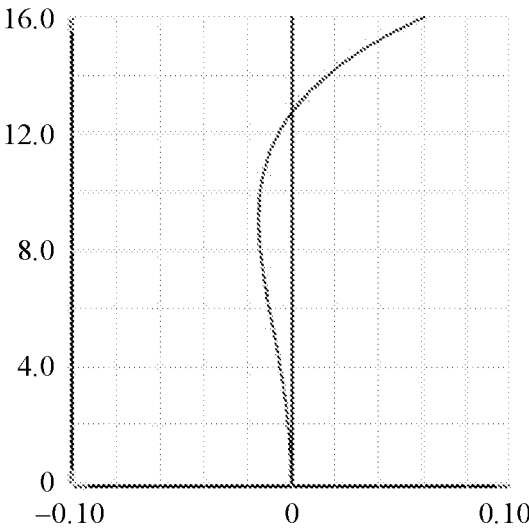

FIG. 13 to FIG. 15 are diagrams for representing optical properties of the optical lens 10 in the third implementation.

Further, FIG. 13 shows an axial aberration after light of wavelengths 650 nm, 610 nm, 555 nm, 510 nm, and 470 nm respectively passes through the optical lens 10 in the third implementation. In FIG. 13, a vertical coordinate represents a normalized pupil coordinate, and a horizontal coordinate represents an axial aberration, in units of milliseconds. As can be seen from FIG. 13, the axial aberration in this implementation is controlled within a relatively small range.

FIG. 14 shows a lateral chromatic aberration after light of wavelengths 650 nm, 610 nm, 555 nm, 510 nm, and 470 nm respectively passes through the optical lens 10 in the third implementation. In FIG. 14, a vertical coordinate represents a field of view, in units of degrees (°), and a horizontal coordinate represents a diffraction limit range, in units of microns (μm). A dashed line in FIG. 14 represents a diffraction limit range of the optical lens 10. As can be learned from the figure, the lateral chromatic aberration after light of each wavelength passes through the optical lens 10 in the third implementation is within the diffraction limit, that is, the lateral chromatic aberration after the light of each wavelength passes through the optical lens 10 in the third implementation basically does not affect imaging quality of the optical lens 10.

FIG. 15 is a schematic diagram of a field curvature and an optical distortion after light of the wavelength 555 nm passes through the optical lens 10 in the third implementation, used to indicate a difference between imaging deformation and an ideal shape after the light passes through the optical lens 10. In a left drawing in FIG. 15, a solid line is a schematic diagram of a field curvature in a meridional direction after the light of the wavelength 555 nm passes through the optical lens 10, and a dashed line is a schematic diagram of a field curvature in a sagittal direction after the light of the wavelength 555 nm passes through the optical lens 10. A right drawing in FIG. 15 is a schematic diagram of an optical distortion after the light of the wavelength 555 nm passes through the optical lens 10 in the third implementation. As can be seen from the figure, in this implementation, the optical system controls the distortion within a range recognizable by unaided eyes (2% and below unrecognizable by unaided eyes).

The BFL of the optical lens 10 provided in this implementation is 11.745 mm, and the TTL is 11.530 mm. In this case, the TTL1 is 5.785 mm. In this case, a thickness of a terminal 1000 may be slightly greater than 5.785 mm, that is, the terminal 1000 has a relatively small thickness while having good imaging quality.

Figure 16:
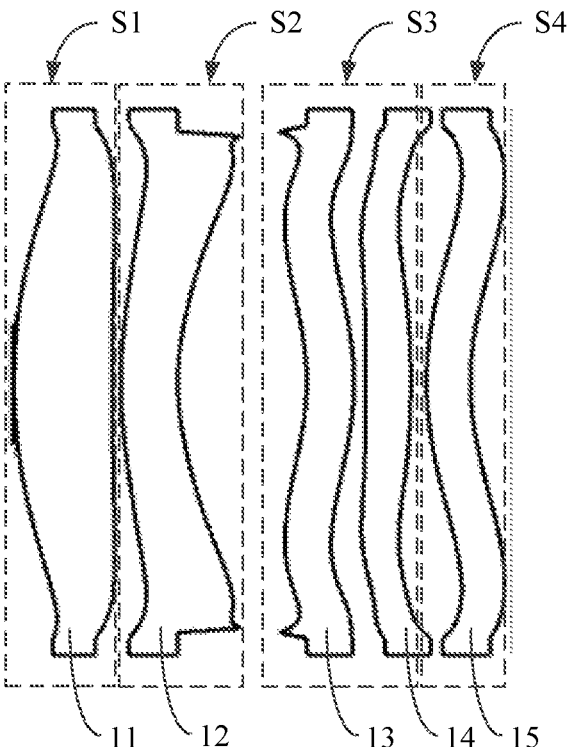
FIG. 16 is a schematic diagram of a partial structure of an optical lens according to a fourth implementation of this disclosure.

FIG. 16 shows an optical lens 10 according to a fourth implementation of this disclosure. In this implementation, the optical lens 10 includes four constituent elements, which are respectively a first constituent element S1, a second constituent element S2, a third constituent element S3, and a fourth constituent element S4. The first constituent element S1, the second constituent element S2, the third constituent element S3, and the fourth constituent element S4 are disposed in sequence from an object side to an image side. In this implementation, each of the first constituent element S1, the second constituent element S2, and the fourth constituent element S4 includes one lens element. The third constituent element S3 includes two lens elements. The first constituent element S1 includes a first lens element 11, the second constituent element S2 includes a second lens element 12, the third constituent element S3 includes a third lens element 13 and a fourth lens element 14, and the fourth constituent element S4 includes a fifth lens element 15. The lens elements are coaxially disposed.

The first lens element 11 has positive refractive power, an object side surface of the first lens element 11 is convex near an axis, and an image side surface of the first lens element 11 is concave near the axis. The second lens element 12 has negative refractive power, an object side surface of the second lens element 12 is convex near the axis, and an image side surface of the second lens element 12 is concave near the axis. The third lens element 13 has negative refractive power, an object side surface of the third lens element 13 is concave near the axis, and an image side surface of the third lens element 13 is convex near the axis. The fourth lens element 14 has positive refractive power. The fifth lens element 15 has negative refractive power, an object side surface of the fifth lens element 15 is convex near the axis, and an image side surface of the fifth lens element 15 is concave near the axis.

Based on the foregoing relations, design parameters of the optical lens 10 in the fourth implementation of this disclosure are shown in the following Table 13.

TABLE 13

Design parameters of the optical lens 10 in the fourth implementation

| | | | | | |
|---|---|---|---|---|---|
| BFL | 9.686 | BFL/TTL | 0.61 | TTL1/MIC | 0.723 |
| n1 | 1.69 | $R_{S11}/R_{S12}$ | 0.013 | $R_{S21}/R_{S22}$ | 1.718 |
| v1 – v2 | 29.7 | $f_{S1}/f$ | 0.647 | $f_{S2}/f$ | 0.528 |
| v1 – v3 | 29.7 | $R_{S31}/R_{S32}$ | 0.912 | $R_{S41}/R_{S42}$ | 1.216 |
| v1 – v5 | 29.7 | $f_{S3}/f$ | -14.567 | $f_{S4}/f$ | -2.688 |
| $d_{S1}/(d1 + d2 + d3 + d4 + d5)$ | 0.337 | | | $d_{S2}/(d1 + d2 + d3 + d4 + d5)$ | 0.195 |
| $d_{S3}/(d1 + d2 + d3 + d4 + d5)$ | 0.162 | | | $d_{S4}/(d1 + d2 + d3 + d4 + d5)$ | 0.150 |

In this implementation, d5 indicates an axial thickness of the fifth lens element 15. A first lens element of the fourth constituent element S4 is the fifth lens element 15. Therefore, $d_{S4}$ is the axial thickness d5 of the fifth lens element 15, $R_{S41}$ is a curvature radius of the object side surface of the fifth lens element 15, $R_{S42}$ is a curvature radius of the image side surface of the fifth lens element 15, and v5 indicates an Abbe number of the fifth lens element 15, that is, v5 is the Abbe number $v_{S4}$ of the first lens element of the fourth constituent element S4. Because the four constituent elements of the optical lens 10 in this implementation include the first lens element 11, the second lens element 12, the third lens element 13, the fourth lens element 14, and the fifth lens element 15, a sum of axial thicknesses of all the lens elements in the four constituent elements of the optical lens 10 is Σd=d1+d2+d3+d4+d5. For meanings of other parameters in this implementation, refer to related descriptions in the first implementation.

Table 14 shows basic parameters of the optical lens 10 in the fourth implementation of this disclosure.

TABLE 14

Basic parameters of the optical lens 10 in the fourth implementation

| | |
|---|---|
| Focal length f | 14.646 mm |
| Aperture F value | 2.8 |

TABLE 14-continued

| Basic parameters of the optical lens 10 in the fourth implementation | |
| --- | --- |
| Half FOV | 15° |
| TTL | 15.775 mm |
| Design wavelength | 650 nm, 610 nm, 555 nm, 510 nm, and 470 nm |

Table 15 shows a curvature radius, a thickness, a refractive index, and an Abbe number of each constituent lens element of the optical lens 100 in the fourth implementation of this disclosure.

TABLE 15

| Curvature radius, thickness, refractive index, and Abbe number of each lens element of the optical lens 10 in the fourth implementation | | | | | | | |
| --- | --- | --- | --- | --- | --- | --- | --- |
| | R | | Thickness | | nd | | vd |
| R1 | 6.5 | d1 | 1.2 | n1 | 1.69 | v1 | 53.2 |
| R2 | 482.5 | a1 | 0.1 | | | | |
| R3 | 5.0 | d2 | 0.7 | n2 | 1.64 | v2 | 23.5 |
| R4 | 2.9 | a2 | 1.5 | | | | |
| R5 | −3.0 | d3 | 0.6 | n3 | 1.64 | v3 | 23.5 |
| R6 | −3.3 | a3 | 0.1 | | | | |
| R7 | 44.1 | d4 | 0.5 | n4 | 1.54 | v4 | 55.9 |
| R8 | −11.2 | a4 | 0.2 | | | | |
| R9 | 3.9 | d5 | 0.5 | n5 | 1.64 | v5 | 23.5 |
| R10 | 3.2 | a5 | 0.5 | | | | |

In this implementation, R9 indicates the curvature radius of the object side surface of the fifth lens element 15, R10 indicates the curvature radius of the image side surface of the fifth lens element 15, d5 indicates an axial thickness of the fifth lens element 15, a4 indicates an axial distance from the image side surface of the fourth lens element 14 to the object side surface of the fifth lens element 15, and a5 indicates an axial distance from the image side surface of the fifth lens element 15 to an object side surface of an infrared cut-off filter 30. Meanings of other symbols in the table are the same as those shown in Table 3.

Table 16 shows aspherical coefficients of the optical lens 10 in this implementation.

TABLE 16

| | Aspherical coefficients of the optical lens 10 in the fourth implementation | | | | | | | |
| --- | --- | --- | --- | --- | --- | --- | --- | --- |
| | Type | K | A0 | A1 | A2 | A3 | A4 | A5 |
| R1 | Q-type aspherical | 0.00E+00 | −8.24E−02 | −4.74E−02 | −3.29E−03 | −2.97E−03 | −1.29E−03 | −8.72E−05 |
| R2 | Q-type aspherical | 0.00E+00 | 1.76E−02 | −3.30E−02 | 3.82E−03 | −2.81E−03 | −5.12E−05 | 1.14E−04 |
| R3 | Q-type aspherical | 0.00E+00 | −3.86E−01 | 4.10E−02 | −1.52E−02 | −6.97E−05 | −2.51E−04 | 1.00E−04 |
| R4 | Q-type aspherical | 0.00E+00 | −7.01E−01 | 2.95E−02 | −3.33E−02 | 3.21E−03 | −9.50E−04 | 2.41E−08 |
| R5 | Q-type aspherical | 0.00E+00 | 1.1E+00 | −2.28E−02 | 8.45E−03 | −6.30E−04 | −1.16E−03 | 1.73E−04 |
| R6 | Q-type aspherical | 0.00E+00 | 1.07E+00 | 2.73E−03 | 3.72E−03 | −4.83E−03 | −1.92E−03 | 6.98E−04 |
| R7 | Q-type aspherical | 0.00E+00 | −3.57E−02 | 1.10E−01 | −4.46E−02 | −3.21E−03 | 3.17E−03 | 1.96E−05 |
| R8 | Q-type aspherical | 0.00E+00 | 2.83E−01 | 8.17E−02 | −4.26E−02 | 2.70E−03 | 3.74E−03 | −1.20E−04 |
| R9 | Q-type aspherical | 0.00E+00 | −7.44E−01 | −3.18E−02 | −4.07E−03 | −5.95E−04 | −8.54E−04 | −3.54E−04 |
| R10 | Q-type aspherical | 0.00E+00 | −1.34E+00 | −2.14E−02 | −1.94E−02 | −2.56E−03 | −1.10E−03 | −3.45E−04 |

R9 indicates the curvature radius of the object side surface of the fifth lens element 15, and R10 indicates the curvature radius of the image side surface of the fifth lens element 15. Meanings of other symbols in Table 16 are the same as those in Table 4.

By substituting the foregoing parameters into the formula:

$$x = \frac{cr^2}{1 + \sqrt{1 - Kc^2 r^2}} + u^4 \sum_{m=0}^{M} a_m Q_m^{con}(u^2)$$

where the first lens element 11, the second lens element 12, the third lens element 13, and the fourth lens element 14 of the optical lens 10 in this implementation can be designed.

In this implementation, different lens elements of the optical lens 10 obtained by using the foregoing design parameters can implement different functions respectively, so that the optical lens 10 having good imaging quality is obtained through cooperation of the lens elements. Further, in this implementation, the first lens element 11 has a relatively high refractive index, and can properly implement functions of light concentration and chromatic aberration correction. The second lens element 12 can implement a function of reducing an angle of emergence of light from an aperture stop. The third lens element 13 and the fourth lens element 14 can implement a function of diverging light to a larger image plane. The fifth lens element 15 can implement a function of correcting a field curvature and astigmatism of an optical system. It should be noted that only functions implemented by the lens elements in this implementation are provided herein. In other implementations of this disclosure, lens elements can implement other functions. The functions are not limited herein.

Figure 17:
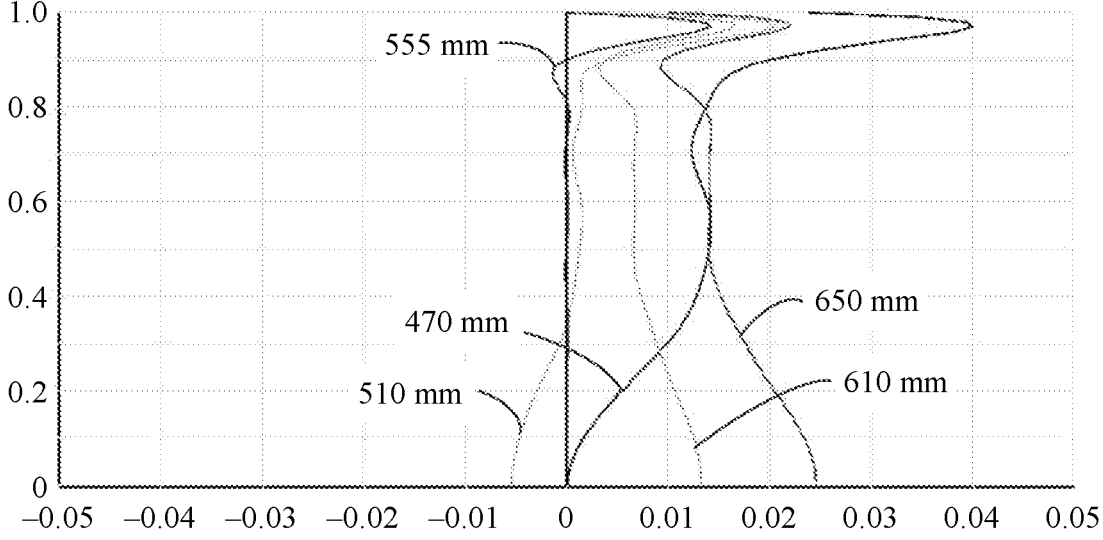
FIG. 17 is a schematic diagram of an axial chromatic aberration of the optical lens according to the fourth implementation of this disclosure.
Figure 18:
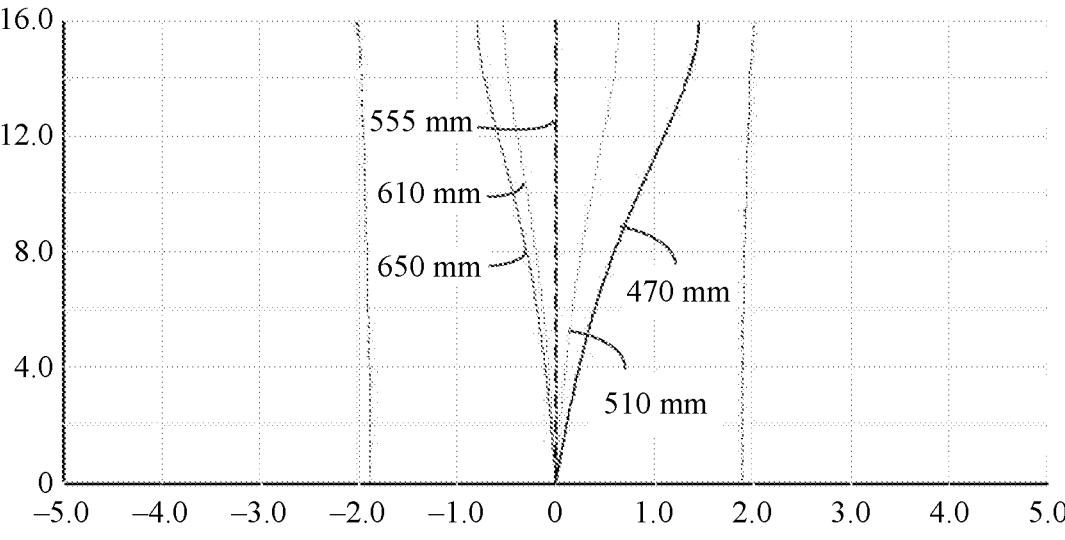
FIG. 18 is a schematic diagram of a lateral chromatic aberration of the optical lens according to the fourth implementation of this disclosure.
Figure 19:
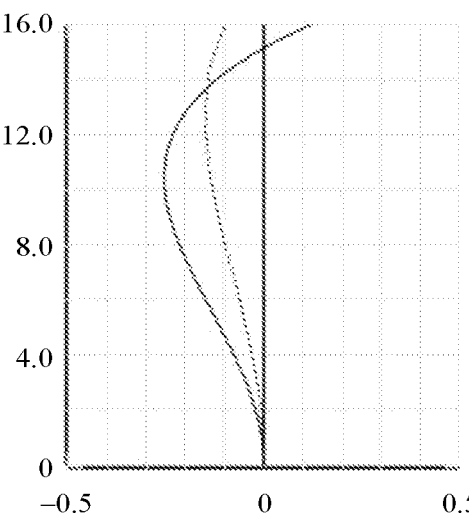
FIG. 19 is a schematic diagram of a field curvature and an optical distortion of the optical lens according to the fourth implementation of this disclosure.
Figure 19:
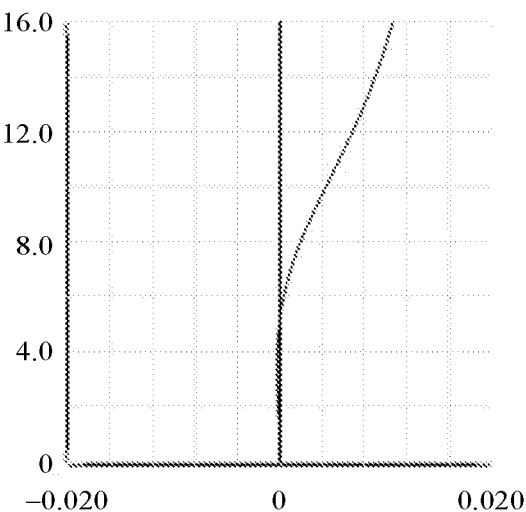

FIG. 17 to FIG. 19 are diagrams for representing optical properties of the optical lens 10 in the fourth implementation.

Further, FIG. 17 shows an axial aberration after light of wavelengths 650 nm, 610 nm, 555 nm, 510 nm, and 470 nm respectively passes through the optical lens 10 in the fourth implementation. In FIG. 17, a vertical coordinate represents a normalized pupil coordinate, and a horizontal coordinate represents an axial aberration, in units of milliseconds. As can be seen from FIG. 17, the axial aberration in this implementation is controlled within a relatively small range.

FIG. 18 shows a lateral chromatic aberration after light of wavelengths 650 nm, 610 nm, 555 nm, 510 nm, and 470 nm respectively passes through the optical lens 10 in the fourth implementation. In FIG. 18, a vertical coordinate represents a field of view, in units of degrees (°), and a horizontal coordinate represents a diffraction limit range, in units of microns (μm). A dashed line in FIG. 18 represents a diffraction limit range of the optical lens 10. As can be learned from the figure, the lateral chromatic aberration after light of each wavelength passes through the optical lens 10 in the fourth implementation is within the diffraction limit, that is, the lateral chromatic aberration after the light of each wavelength passes through the optical lens 10 in the fourth implementation basically does not affect imaging quality of the optical lens 10.

FIG. 19 is a schematic diagram of a field curvature and an optical distortion after light of the wavelength 555 nm passes through the optical lens 10 in the fourth implementation, used to indicate a difference between imaging deformation and an ideal shape after the light passes through the optical lens 10. In a left drawing in FIG. 19, a solid line is a schematic diagram of a field curvature in a meridional direction after the light of the wavelength 555 nm passes through the optical lens 10, and a dashed line is a schematic diagram of a field curvature in a sagittal direction after the light of the wavelength 555 nm passes through the optical lens 10. A right drawing in FIG. 19 is a schematic diagram of an optical distortion after the light of the wavelength 555 nm passes through the optical lens 10 in the fourth implementation. As can be seen from the figure, in this implementation, the optical system controls the distortion within a range recognizable by unaided eyes (2% and below unrecognizable by unaided eyes).

The BFL of the optical lens 10 provided in this implementation is 9.686 mm, and the TTL is 15.879 mm. In this case, the TTL1 is 6.193 mm. In this case, a thickness of a terminal 1000 may be slightly greater than 6.193 mm, that is, the terminal 1000 has a relatively small thickness while having good imaging quality.

Figure 20:
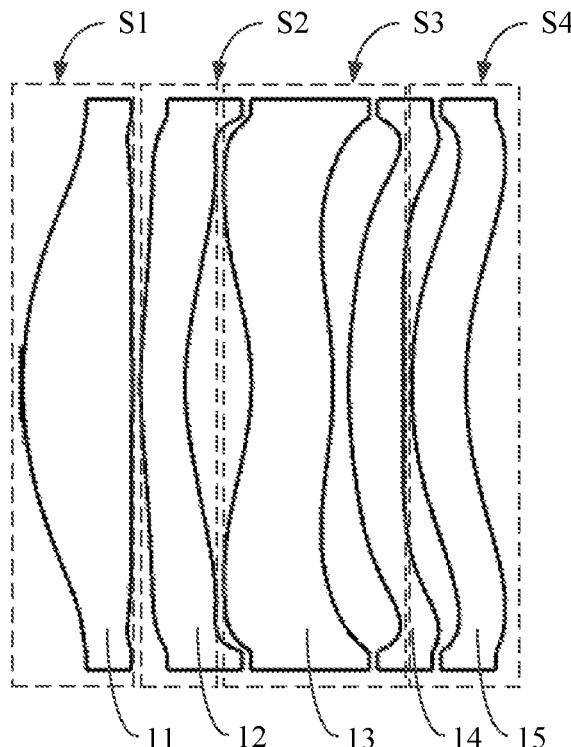
FIG. 20 is a schematic diagram of a partial structure of an optical lens according to a fifth implementation of this disclosure.

FIG. 20 is a schematic diagram of a structure of an optical lens 10 according to a fifth implementation of this disclosure. In this implementation, the optical lens 10 includes four constituent elements, which are respectively a first constituent element S1, a second constituent element S2, a third constituent element S3, and a fourth constituent element S4. The first constituent element S1, the second constituent element S2, the third constituent element S3, and the fourth constituent element S4 are disposed in sequence from an object side to an image side. In this implementation, each of the first constituent element S1, the second constituent element S2, and the fourth constituent element S4 includes one lens element. The third constituent element S3 includes two lens elements. The first constituent element S1 includes a first lens element 11, the second constituent element S2 includes a second lens element 12, the third constituent element S3 includes a third lens element 13 and a fourth lens element 14, and the fourth constituent element S4 includes a fifth lens element 15. The lens elements are coaxially disposed.

In this implementation, the first lens element 11 is made of a glass material. The second lens element 12, the third lens element 13, the fourth lens element 14, and the fifth lens element 15 are all made of plastic materials.

The first lens element 11 has positive refractive power, an object side surface of the first lens element 11 is convex near an axis, and an image side surface of the first lens element

11 is convex near the axis. The second lens element 12 has negative refractive power, an object side surface of the second lens element 12 is convex near the axis, and an image side surface of the second lens element 12 is concave near the axis. The third lens element 13 has negative refractive power, an object side surface of the third lens element 13 is concave near the axis, and an image side surface of the third lens element 13 is convex near the axis. The fourth lens element 14 has positive refractive power. The fifth lens element 15 has negative refractive power, an object side surface of the fifth lens element 15 is convex near the axis, and an image side surface of the fifth lens element 15 is concave near the axis.

Based on the foregoing relations, design parameters of the optical lens 10 in the fifth implementation of this disclosure are shown in the following Table 17. For meanings of the parameters, refer to related descriptions in the fourth implementation.

TABLE 17

| Design parameters of the optical lens 10 in the fifth implementation | | | | | |
|---|---|---|---|---|---|
| BFL | 10.20 | BFL/EFL | 0.64 | TTL1/TTL | 0.69 |
| n1 | 1.52 | $R_{S11}/R_{S12}$ | −0.108 | $R_{S21}/R_{S22}$ | 1.99 |
| v1 − v2 | 8.2 | $f_{S1}/f$ | 0.562 | $f_{S2}/f$ | −0.836 |
| v1 − v3 | 40.6 | $R_{S31}/R_{S32}$ | 0.66 | $R_{S41}/R_{S42}$ | 1.33 |
| v1 − v5 | 40.6 | $f_{S3}/f$ | −1.236 | $f_{S4}/f$ | −2.106 |
| $d_{S1}/(d1 + d2 + d3 + d4 + d5)$ | 0.317 | | $d_{S2}/(d1 + d2 + d3 + d4 + d5)$ | 0.129 |
| $d_{S3}/(d1 + d2 + d3 + d4 + d5)$ | 0.237 | | $d_{S4}/(d1 + d2 + d3 + d4 + d5)$ | 0.157 |

Table 18 shows basic parameters of the optical lens 10 in the fifth implementation of this disclosure.

TABLE 18

| Basic parameters of the optical lens 10 in the fifth implementation | |
|---|---|
| Focal length f | 14.647 mm |
| Aperture F value | 2.8 |
| Half FOV | 15° |
| Total track length TTL | 16.0 mm |
| Design wavelength | 650 nm, 610 nm, 555 nm, 510 nm, and 470 nm |

Table 19 shows a curvature radius, a thickness, a refractive index, and an Abbe number of each constituent lens element of the optical lens 100 in the fifth implementation of this disclosure. For meanings of the symbols in the table, refer to related descriptions in the fourth implementation.

TABLE 19

| Curvature radius, thickness, refractive index, and Abbe number of each lens element of the optical lens 10 in the fifth implementation | | | | | | | |
|---|---|---|---|---|---|---|---|
| | R | | Thickness | | nd | | Vd |
| R1 | 4.7 | d1 | 1.2 | n1 | 1.52 | v1 | 64.1 |
| R2 | −43.5 | a1 | 0.1 | | | | |
| R3 | 6.3 | d2 | 0.5 | n2 | 1.54 | v2 | 55.9 |
| R4 | 3.1 | a2 | 0.7 | | | | |
| R5 | −3.0 | d3 | 0.9 | n3 | 1.64 | v3 | 23.5 |
| R6 | −4.6 | a3 | 0.2 | | | | |
| R7 | 6.5 | d4 | 0.6 | n4 | 1.54 | v4 | 55.9 |
| R8 | −39.3 | a4 | 0.1 | | | | |
| R9 | 5.4 | d5 | 0.6 | n5 | 1.64 | v5 | 23.5 |
| R10 | 4.1 | a5 | 0.6 | | | | |

Table 20 shows aspherical coefficients of the optical lens 10 in this implementation. For meanings of the symbols in the table, refer to related descriptions in the fourth implementation.

TABLE 20

| | | | | | | | | |
|---|---|---|---|---|---|---|---|---|
| Aspherical coefficients of the optical lens 10 in the fifth implementation | | | | | | | | |
| | Type | K | A0 | A1 | A2 | A3 | A4 | A5 |
| R1 | Q-type aspherical | 0.00E+00 | −1.71E−01 | −5.66E−02 | −7.25E−03 | 4.87E−04 | 1.26E−03 | 4.48E−04 |
| R2 | Q-type aspherical | 0.00E+00 | 6.37E−02 | −2.08E−02 | 1.57E−03 | −1.89E−03 | 1.11E−03 | −1.19E−04 |
| R3 | Q-type aspherical | 0.00E+00 | −4.05E−01 | 6.21E−02 | −1.27E−02 | 2.68E−03 | 4.52E−04 | −1.37E−04 |
| R4 | Q-type aspherical | 0.00E+00 | −7.96E−01 | 6.70E−02 | −2.73E−02 | 5.70E−03 | −9.17E−04 | 1.91E−04 |
| R5 | Q-type aspherical | 0.00E+00 | 1.02E+00 | −3.86E−02 | 3.56E−03 | 1.67E−03 | −9.36E−06 | 3.18E−04 |
| R6 | Q-type aspherical | 0.00E+00 | 1.01E+00 | −5.59E−02 | 6.97E−03 | 3.49E−04 | 7.75E−04 | −1.05E−05 |
| R7 | Q-type aspherical | 0.00E+00 | 1.55E−02 | 2.12E−02 | −5.32E−02 | −8.97E−03 | 5.16E−04 | −3.18E−04 |
| R8 | Q-type aspherical | 0.00E+00 | 6.06E−01 | −5.76E−02 | −3.98E−02 | −1.49E−02 | 4.56E−03 | 7.92E−04 |
| R9 | Q-type aspherical | 0.00E+00 | −3.00E−01 | −1.91E−01 | 6.77E−03 | −2.26E−02 | −4.77E−03 | −2.47E−03 |
| R10 | Q-type aspherical | 0.00E+00 | −9.49E−01 | −7.10E−02 | 1.44E−03 | −1.06E−03 | −1.26E−03 | 8.88E−04 |

By substituting the foregoing parameters into the formula:

$$x = \frac{cr^2}{1 + \sqrt{1 - Kc^2 r^2}} + u^4 \sum_{m=0}^{M} a_m Q_m^{con}(u^2)$$

where the first lens element 11, the second lens element 12, the third lens element 13, the fourth lens element 14, and the fifth lens element 15 of the optical lens 10 in this implementation can be designed.

In this implementation, different lens elements of the optical lens 10 obtained by using the foregoing design parameters can implement different functions respectively, so that the optical lens 10 having good imaging quality is obtained through cooperation of the lens elements. Further, in this implementation, the first lens element 11 has a relatively high refractive index, and can properly implement functions of light concentration and chromatic aberration correction. The second lens element 12 can implement a function of reducing an angle of emergence of light from an aperture stop. The third lens element 13 and the fourth lens element 14 can implement a function of diverging light to a larger image plane. The fifth lens element 15 can implement a function of correcting a field curvature and astigmatism of an optical system. It should be noted that only functions implemented by the lens elements in this implementation are provided herein. In other implementations of this disclosure, lens elements can implement other functions. The functions are not limited herein.

It should be noted that only functions implemented by the lens elements in this implementation are provided herein. In other implementations of this disclosure, lens elements can implement other functions. The functions are not limited herein.

Figure 21:
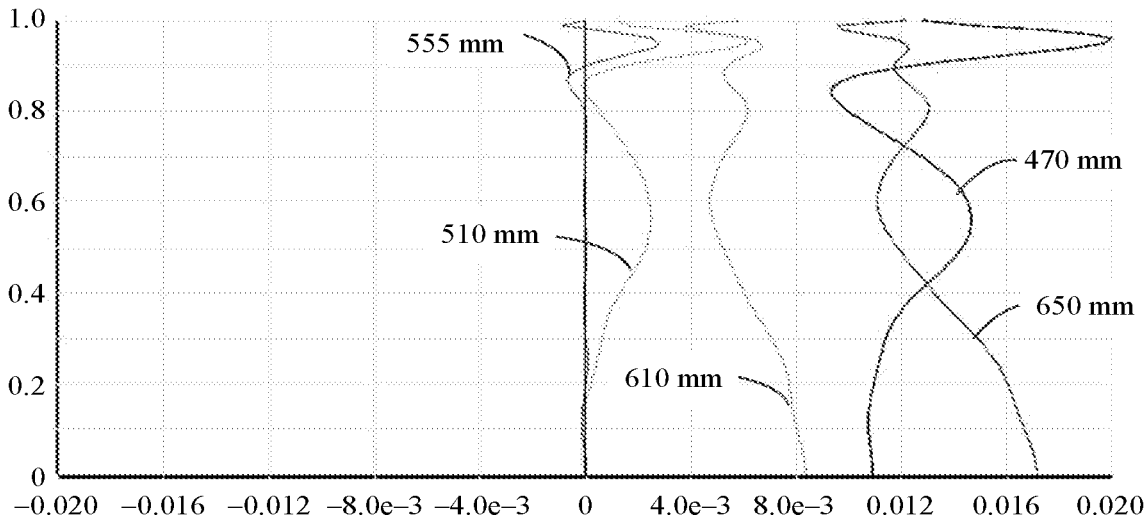
FIG. 21 is a schematic diagram of an axial chromatic aberration of the optical lens according to the fifth implementation of this disclosure.
Figure 22:
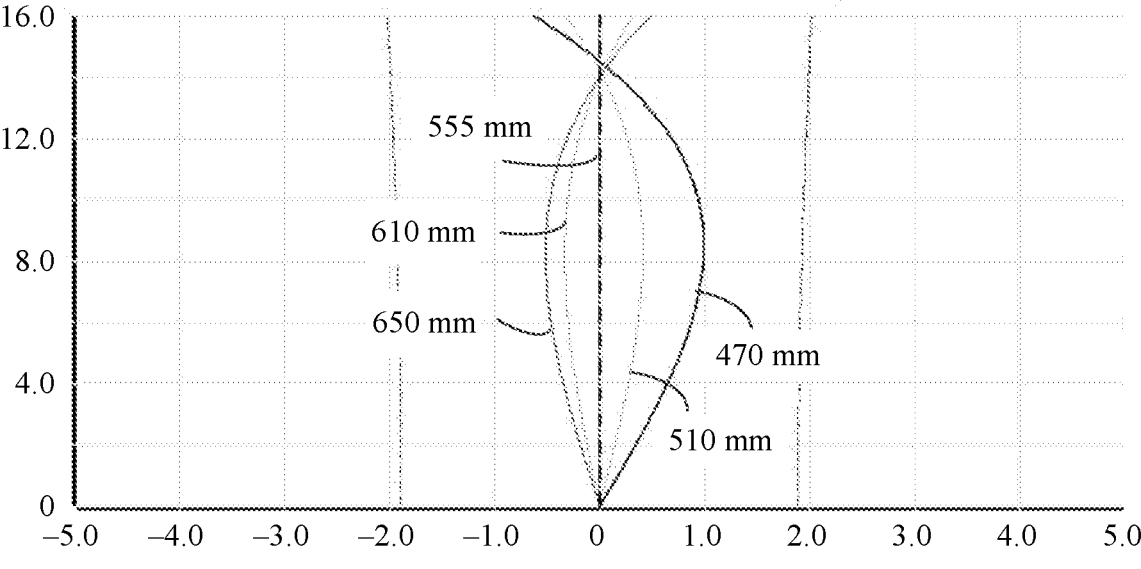
FIG. 22 is a schematic diagram of a lateral chromatic aberration of the optical lens according to the fifth implementation of this disclosure.
Figure 23:
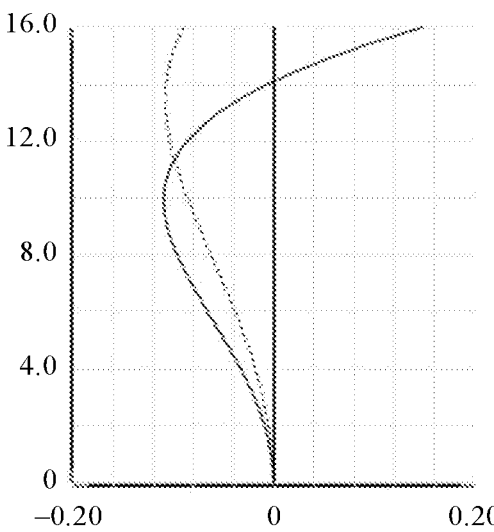
FIG. 23 is a schematic diagram of a field curvature and an optical distortion of the optical lens according to the fifth implementation of this disclosure.
Figure 23:
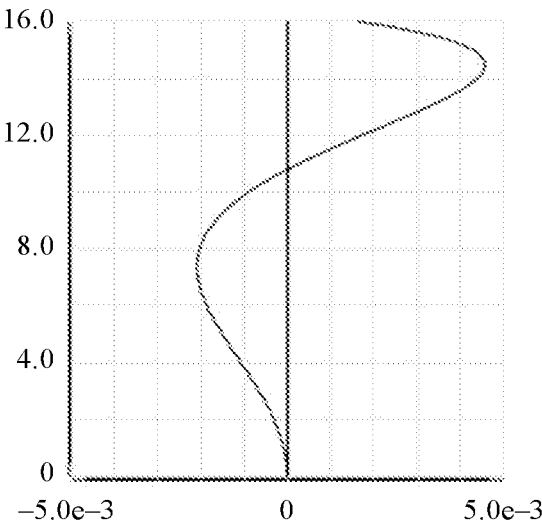

FIG. 21 to FIG. 23 are diagrams for representing optical properties of the optical lens 10 in the fifth implementation.

Further, FIG. 21 shows an axial aberration after light of wavelengths 650 nm, 610 nm, 555 nm, 510 nm, and 470 nm respectively passes through the optical lens 10 in the fifth implementation. In FIG. 21, a vertical coordinate represents a normalized pupil coordinate, and a horizontal coordinate represents an axial aberration, in units of milliseconds. As can be seen from FIG. 21, the axial aberration in this implementation is controlled within a relatively small range.

FIG. 22 shows a lateral chromatic aberration after light of wavelengths 650 nm, 610 nm, 555 nm, 510 nm, and 470 nm respectively passes through the optical lens 10 in the fifth implementation. In FIG. 22, a vertical coordinate represents a field of view, in units of degrees (°), and a horizontal coordinate represents a diffraction limit range, in units of microns (μm). A dashed line in FIG. 22 represents a diffraction limit range of the optical lens 10. As can be learned from the figure, the lateral chromatic aberration after light of each wavelength passes through the optical lens 10 in the fifth implementation is within the diffraction limit, that is, the lateral chromatic aberration after the light of each wavelength passes through the optical lens 10 in the fifth implementation basically does not affect imaging quality of the optical lens 10.

FIG. 23 is a schematic diagram of a field curvature and an optical distortion after light of the wavelength 555 nm passes through the optical lens 10 in the fifth implementation, used to indicate a difference between imaging deformation and an ideal shape after the light passes through the optical lens 10. In a left drawing in FIG. 23, a solid line is a schematic diagram of a field curvature in a meridional direction after the light of the wavelength 555 nm passes through the optical lens 10, and a dashed line is a schematic diagram of a field curvature in a sagittal direction after the light of the wavelength 555 nm passes through the optical lens 10. A right drawing in FIG. 23 is a schematic diagram of an optical distortion after the light of the wavelength 555 nm passes through the optical lens 10 in the fifth implementation. As can be seen from the figure, in this implementation, the optical system controls the distortion within a range recognizable by unaided eyes (2% and below unrecognizable by unaided eyes).

The BFL of the optical lens 10 provided in this implementation is 10.20 mm, and the TTL is 15.938 mm. In this case, the TTL1 is 5.738 mm. In this case, a thickness of a terminal 1000 may be slightly greater than 5.738 mm, that is, the terminal 1000 has a relatively small thickness while having good imaging quality.

Figure 24:
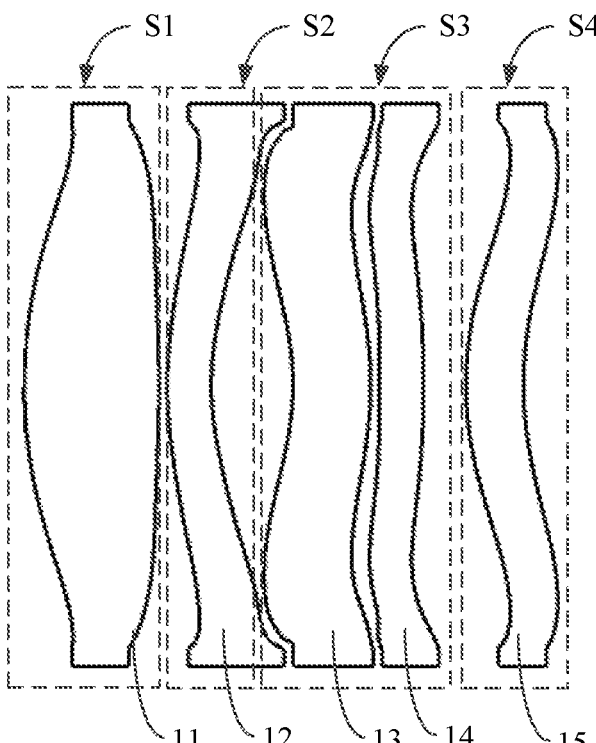
FIG. 24 is a schematic diagram of a partial structure of an optical lens according to a sixth implementation of this disclosure.

FIG. 24 is a schematic diagram of a structure of an optical lens 10 according to a sixth implementation of this disclosure. In this implementation, the optical lens 10 includes four constituent elements, which are respectively a first constituent element S1, a second constituent element S2, a third constituent element S3, and a fourth constituent element S4. The first constituent element S1, the second constituent element S2, the third constituent element S3, and the fourth constituent element S4 are disposed in sequence from an object side to an image side. In this implementation, each of the first constituent element S1, the second constituent element S2, and the fourth constituent element S4 includes one lens element. The third constituent element S3 includes two lens elements. The first constituent element S1 includes a first lens element 11, the second constituent element S2 includes a second lens element 12, the third constituent element S3 includes a third lens element 13 and a fourth lens element 14, and the fourth constituent element S4 includes a fifth lens element 15. The lens elements are coaxially disposed.

In this implementation, the second lens element 12 is made of a glass material. The first lens element 11, the third lens element 13, the fourth lens element 14, and the fifth lens element 15 are all made of plastic materials.

The first lens element 11 has positive refractive power, an object side surface of the first lens element 11 is convex near an axis, and an image side surface of the first lens element 11 is convex near the axis. The second lens element 12 has negative refractive power, an object side surface of the second lens element 12 is convex near the axis, and an image side surface of the second lens element 12 is concave near the axis. The third lens element 13 has negative refractive power, an object side surface of the third lens element 13 is concave near the axis, and an image side surface of the third lens element 13 is convex near the axis. The fourth lens element 14 has positive refractive power. The fifth lens element 15 has positive refractive power, an object side surface of the fifth lens element 15 is convex near the axis, and an image side surface of the fifth lens element 15 is concave near the axis.

Based on the foregoing relations, design parameters of the optical lens 10 in the sixth implementation of this disclosure are shown in the following Table 21. For meanings of the parameters, refer to related descriptions in the fourth implementation.

TABLE 21

| Design parameters of the optical lens 10 in the sixth implementation | | | | | |
|---|---|---|---|---|---|
| BFL | 9.48 | BFL/EFL | 0.60 | TTL1/TTL | 0.76 |
| n1 | 1.54 | $R_{S11}/R_{S12}$ | −0.345 | $R_{S21}/R_{S22}$ | 1.51 |
| v1 − v2 | 26.4 | $f_{S1}/f$ | 0.541 | $f_{S2}/f$ | −0.985 |
| v1 − v3 | 34.4 | $R_{S31}/R_{S32}$ | 0.69 | $R_{S41}/R_{S42}$ | 0.99 |
| v1 − v5 | 0 | $f_{S3}/f$ | −1.352 | $f_{S4}/f$ | 7.66 |
| $d_{S1}/(d1 + d2 + d3 + d4 + d5)$ | 0.376 | | | $d_{S2}/(d1 + d2 + d3 + d4 + d5)$ | 0.123 |

TABLE 21-continued

| Design parameters of the optical lens 10 in the sixth implementation | | | |
|---|---|---|---|
| $d_{S3}/(d1 + d2 + d3 + d4 + d5)$ | 0.217 | $d_{S4}/(d1 + d2 + d3 + d4 + d5)$ | 0.161 |

Table 22 shows basic parameters of the optical lens 10 in the sixth implementation of this disclosure.

TABLE 22

| Basic parameters of the optical lens 10 in the sixth implementation | |
|---|---|
| Focal length f | 14.648 mm |
| Aperture F value | 2.8 |
| Half FOV | 15° |
| Total track length TTL | 15.88 mm |
| Design wavelength | 650 nm, 610 nm, 555 nm, 510 nm, and 470 nm |

Table 23 shows a curvature radius, a thickness, a refractive index, and an Abbe number of each constituent lens element of the optical lens 100 in the sixth implementation of this disclosure. For meanings of the symbols in the table, refer to related descriptions in the fourth implementation.

TABLE 23

| Curvature radius, thickness, refractive index, and Abbe number of each lens element of the optical lens 10 in the sixth implementation | | | | | | | |
|---|---|---|---|---|---|---|---|
| | R | | Thickness | | nd | | Vd |
| R1 | 5.7 | d1 | 1.5 | n1 | 1.54 | v1 | 55.9 |
| R2 | −16.5 | a1 | 0.1 | | | | |
| R3 | 4.6 | d2 | 0.5 | n2 | 1.72 | v2 | 29.5 |
| R4 | 3.0 | a2 | 0.9 | | | | |
| R5 | −2.9 | d3 | 0.9 | n3 | 1.65 | v3 | 21.5 |
| R6 | −4.2 | a3 | 0.1 | | | | |
| R7 | −108.8 | d4 | 0.5 | n4 | 1.54 | v4 | 55.9 |
| R8 | −13.0 | a4 | 0.5 | | | | |
| R9 | 4.0 | d5 | 0.7 | n5 | 1.54 | v5 | 55.9 |
| R10 | 4.1 | a5 | 0.2 | | | | |

Table 24 shows aspherical coefficients of the optical lens 10 in this implementation. For meanings of the symbols in the table, refer to related descriptions in the fourth implementation.

TABLE 24

| | Type | K | A0 | A1 | A2 | A3 | A4 | A5 |
|---|---|---|---|---|---|---|---|---|
| | | Aspherical coefficients of the optical lens 10 in the sixth implementation | | | | | | |
| R1 | Q-type aspherical | 0.00E+00 | −1.67E−01 | −5.56E−02 | −5.39E−03 | 2.74E−04 | −7.57E−05 | 1.22E−04 |
| R2 | Q-type aspherical | 0.00E+00 | 8.44E−02 | −4.65E−02 | 3.20E−03 | 9.53E−04 | −3.04E−04 | 4.16E−06 |
| R3 | Q-type aspherical | 0.00E+00 | −3.72E−01 | 3.31E−02 | −1.48E−02 | 3.25E−03 | 3.36E−04 | −2.20E−04 |
| R4 | Q-type aspherical | 0.00E+00 | −7.69E−01 | 4.83E−02 | −3.19E−02 | 5.20E−03 | 5.76E−04 | −2.04−04 |
| R5 | Q-type aspherical | 0.00E+00 | 1.06+00 | −2.48E−02 | 1.09E−02 | −2.71E−04 | 4.61−04 | 3.91−04 |
| R6 | Q-type aspherical | 0.00E+00 | 9.19E−01 | −4.96E−03 | −4.22E−03 | −5.06E−03 | −4.61−03 | 1.93E−03 |
| R7 | Q-type aspherical | 0.00E+00 | −4.43E−02 | 1.34E−01 | −6.42E−02 | −2.17E−03 | −1.72E−03 | 3.64E−03 |
| R8 | Q-type aspherical | 0.00E+00 | 4.56E−01 | 1.16E−01 | −4.18E−02 | −6.79E−03 | −3.06E−04 | −5.10E−04 |
| R9 | Q-type aspherical | 0.00E+00 | −5.16E−01 | −6.29E−02 | 1.31E−02 | −5.07E−03 | 8.68E−04 | −6.82E−04 |
| R10 | Q-type aspherical | 0.00E+00 | −1.01E+00 | −4.83E−02 | −1.24E−03 | −6.410E−03 | −8.31E−04 | −6.17E−04 |

By substituting the foregoing parameters into the formula:

$$x = \frac{cr^2}{1 + \sqrt{1 - Kc^2r^2}} + u^4 \sum_{m=0}^{M} a_m Q_m^{con}(u^2)$$

where the first lens element 11, the second lens element 12, the third lens element 13, the fourth lens element 14, and the fifth lens element 15 of the optical lens 10 in this implementation can be designed.

In this implementation, different lens elements of the optical lens 10 obtained by using the foregoing design parameters can implement different functions respectively, so that the optical lens 10 having good imaging quality is obtained through cooperation of the lens elements. Further, in this implementation, the first lens element 11 has a relatively high refractive index, and can properly implement functions of light concentration and chromatic aberration correction. The second lens element 12 can implement a function of reducing an angle of emergence of light from an aperture stop. The third lens element 13 and the fourth lens element 14 can implement a function of diverging light to a larger image plane. The fifth lens element 15 can implement a function of correcting a field curvature and astigmatism of an optical system. It should be noted that only functions implemented by the lens elements in this implementation are provided herein. In other implementations of this disclosure, lens elements can implement other functions. The functions are not limited herein.

It should be noted that only functions implemented by the lens elements in this implementation are provided herein. In other implementations of this disclosure, lens elements can implement other functions. The functions are not limited herein.

Figure 25:
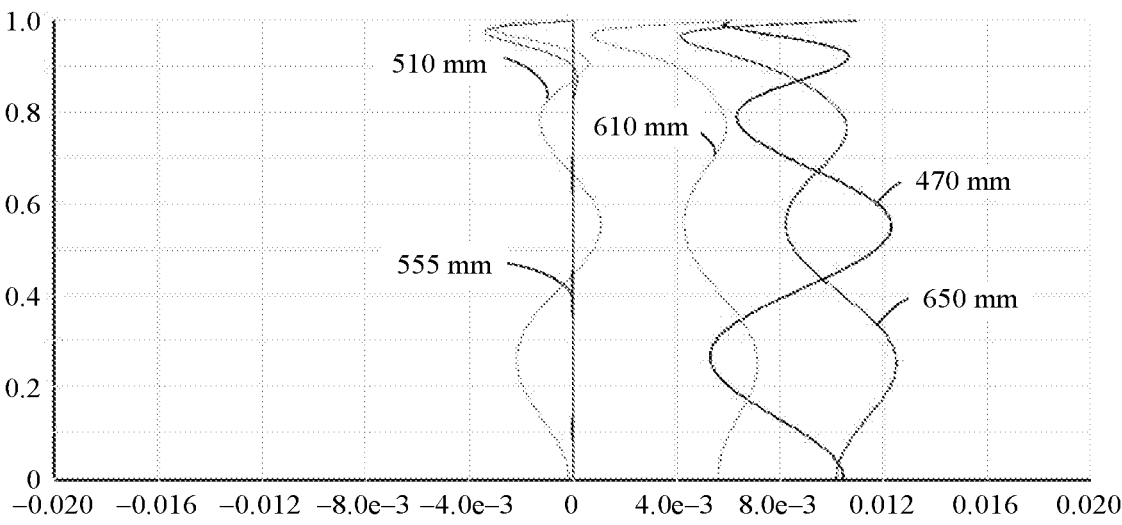
FIG. 25 is a schematic diagram of an axial chromatic aberration of the optical lens according to the sixth implementation of this disclosure.
Figure 26:
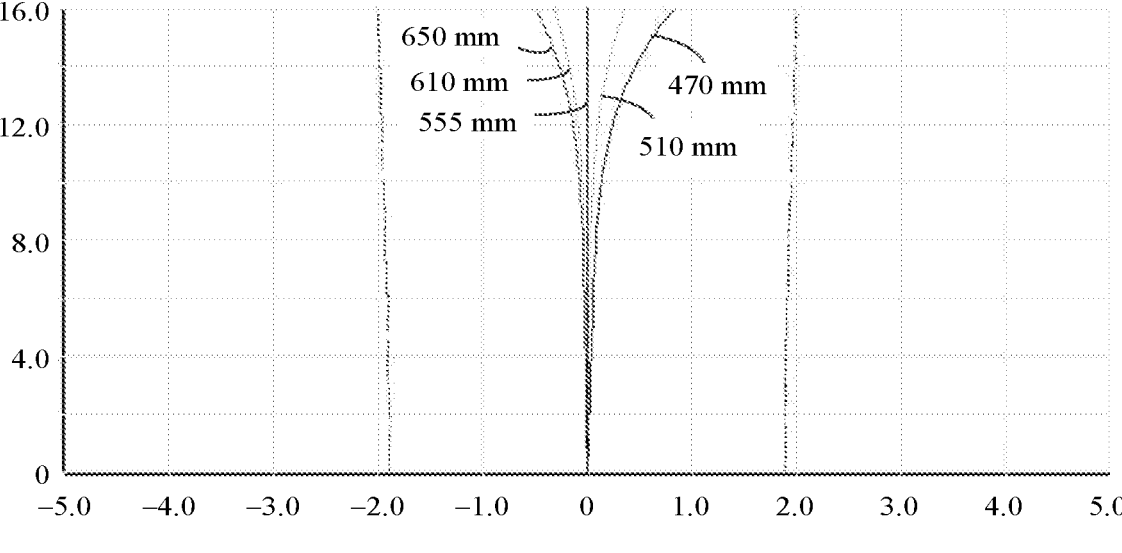
FIG. 26 is a schematic diagram of a lateral chromatic aberration of the optical lens according to the sixth implementation of this disclosure.
Figure 27:
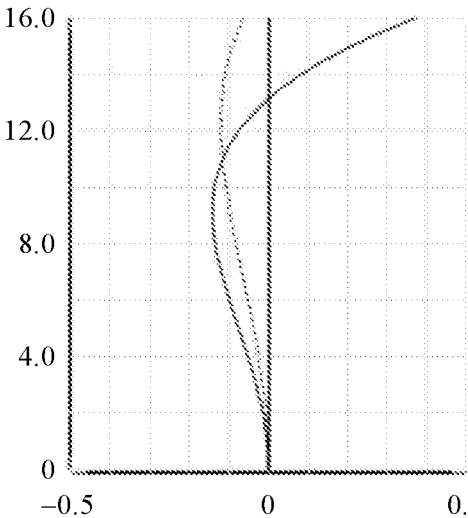
FIG. 27 is a schematic diagram of a field curvature and an optical distortion of the optical lens according to the sixth implementation of this disclosure.
Figure 27:
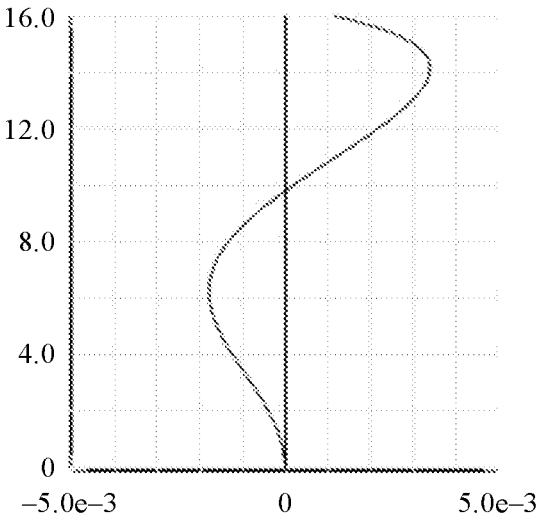

FIG. 25 to FIG. 27 are diagrams for representing optical properties of the optical lens 10 in the sixth implementation.

Further, FIG. 25 shows an axial aberration after light of wavelengths 650 nm, 610 nm, 555 nm, 510 nm, and 470 nm respectively passes through the optical lens 10 in the sixth implementation. In FIG. 25, a vertical coordinate represents a normalized pupil coordinate, and a horizontal coordinate represents an axial aberration, in units of milliseconds. As can be seen from FIG. 25, the axial aberration in this implementation is controlled within a relatively small range.

FIG. 26 shows a lateral chromatic aberration after light of wavelengths 650 nm, 610 nm, 555 nm, 510 nm, and 470 nm respectively passes through the optical lens 10 in the sixth implementation. In FIG. 26, a vertical coordinate represents a field of view, in units of degrees (°), and a horizontal coordinate represents a diffraction limit range, in units of microns (μm). A dashed line in FIG. 26 represents a diffraction limit range of the optical lens 10. As can be learned from the figure, the lateral chromatic aberration after light of each wavelength passes through the optical lens 10 in the sixth implementation is within the diffraction limit, that is, the lateral chromatic aberration after the light of each wavelength passes through the optical lens 10 in the sixth implementation basically does not affect imaging quality of the optical lens 10.

FIG. 27 is a schematic diagram of a field curvature and an optical distortion after light of the wavelength 555 nm passes through the optical lens 10 in the sixth implementation, used to indicate a difference between imaging deformation and an ideal shape after the light passes through the optical lens 10. In a left drawing in FIG. 27, a solid line is a schematic diagram of a field curvature in a meridional direction after the light of the wavelength 555 nm passes through the optical lens 10, and a dashed line is a schematic diagram of a field curvature in a sagittal direction after the light of the wavelength 555 nm passes through the optical lens 10. A right drawing in FIG. 27 is a schematic diagram of an optical distortion after the light of the wavelength 555 nm passes through the optical lens 10 in the sixth implementation. As can be seen from the figure, in this implementation, the optical system controls the distortion within a range recognizable by unaided eyes (2% and below unrecognizable by unaided eyes).

The BFL of the optical lens 10 provided in this implementation is 9.48 mm, and the TTL is 15.8 mm. In this case, the TTL1 is 6.32 mm. In this case, a thickness of a terminal 1000 may be slightly greater than 6.32 mm, that is, the terminal 1000 has a relatively small thickness while having good imaging quality.

Figure 28:
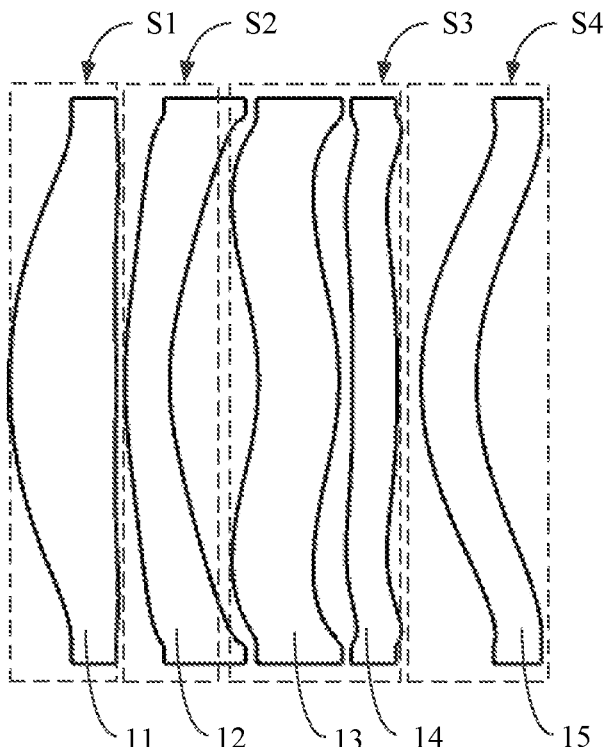
FIG. 28 is a schematic diagram of a partial structure of an optical lens according to a seventh implementation of this disclosure.

FIG. 28 is a schematic diagram of a structure of an optical lens 10 according to a seventh implementation of this disclosure. In this implementation, the optical lens 10 includes four constituent elements, which are respectively a first constituent element S1, a second constituent element S2, a third constituent element S3, and a fourth constituent element S4. The first constituent element S1, the second constituent element S2, the third constituent element S3, and the fourth constituent element S4 are disposed in sequence from an object side to an image side. In this implementation, each of the first constituent element S1, the second constituent element S2, and the fourth constituent element S4 includes one lens element. The third constituent element S3 includes two lens elements. The first constituent element S1 includes a first lens element 11, the second constituent element S2 includes a second lens element 12, the third constituent element S3 includes a third lens element 13 and a fourth lens element 14, and the fourth constituent element S4 includes a fifth lens element 15. The lens elements are coaxially disposed.

In this implementation, the fourth lens element 14 is made of a glass material. The first lens element 11, the second lens element 11, the third lens element 13, and the fifth lens element 15 are all made of plastic materials.

The first lens element 11 has positive refractive power, an object side surface of the first lens element 11 is convex near an axis, and an image side surface of the first lens element 11 is convex near the axis. The second lens element 12 has negative refractive power, an object side surface of the second lens element 12 is convex near the axis, and an image side surface of the second lens element 12 is concave near the axis. The third lens element 13 has positive refractive power, an object side surface of the third lens element 13 is concave near the axis, and an image side surface of the third lens element 13 is convex near the axis. The fourth lens element 14 has positive refractive power. The fifth lens element 15 has negative refractive power, an object side surface of the fifth lens element 15 is convex near the axis, and an image side surface of the fifth lens element 15 is concave near the axis.

Based on the foregoing relations, design parameters of the optical lens 10 in the seventh implementation of this disclosure are shown in the following Table 25. For meanings of the parameters, refer to related descriptions in the fourth implementation.

TABLE 25

| Design parameters of the optical lens 10 in the seventh implementation | | | | | |
|---|---|---|---|---|---|
| BFL | 9.60 | BFL/EFL | 0.60 | TTL1/MIC | 0.76 |
| n1 | 1.54 | $R_{S11}/R_{S12}$ | −0.147 | $R_{S21}/R_{S22}$ | 1.80 |
| v1 − v2 | 32.5 | $f_{S1}/f$ | 0.575 | $f_{S2}/f$ | −0.792 |

TABLE 25-continued

| Design parameters of the optical lens 10 in the seventh implementation | | | | | |
|---|---|---|---|---|---|
| v1 − v3 | 0 | $R_{S31}/R_{S32}$ | 0.954 | $R_{S41}/R_{S42}$ | 1.08 |
| v1 − v5 | 0 | $f_{S3}/f$ | 7.259 | $f_{S4}/f$ | −28.165 |
| $d_{S1}/(d1 + d2 + d3 + d4 + d5)$ | 0.320 | | | $d_{S2}/(d1 + d2 + d3 + d4 + d5)$ | 0.135 |
| $d_{S3}/(d1 + d2 + d3 + d4 + d5)$ | 0.245 | | | $d_{S4}/(d1 + d2 + d3 + d4 + d5)$ | 0.167 |

Table 26 shows basic parameters of the optical lens 10 in the seventh implementation of this disclosure.

TABLE 26

| Basic parameters of the optical lens 10 in the seventh implementation | |
|---|---|
| Focal length f | 14.647 mm |
| Aperture F value | 2.8 |
| Half FOV | 15° |
| Total track length TTL | 15.97 mm |
| Design wavelength | 650 nm, 610 nm, 555 nm, 510 nm, and 470 nm |

Table 27 shows a curvature radius, a thickness, a refractive index, and an Abbe number of each constituent lens element of the optical lens 100 in the seventh implementation of this disclosure. For meanings of the symbols in the table, refer to related descriptions in the fourth implementation.

TABLE 27

| Curvature radius, thickness, refractive index, and Abbe number of each lens element of the optical lens 10 in the seventh implementation | | | | | | | |
|---|---|---|---|---|---|---|---|
| | R | | Thickness | | nd | | Vd |
| R1 | 5.3 | d1 | 1.2 | n1 | 1.54 | v1 | 56.0 |
| R2 | −35.6 | a1 | 0.1 | | | | |
| R3 | 5.5 | d2 | 0.5 | n2 | 1.64 | v2 | 23.5 |
| R4 | 3.1 | a2 | 1.0 | | | | |
| R5 | −3.1 | d3 | 0.9 | n3 | 1.54 | v3 | 56.0 |
| R6 | −3.2 | a3 | 0.2 | | | | |
| R7 | −108.3 | d4 | 0.5 | n4 | 1.52 | v4 | 64.1 |
| R8 | −22.5 | a4 | 0.3 | | | | |
| R9 | 3.5 | d5 | 0.6 | n5 | 1.54 | v5 | 56.0 |
| R10 | 3.2 | a5 | 0.9 | | | | |

Table 28 shows aspherical coefficients of the optical lens 10 in this implementation. For meanings of the symbols in the table, refer to related descriptions in the fourth implementation.

TABLE 28

| Aspherical coefficients of the optical lens 10 in the seventh implementation | | | | | | | | |
|---|---|---|---|---|---|---|---|---|
| | Type | K | A0 | A1 | A2 | A3 | A4 | A5 |
| R1 | Q-type aspherical | 0.00E+00 | −7.46E−02 | −3.83E−02 | −8.32E−03 | −7.24E−04 | 3.39E−04 | 1.86E−04 |
| R2 | Q-type aspherical | 0.00E+00 | 1.49E−01 | −2.73E−02 | −1.59E−03 | −1.1E−03 | 8.20E−04 | −6.92E−05 |
| R3 | Q-type aspherical | 0.00E+00 | −3.65E−01 | 5.36E−02 | −9.32E−03 | 9.93E−04 | 2.42E−04 | −1.99E−05 |
| R4 | Q-type aspherical | 0.00E+00 | −7.64E−01 | 6.79E−02 | −1.94E−02 | 2.95E−03 | −7.00E−04 | 2.09E−05 |
| R5 | Q-type aspherical | 0.00E+00 | 1.02E+00 | −2.08E−02 | 6.92E−03 | 2.95E−03 | −1.04E−03 | 1.56E−04 |

TABLE 28-continued

| | | | | | | Aspherical coefficients of the optical lens 10 in the seventh implementation | | |
|---|---|---|---|---|---|---|---|---|
| | Type | K | A0 | A1 | A2 | A3 | A4 | A5 |
| R6 | Q-type aspherical | 0.00E+00 | 1.08E+00 | −3.10E−02 | 1.18E−02 | 5.03E−03 | −2.18E−03 | 3.36E−04 |
| R7 | Q-type aspherical | 0.00E+00 | 2.31E−02 | 1.00E−01 | −3.78E−02 | −7.41E−04 | −3.02E−03 | 4.18E−04 |
| R8 | Q-type aspherical | 0.00E+00 | 1.34E−01 | 1.10E−01 | −3.45E−02 | −2.68E−03 | −1.40E−03 | −1.74E−04 |
| R9 | Q-type aspherical | 0.00E+00 | −6.22E−01 | −8.57E−02 | −5.75E−03 | −4.4E−03 | −6.59E−04 | −9.34E−04 |
| R10 | Q-type aspherical | 0.00E+00 | −1.13E+00 | −9.77E−02 | −2.51E−02 | −6.89E−03 | −2.43E−03 | −8.48E−04 |

By substituting the foregoing parameters into the formula:

$$x = \frac{cr^2}{1 + \sqrt{1 - Kc^2 r^2}} + u^4 \sum_{m=0}^{M} a_m Q_m^{con}(u^2)$$

where the first lens element 11, the second lens element 12, the third lens element 13, the fourth lens element 14, and the fifth lens element 15 of the optical lens 10 in this implementation can be designed.

In this implementation, different lens elements of the optical lens 10 obtained by using the foregoing design parameters can implement different functions respectively, so that the optical lens 10 having good imaging quality is obtained through cooperation of the lens elements. Further, in this implementation, the first lens element 11 has a relatively high refractive index, and can properly implement functions of light concentration and chromatic aberration correction. The second lens element 12 can implement a function of reducing an angle of emergence of light from an aperture stop. The third lens element 13 and the fourth lens element 14 can implement a function of diverging light to a larger image plane. The fifth lens element 15 can implement a function of correcting a field curvature and astigmatism of an optical system. It should be noted that only functions implemented by the lens elements in this implementation are provided herein. In other implementations of this disclosure, lens elements can implement other functions. The functions are not limited herein.

It should be noted that only functions implemented by the lens elements in this implementation are provided herein. In other implementations of this disclosure, lens elements can implement other functions. The functions are not limited herein.

Figure 29:
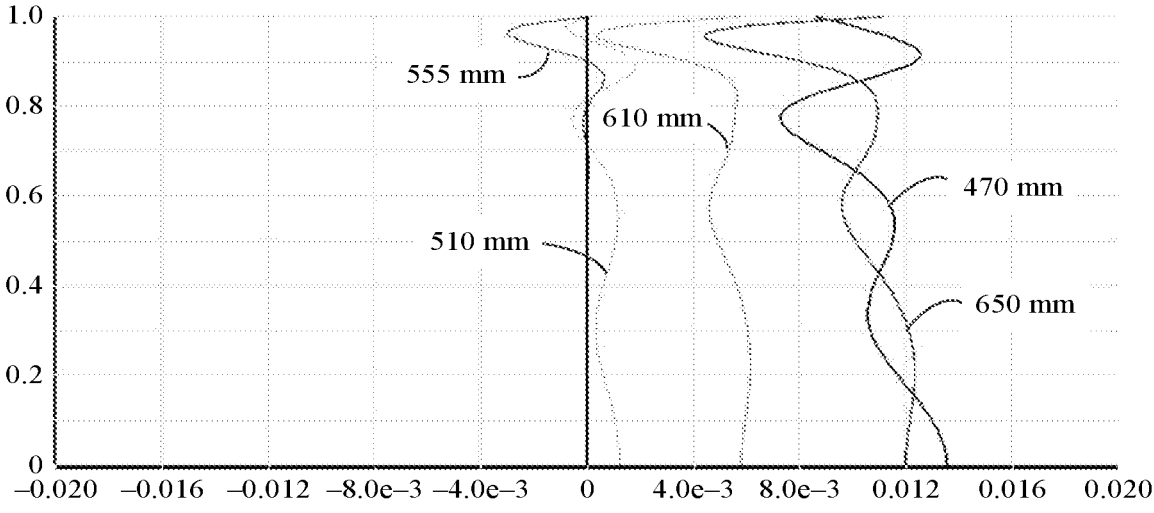
FIG. 29 is a schematic diagram of an axial chromatic aberration of the optical lens according to the seventh implementation of this disclosure.
Figure 30:
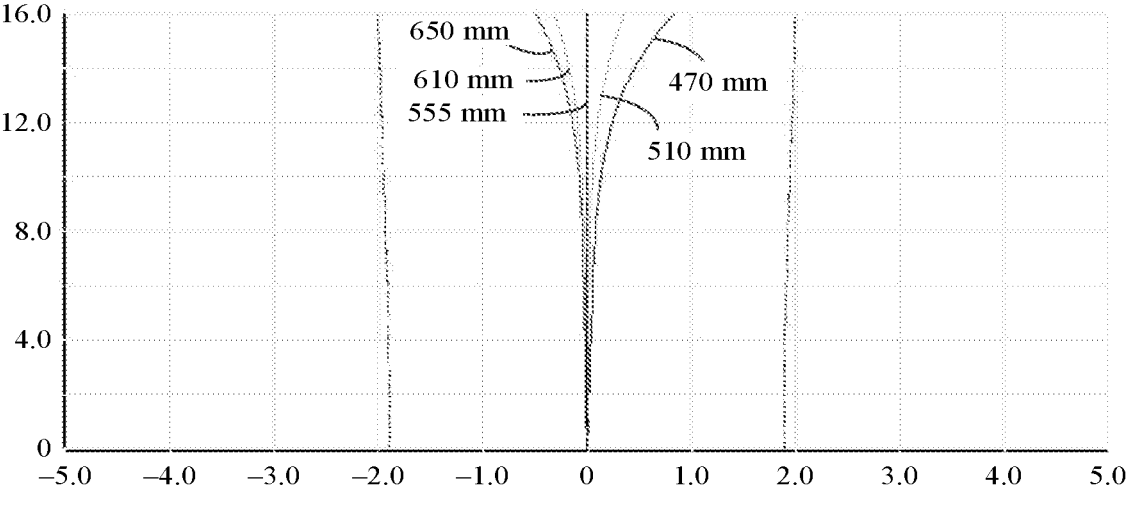
FIG. 30 is a schematic diagram of a lateral chromatic aberration of the optical lens according to the seventh implementation of this disclosure.
Figure 31:
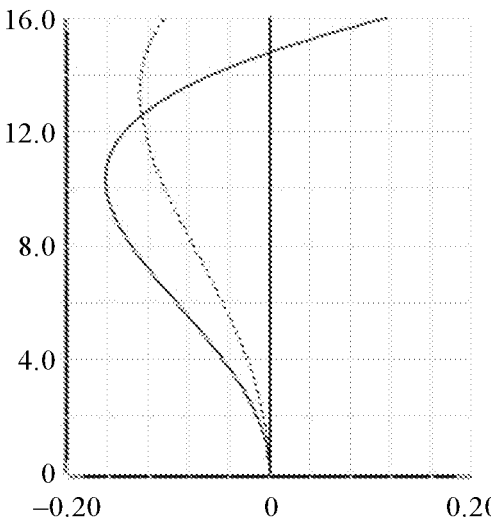
FIG. 31 is a schematic diagram of a field curvature and an optical distortion of the optical lens according to the seventh implementation of this disclosure.
Figure 31:
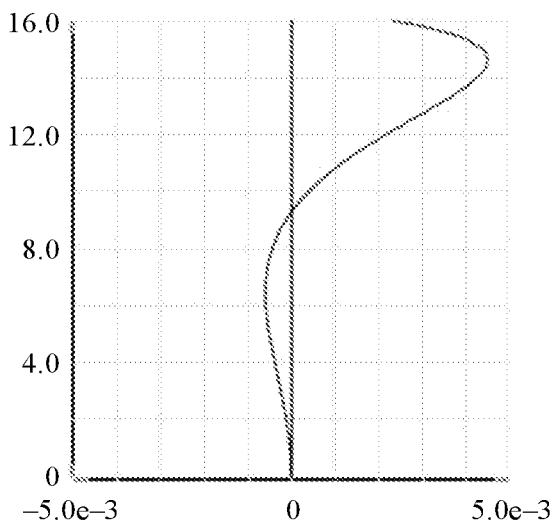

FIG. 29 to FIG. 31 are diagrams for representing optical properties of the optical lens 10 in the seventh implementation.

Further, FIG. 29 shows an axial aberration after light of wavelengths 650 nm, 610 nm, 555 nm, 510 nm, and 470 nm respectively passes through the optical lens 10 in the seventh implementation. In FIG. 29, a vertical coordinate represents a normalized pupil coordinate, and a horizontal coordinate represents an axial aberration, in units of milliseconds. As can be seen from FIG. 29, the axial aberration in this implementation is controlled within a relatively small range.

FIG. 30 shows a lateral chromatic aberration after light of wavelengths 650 nm, 610 nm, 555 nm, 510 nm, and 470 nm respectively passes through the optical lens 10 in the seventh implementation. In FIG. 30, a vertical coordinate represents a field of view, in units of degrees (°), and a horizontal coordinate represents a diffraction limit range, in units of microns (μm). A dashed line in FIG. 30 represents a diffraction limit range of the optical lens 10. As can be learned from the figure, the lateral chromatic aberration after light of each wavelength passes through the optical lens 10 in the seventh implementation is within the diffraction limit, that is, the lateral chromatic aberration after the light of each wavelength passes through the optical lens 10 in the seventh implementation basically does not affect imaging quality of the optical lens 10.

FIG. 31 is a schematic diagram of a field curvature and an optical distortion after light of the wavelength 555 nm passes through the optical lens 10 in the seventh implementation, used to indicate a difference between imaging deformation and an ideal shape after the light passes through the optical lens 10. In a left drawing in FIG. 31, a solid line is a schematic diagram of a field curvature in a meridional direction after the light of the wavelength 555 nm passes through the optical lens 10, and a dashed line is a schematic diagram of a field curvature in a sagittal direction after the light of the wavelength 555 nm passes through the optical lens 10. A right drawing in FIG. 31 is a schematic diagram of an optical distortion after the light of the wavelength 555 nm passes through the optical lens 10 in the seventh implementation. As can be seen from the figure, in this implementation, the optical system controls the distortion within a range recognizable by unaided eyes (2% and below unrecognizable by unaided eyes).

The BFL of the optical lens 10 provided in this implementation is 9.6 mm, and the TTL is 16 mm. In this case, the TTL1 is 6.4 mm. In this case, a thickness of a terminal 1000 may be slightly greater than 6.4 mm, that is, the terminal 1000 has a relatively small thickness while having good imaging quality.

Figure 32:
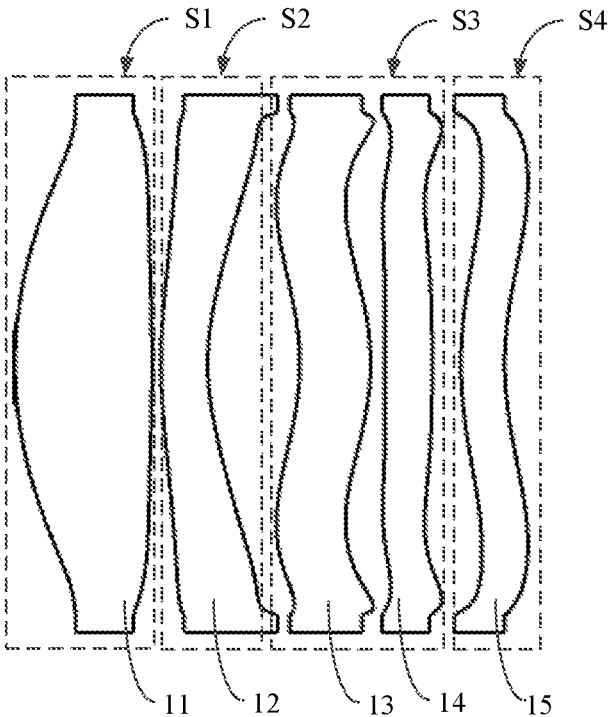
FIG. 32 is a schematic diagram of a partial structure of an optical lens according to an eighth implementation of this disclosure.

FIG. 32 is a schematic diagram of a structure of an optical lens 10 according to an eighth implementation of this disclosure. In this implementation, the optical lens 10 includes four constituent elements, which are respectively a first constituent element S1, a second constituent element S2, a third constituent element S3, and a fourth constituent element S4. The first constituent element S1, the second constituent element S2, the third constituent element S3, and the fourth constituent element S4 are disposed in sequence from an object side to an image side. In this implementation, each of the first constituent element S1, the second constituent element S2, and the fourth constituent element S4 includes one lens element. The third constituent element S3 includes two lens elements. The first constituent element S1 includes a first lens element 11, the second constituent element S2 includes a second lens element 12, the third constituent element S3 includes a third lens element 13 and a fourth lens element 14, and the fourth constituent element S4 includes a fifth lens element 15. The lens elements are coaxially disposed.

In this implementation, the fifth lens element 15 is made of a glass material. The first lens element 11, the second lens element 11, the third lens element 13, and the fourth lens element 14 are all made of plastic materials.

The first lens element 11 has positive refractive power, an object side surface of the first lens element 11 is convex near an axis, and an image side surface of the first lens element 11 is convex near the axis. The second lens element 12 has negative refractive power, an object side surface of the second lens element 12 is convex near the axis, and an image side surface of the second lens element 12 is concave near the axis. The third lens element 13 has positive refractive power, an object side surface of the third lens element 13 is concave near the axis, and an image side surface of the third lens element 13 is convex near the axis. The fourth lens element 14 has positive refractive power. The fifth lens element 15 has negative refractive power, an object side surface of the fifth lens element 15 is convex near the axis, and an image side surface of the fifth lens element 15 is concave near the axis.

Based on the foregoing relations, design parameters of the optical lens 10 in the eighth implementation of this disclosure are shown in the following Table 29. For meanings of the parameters, refer to related descriptions in the fourth implementation.

TABLE 29

Design parameters of the optical lens 10 in the eighth implementation

| BFL | 9.39 | BFL/EFL | 0.60 | TTL1/MIC | 0.75 |
|---|---|---|---|---|---|
| n1 | 1.54 | $R_{S11}/R_{S12}$ | −0.267 | $R_{S21}/R_{S22}$ | 2.13 |
| v1 − v2 | 32.5 | $f_{S1}/f$ | 0.514 | $f_{S2}/f$ | −0.644 |
| v1 − v3 | 0 | $R_{S31}/R_{S32}$ | 1.042 | $R_{S41}/R_{S42}$ | 1.26 |
| v1 − v5 | 26.5 | $f_{S3}/f$ | 2.85 | $f_{S4}/f$ | −2.371 |
| $d_{S1}/(d1 + d2 + d3 + d4 + d5)$ | 0.397 | | $d_{S2}/(d1 + d2 + d3 + d4 + d5)$ | | 0.136 |
| $d_{S3}/(d1 + d2 + d3 + d4 + d5)$ | 0.205 | | $d_{S4}/(d1 + d2 + d3 + d4 + d5)$ | | 0.127 |

Table 30 shows basic parameters of the optical lens 10 in the eighth implementation of this disclosure.

TABLE 30

Basic parameters of the optical lens
10 in the eighth implementation

| | |
|---|---|
| Focal length f | 14.648 mm |
| Aperture F value | 2.8 |
| Half FOV | 15° |
| Total track length TTL | 15.58 mm |
| Design wavelength | 650 nm, 610 nm, 555 nm, 510 nm, and 470 nm |

Table 31 shows a curvature radius, a thickness, a refractive index, and an Abbe number of each constituent lens element of the optical lens 100 in the eighth implementation of this disclosure. For meanings of the symbols in the table, refer to related descriptions in the fourth implementation.

TABLE 31

Curvature radius, thickness, refractive index,
and Abbe number of each lens element of the
optical lens 10 in the eighth implementation

| | R | Thickness | | nd | | Vd | |
|---|---|---|---|---|---|---|---|
| R1 | 4.9 | d1 | 1.7 | n1 | 1.54 | v1 | 56.0 |
| R2 | −28.0 | a1 | 0.1 | | | | |
| R3 | 6.6 | d2 | 0.5 | n2 | 1.64 | v2 | 23.5 |
| R4 | 3.0 | a2 | 1.0 | | | | |
| R5 | −3.3 | d3 | 0.7 | n3 | 1.54 | v3 | 56.0 |
| R6 | −3.0 | a3 | 0.1 | | | | |
| R7 | −80.9 | d4 | 0.5 | n4 | 1.64 | v4 | 23.5 |
| R8 | −43.6 | a4 | 0.4 | | | | |
| R9 | 5.2 | d5 | 0.7 | n5 | 1.52 | v5 | 64.1 |
| R10 | 4.2 | a5 | 0.5 | | | | |

Table 32 shows aspherical coefficients of the optical lens 10 in this implementation. For meanings of the symbols in the table, refer to related descriptions in the fourth implementation.

TABLE 32

Aspherical coefficients of the optical lens 10 in the eighth implementation

| | Type | K | A0 | A1 | A2 | A3 | A4 | A5 |
|---|---|---|---|---|---|---|---|---|
| R1 | Q-type aspherical | 0.00E+00 | −1.12E−01 | −3.39E−02 | −7.18E−03 | −5.65E−04 | −1.48E−04 | 1.31E−04 |
| R2 | Q-type aspherical | 0.00E+00 | 1.11E−01 | −3.09E−02 | 1.48E−03 | −1.63E−03 | 5.40E−04 | −2.40E−05 |
| R3 | Q-type aspherical | 0.00E+00 | −3.69E−01 | 4.93E−02 | −9.34E−03 | 2.75E−04 | 5.18E−04 | −1.07E−05 |
| R4 | Q-type aspherical | 0.00E+00 | −7.58E−01 | 5.07E−02 | −1.99E−02 | 1.56E−03 | −9.20E−04 | −7.61E−05 |
| R5 | Q-type aspherical | 0.00E+00 | 9.90E−01 | −1.36E−02 | −1.63E−03 | 2.40E−03 | −1.82E−03 | 1.62E−05 |
| R6 | Q-type aspherical | 0.00E+00 | 1.18E+00 | 1.67E−02 | −1.19E−03 | 4.00E−03 | −2.85E−03 | 1.12E−04 |
| R7 | Q-type aspherical | 0.00E+00 | −3.60E−02 | 7.58E−02 | −2.70E−02 | −1.67E−03 | −2.82E−04 | 3.24E−04 |
| R8 | Q-type aspherical | 0.00E+00 | 1.43E−01 | 1.23E−01 | −4.25E−02 | −1.38E−02 | −2.10E−03 | −2.01E−03 |
| R9 | Q-type aspherical | 0.00E+00 | −6.32E−01 | −2.38E−02 | 4.24E−03 | −7.33E−03 | 3.87E−04 | −1.37E−03 |
| R10 | Q-type aspherical | 0.00E+00 | −1.39E+00 | −2.37E−02 | −2.38E−02 | −1.14E−02 | −2.69E−03 | −1.43E−03 |

By substituting the foregoing parameters into the formula:

$$x = \frac{cr^2}{1 + \sqrt{1 - Kc^2r^2}} + u^4 \sum_{m=0}^{M} a_m Q_m^{con}(u^2)$$

where the first lens element 11, the second lens element 12, the third lens element 13, the fourth lens element 14, and the fifth lens element 15 of the optical lens 10 in this implementation can be designed.

In this implementation, different lens elements of the optical lens 10 obtained by using the foregoing design parameters can implement different functions respectively, so that the optical lens 10 having good imaging quality is obtained through cooperation of the lens elements. Further, in this implementation, the first lens element 11 has a relatively high refractive index, and can properly implement functions of light concentration and chromatic aberration correction. The second lens element 12 can implement a function of reducing an angle of emergence of light from an aperture stop. The third lens element 13 and the fourth lens element 14 can implement a function of diverging light to a larger image plane. The fifth lens element 15 can implement a function of correcting a field curvature and astigmatism of an optical system. It should be noted that only functions implemented by the lens elements in this implementation are provided herein. In other implementations of this disclosure, lens elements can implement other functions. The functions are not limited herein.

It should be noted that only functions implemented by the lens elements in this implementation are provided herein. In other implementations of this disclosure, lens elements can implement other functions. The functions are not limited herein.

Figure 33:
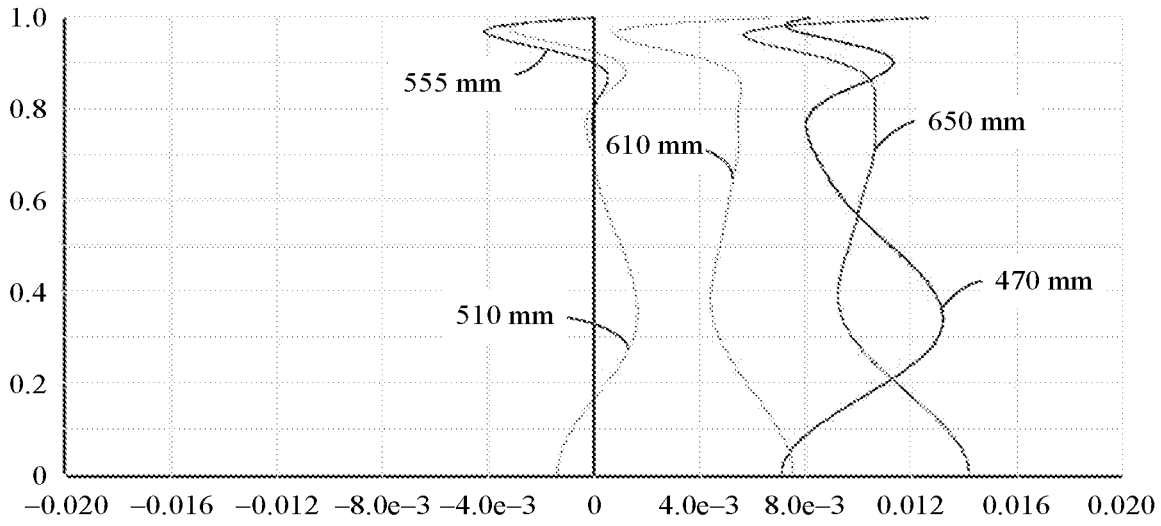
FIG. 33 is a schematic diagram of an axial chromatic aberration of the optical lens according to the eighth implementation of this disclosure.
Figure 34:
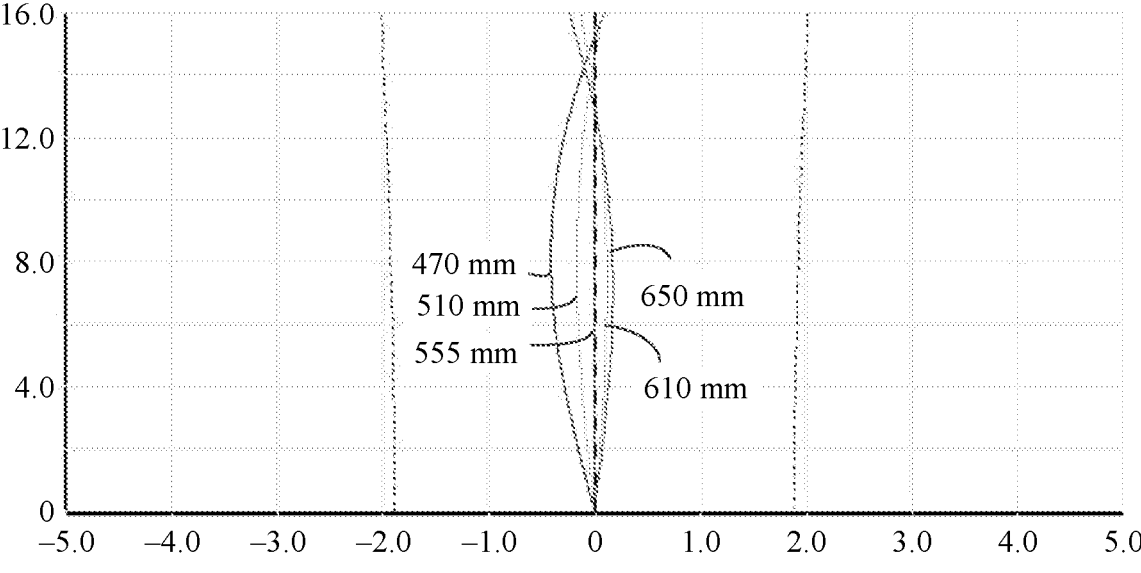
FIG. 34 is a schematic diagram of a lateral chromatic aberration of the optical lens according to the eighth implementation of this disclosure.
Figure 35:
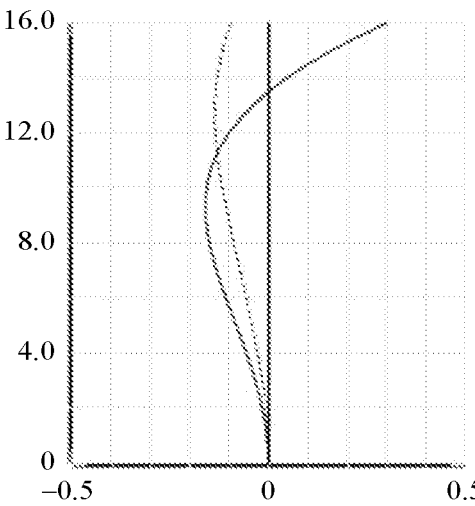
FIG. 35 is a schematic diagram of a field curvature and an optical distortion of the optical lens according to the eighth implementation of this disclosure.
Figure 35:
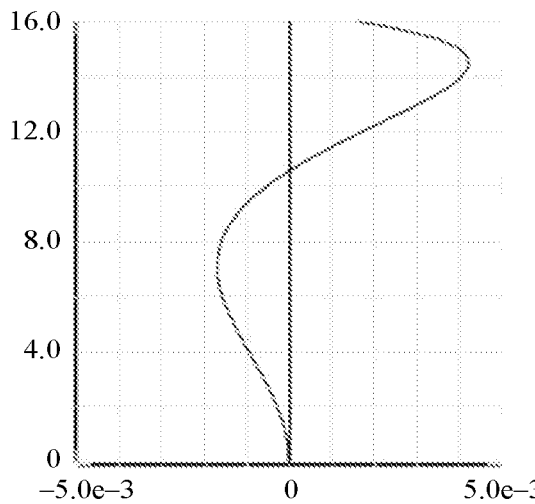

FIG. 33 to FIG. 35 are diagrams for representing optical properties of the optical lens 10 in the eighth implementation.

Further, FIG. 33 shows an axial aberration after light of wavelengths 650 nm, 610 nm, 555 nm, 510 nm, and 470 nm respectively passes through the optical lens 10 in the eighth implementation. In FIG. 33, a vertical coordinate represents a normalized pupil coordinate, and a horizontal coordinate represents an axial aberration, in units of milliseconds. As can be seen from FIG. 33, the axial aberration in this implementation is controlled within a relatively small range.

FIG. 34 shows a lateral chromatic aberration after light of wavelengths 650 nm, 610 nm, 555 nm, 510 nm, and 470 nm respectively passes through the optical lens 10 in the eighth implementation. In FIG. 34, a vertical coordinate represents a field of view, in units of degrees (°), and a horizontal coordinate represents a diffraction limit range, in units of microns (μm). A dashed line in FIG. 34 represents a diffraction limit range of the optical lens 10. As can be learned from the figure, the lateral chromatic aberration after light of each wavelength passes through the optical lens 10 in the eighth implementation is within the diffraction limit, that is, the lateral chromatic aberration after the light of each wavelength passes through the optical lens 10 in the eighth implementation basically does not affect imaging quality of the optical lens 10.

FIG. 35 is a schematic diagram of a field curvature and an optical distortion after light of the wavelength 555 nm passes through the optical lens 10 in the eighth implementation, used to indicate a difference between imaging deformation and an ideal shape after the light passes through the optical lens 10. In a left drawing in FIG. 35, a solid line is a schematic diagram of a field curvature in a meridional direction after the light of the wavelength 555 nm passes through the optical lens 10, and a dashed line is a schematic diagram of a field curvature in a sagittal direction after the light of the wavelength 555 nm passes through the optical lens 10. A right drawing in FIG. 35 is a schematic diagram of an optical distortion after the light of the wavelength 555 nm passes through the optical lens 10 in the eighth implementation. As can be seen from the figure, in this implementation, the optical system controls the distortion within a range recognizable by unaided eyes (2% and below unrecognizable by unaided eyes).

The BFL of the optical lens 10 provided in this implementation is 9.39 mm, and the TTL is 15.65 mm. In this case, the TTL1 is 6.29 mm. In this case, a thickness of a terminal 1000 may be slightly greater than 6.29 mm, that is, the terminal 1000 has a relatively small thickness while having good imaging quality.

Figure 36:
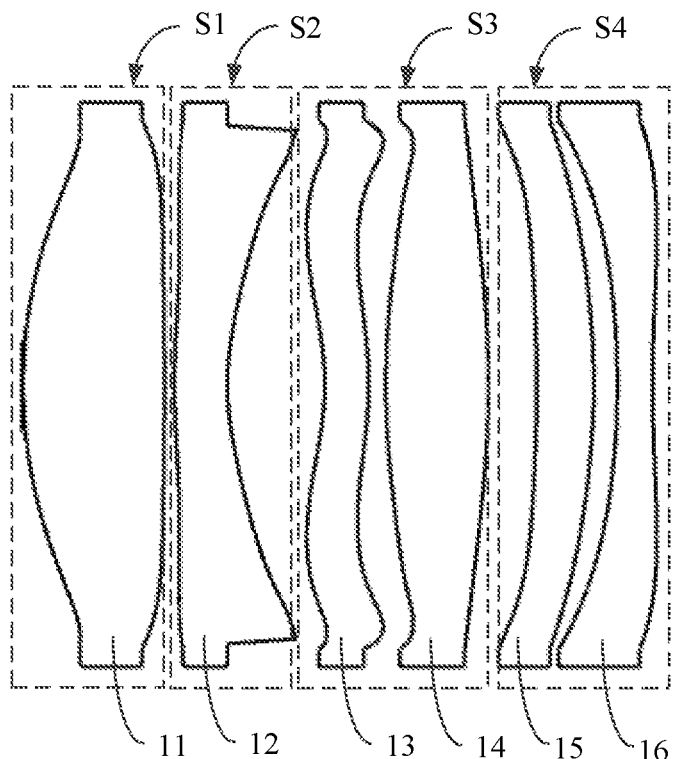
FIG. 36 is a schematic diagram of a partial structure of an optical lens according to a ninth implementation of this disclosure.

FIG. 36 is a schematic diagram of a structure of an optical lens 10 according to a ninth implementation of this disclosure. In this implementation, the optical lens 10 includes four constituent elements, which are respectively a first constituent element S1, a second constituent element S2, a third constituent element S3, and a fourth constituent element S4. The first constituent element S1, the second constituent element S2, the third constituent element S3, and the fourth constituent element S4 are disposed in sequence from an object side to an image side. In this implementation, either of the first constituent element S1 and the second constituent element S2 includes one lens element, and either of the third constituent element S3 and the fourth constituent element S4 includes two lens elements. The first constituent element S1 includes a first lens element 11, the second constituent element S2 includes a second lens element 12, the third constituent element S3 includes a third lens element 13 and a fourth lens element 14, and the fourth constituent element S4 includes a fifth lens element 15 and a sixth lens element 16. The lens elements are coaxially disposed.

In this implementation, the first lens element 11 is made of a glass material. The second lens element 11, the third lens element 13, the fourth lens element 14, the fifth lens element 15, and the sixth lens element 16 are all made of plastic materials.

The first lens element 11 has positive refractive power, an object side surface of the first lens element 11 is convex near an axis, and an image side surface of the first lens element 11 is convex near the axis. The second lens element 12 has negative refractive power, an object side surface of the second lens element 12 is convex near the axis, and an image side surface of the second lens element 12 is concave near the axis. The third lens element 13 has negative refractive power, an object side surface of the third lens element 13 is concave near the axis, and an image side surface of the third lens element 13 is convex near the axis. The fourth lens element 14 has positive refractive power. The fifth lens element 15 has positive refractive power. The sixth lens element 16 has negative refractive power, an object side surface of the sixth lens element 16 is concave near the axis, and an image side surface of the sixth lens element 16 is convex near the axis.

Based on the foregoing relations, design parameters of the optical lens 10 in the ninth implementation of this disclosure are shown in the following Table 33.

TABLE 33

| Design parameters of the optical lens 10 in the ninth implementation | | | | | |
|---|---|---|---|---|---|
| BFL | 7.838 | BFL/EFL | 0.51 | TTL1/MIC | 0.90 |
| n1 | 1.73 | $R_{S11}/R_{S12}$ | −0.233 | $R_{S21}/R_{S22}$ | 2.915 |
| v1 − v2 | 17 | $f_{S1}/f$ | 0.432 | $f_{S2}/f$ | −0.494 |
| v1 − v3 | 17 | $R_{S31}/R_{S32}$ | 0.75 | $R_{S41}/R_{S42}$ | 1.75 |
| v1 − v5 | 17 | $f_{S3}/f$ | −1.661 | $f_{S4}/f$ | 2.175 |
| $d_{S1}/(d1 + d2 + d3 + d4 + d5 + d6)$ | 0.326 | | $d_{S2}/(d1 + d2 + d3 + d4 + d5 + d6)$ | | 0.122 |
| $d_{S3}/(d1 + d2 + d3 + d4 + d5 + d6)$ | 0.102 | | $d_{S4}/(d1 + d2 + d3 + d4 + d5 + d6)$ | | 0.131 |

In this implementation, d6 indicates an axial thickness of the fifth lens element 15. A first lens element of the fourth constituent element S4 is the fifth lens element 15. Therefore, $d_{S4}$ is the axial thickness of the fifth lens element 15, $R_{S41}$ is a curvature radius of the object side surface of the fifth lens element 15, $R_{S42}$ is a curvature radius of the image side surface of the fifth lens element 15, and v5 indicates an Abbe number of the fifth lens element 15, that is, v5 is the Abbe number $v_{S4}$ of the first lens element of the fourth constituent element S4. Because the four constituent elements of the optical lens 10 in this implementation include the first lens element 11, the second lens element 12, the third lens element 13, the fourth lens element 14, the fifth lens element 15, and the sixth lens element 16, a sum of axial thicknesses of all the lens elements in the four constituent elements of the optical lens 10 is $\Sigma d=d1+d2+d3+d4+d5+d6$. For meanings of other parameters in this implementation, refer to related descriptions in the fourth implementation.

Table 34 shows basic parameters of the optical lens 10 in the ninth implementation of this disclosure.

TABLE 34

| Basic parameters of the optical lens 10 in the ninth implementation | |
|---|---|
| Focal length f | 14.65 mm |
| Aperture F value | 2.8 |
| Half FOV | 15° |
| Total track length TTL | 15.39 mm |
| Design wavelength | 650 nm, 610 nm, 555 nm, 510 nm, and 470 nm |

Table 35 shows a curvature radius, a thickness, a refractive index, and an Abbe number of each constituent lens element of the optical lens 100 in the ninth implementation of this disclosure.

TABLE 35

| Curvature radius, thickness, refractive index, and Abbe number of each lens element of the optical lens 10 in the ninth implementation | | | | | | | |
|---|---|---|---|---|---|---|---|
| | R | | Thickness | | nd | | Vd |
| R1 | 5.6 | d1 | 1.6 | n1 | 1.73 | v1 | 40.5 |
| R2 | −24 | a1 | 0.1 | | | | |
| R3 | 8.5 | d2 | 0.6 | n2 | 1.6 | v2 | 23.5 |
| R4 | 3.0 | a2 | 1.1 | | | | |
| R5 | −3.2 | d3 | 0.5 | n3 | 1.66 | v3 | 23.5 |
| R6 | −4.2 | a3 | 0.2 | | | | |
| R7 | 8.5 | d4 | 1.2 | n4 | 1.54 | v4 | 55.9 |
| R8 | −11.1 | a4 | 0.5 | | | | |
| R9 | −15.9 | d5 | 0.6 | n5 | 1.64 | v5 | 23.5 |
| R10 | −9.1 | a5 | 0.3 | | | | |
| R11 | −10.3 | d6 | 0.4 | n6 | 1.54 | v6 | 55.9 |
| R12 | 15.5 | a6 | 0.2 | | | | |

In this implementation, R11 indicates a curvature radius of the object side surface of the sixth lens element 16, R12 indicates a curvature radius of the image side surface of the sixth lens element 16, d6 indicates an axial thickness of the sixth lens element 16, a5 indicates an axial distance from the image side surface of the fifth lens element 15 to the object side surface of the sixth lens element 16, and a6 indicates an axial distance from the image side surface of the sixth lens element 16 to an object side surface of an infrared cut-off filter 30. For meanings of other symbols in the table, refer to related descriptions in the fourth implementation.

Table 36 shows aspherical coefficients of the optical lens 10 in this implementation.

TABLE 36

| | Type | K | A0 | A1 | A2 | A3 | A4 | A5 |
|---|---|---|---|---|---|---|---|---|
| | | | Aspherical coefficients of the optical lens 10 in the ninth implementation | | | | | |
| R1 | Q-type aspherical | 0.00E+00 | −1.09E−01 | −6.67E−02 | −1.45E−02 | −2.03E−03 | −4.25E−04 | 2.29E−04 |
| R2 | Q-type aspherical | 0.00E+00 | 7.81E−02 | −4.28E−02 | 6.260E−03 | −2.11E−03 | 3.87E−04 | −9.54E−06 |
| R3 | Q-type aspherical | 0.00E+00 | −3.63E−01 | 6.05E−02 | −6.83E−03 | 4.08E−04 | −6.74E−05 | 2.38E−05 |
| R4 | Q-type aspherical | 0.00E+00 | −7.43E−01 | 8.55E−02 | −2.630E−02 | 4.19E−03 | −1.68E−03 | −7.35E−06 |
| R5 | Q-type aspherical | 0.00E+00 | 1.10E+00 | −5.68E−02 | 1.05E−02 | 1.79E−03 | −1.87E−03 | 2.27E−04 |
| R6 | Q-type aspherical | 0.00E+00 | 1.11E+00 | −7.01E−02 | 1.03E−02 | −6.02E−03 | −4.40E−03 | 7.18E−04 |
| R7 | Q-type aspherical | 0.00E+00 | −1.69E−01 | 1.39E−02 | −2.35E−02 | −1.53E−02 | −1.99E−03 | 7.86E−05 |
| R8 | Q-type aspherical | 0.00E+00 | 3.05E+00 | −3.64E−01 | 2.94E−02 | −3.17E−02 | 2.69E−02 | −1.52E−03 |
| R9 | Q-type aspherical | 0.00E+00 | −1.42E−01 | −5.92E−02 | 3.25E−02 | 6.94E−03 | 3.50E−04 | −6.39E−04 |
| R10 | Q-type aspherical | 0.00E+00 | 5.99E−02 | 2.42E−02 | 2.15E−02 | −1.20E−02 | 5.66E−03 | −1.63E−04 |

TABLE 36-continued

| | Type | K | A0 | A1 | A2 | A3 | A4 | A5 |
|---|---|---|---|---|---|---|---|---|
| | Aspherical coefficients of the optical lens 10 in the ninth implementation | | | | | | | |
| R11 | Q-type aspherical | 0.00E+00 | −9.84E+02 | 3.57E+02 | −1.09E+02 | 8.35E+01 | −2.58E+01 | 4.36E−02 |
| R12 | Q-type aspherical | 0.00E+00 | 2.30E+42 | 1.28E+43 | −3.79E+42 | 1.38E+42 | −8.36E+41 | 4.58E+41 |

R11 indicates the curvature radius of the object side surface of the sixth lens element 16, and R12 indicates the curvature radius of the image side surface of the sixth lens element 16. Meanings of other symbols in Table 36 are the same as those in Table 16.

By substituting the foregoing parameters into the formula:

$$x = \frac{cr^2}{1 + \sqrt{1 - Kc^2 r^2}} + u^4 \sum_{m=0}^{M} a_m Q_m^{con}(u^2)$$

where the first lens element 11, the second lens element 12, the third lens element 13, the fourth lens element 14, the fifth lens element 15, and the sixth lens element 16 of the optical lens 10 in this implementation can be designed.

In this implementation, different lens elements of the optical lens 10 obtained by using the foregoing design parameters can implement different functions respectively, so that the optical lens 10 having good imaging quality is obtained through cooperation of the lens elements. Further, in this implementation, the first lens element 11 has a relatively high refractive index, and can properly implement functions of light concentration and chromatic aberration correction. The second lens element 12 can implement a function of reducing an angle of emergence of light from an aperture stop. The third lens element 13 and the fourth lens element 14 can implement a function of diverging light to a larger image plane. The fifth lens element 15 and the sixth lens element 16 can implement a function of correcting a field curvature and astigmatism of an optical system. It should be noted that only functions implemented by the lens elements in this implementation are provided herein. In other implementations of this disclosure, lens elements can implement other functions. The functions are not limited herein.

It should be noted that only functions implemented by the lens elements in this implementation are provided herein. In other implementations of this disclosure, lens elements can implement other functions. The functions are not limited herein.

FIG. 37 to FIG. 40 are diagrams for representing optical properties of the optical lens 10 in the ninth implementation.

Figure 37:
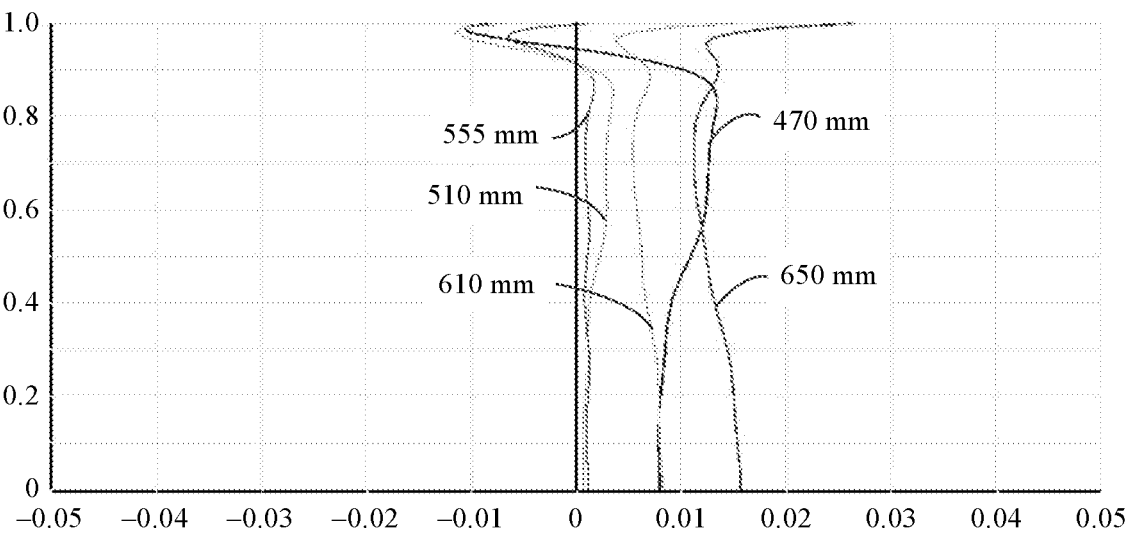
FIG. 37 is a schematic diagram of an axial chromatic aberration of the optical lens according to the ninth implementation of this disclosure.

Further, FIG. 37 shows an axial aberration after light of wavelengths 650 nm, 610 nm, 555 nm, 510 nm, and 470 nm respectively passes through the optical lens 10 in the ninth implementation. In FIG. 37, a vertical coordinate represents a normalized pupil coordinate, and a horizontal coordinate represents an axial aberration, in units of milliseconds. As can be seen from FIG. 37, the axial aberration in this implementation is controlled within a relatively small range.

Figure 38:
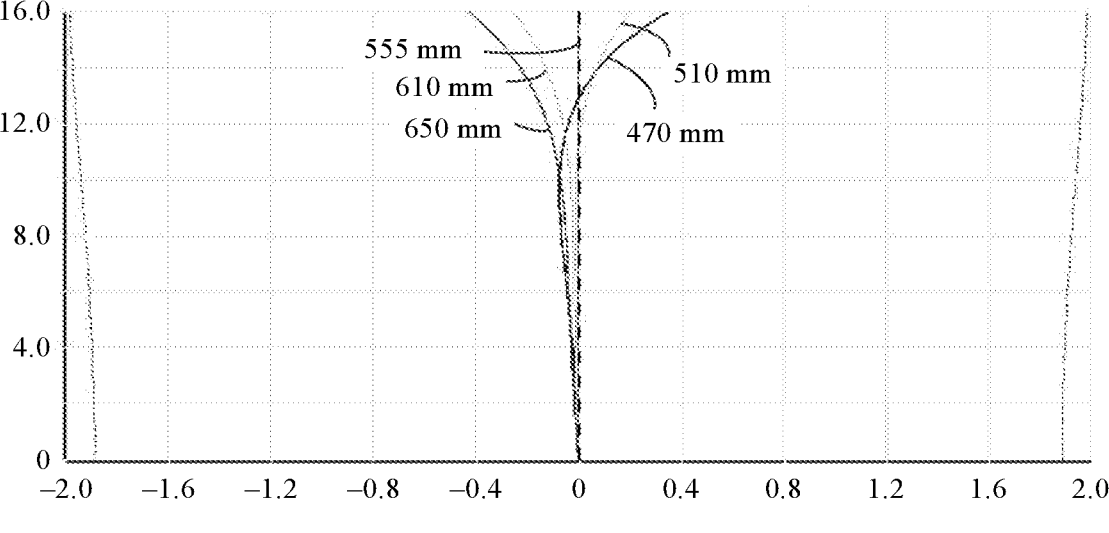
FIG. 38 is a schematic diagram of a lateral chromatic aberration of the optical lens according to the ninth implementation of this disclosure.

FIG. 38 shows a lateral chromatic aberration after light of wavelengths 650 nm, 610 nm, 555 nm, 510 nm, and 470 nm respectively passes through the optical lens 10 in the ninth implementation. In FIG. 38, a vertical coordinate represents a field of view, in units of degrees (°), and a horizontal coordinate represents a diffraction limit range, in units of microns (μm). A dashed line in FIG. 38 represents a diffraction limit range of the optical lens 10. As can be learned from the figure, the lateral chromatic aberration after light of each wavelength passes through the optical lens 10 in the ninth implementation is within the diffraction limit, that is, the lateral chromatic aberration after the light of each wavelength passes through the optical lens 10 in the ninth implementation basically does not affect imaging quality of the optical lens 10.

Figure 39:
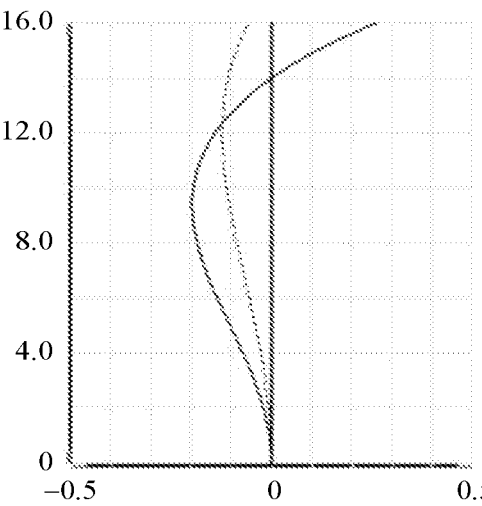
FIG. 39 is a schematic diagram of a field curvature and an optical distortion of the optical lens according to the ninth implementation of this disclosure.
Figure 39:
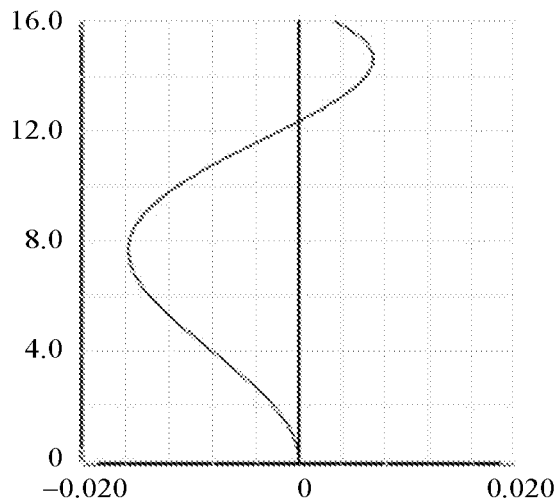

FIG. 39 is a schematic diagram of a field curvature and an optical distortion after light of the wavelength 555 nm passes through the optical lens 10 in the ninth implementation, used to indicate a difference between imaging deformation and an ideal shape after the light passes through the optical lens 10. In a left drawing in FIG. 39, a solid line is a schematic diagram of a field curvature in a meridional direction after the light of the wavelength 555 nm passes through the optical lens 10, and a dashed line is a schematic diagram of a field curvature in a sagittal direction after the light of the wavelength 555 nm passes through the optical lens 10. A right drawing in FIG. 39 is a schematic diagram of an optical distortion after the light of the wavelength 555 nm passes through the optical lens 10 in the ninth implementation. As can be seen from the figure, in this implementation, the optical system controls the distortion within a range recognizable by unaided eyes (2% and below unrecognizable by unaided eyes).

The BFL of the optical lens 10 provided in this implementation is 7.838 mm, and the TTL is 15.389 mm. In this case, the TTL1 is 7.531 mm. In this case, a thickness of a terminal 1000 may be slightly greater than 7.531 mm, that is, the terminal 1000 has a relatively small thickness while having good imaging quality.

Figure 40:
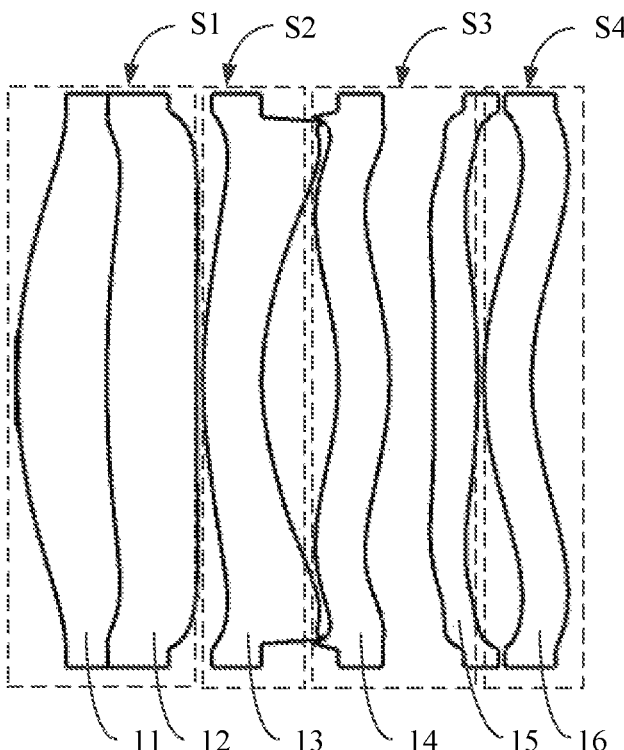
FIG. 40 is a schematic diagram of a partial structure of an optical lens according to a tenth implementation of this disclosure.

FIG. 40 is a schematic diagram of a structure of an optical lens 10 according to a tenth implementation of this disclosure. In this implementation, the optical lens 10 includes four constituent elements, which are respectively a first constituent element S1, a second constituent element S2, a third constituent element S3, and a fourth constituent element S4. The first constituent element S1, the second constituent element S2, the third constituent element S3, and the fourth constituent element S4 are disposed in sequence from an object side to an image side. In this implementation, either of the second constituent element S2 and the fourth constituent element S4 includes one lens element, and either of the first constituent element S1 and the third constituent element S3 includes two lens elements. The first constituent element S1 includes a first lens element 11 and a second lens element 12, the second constituent element S2 includes a third lens element 13, the third constituent element S3 includes a fourth lens element 14 and a fifth lens element 15, and the fourth constituent element S4 includes a sixth lens element 16. The lens elements are coaxially disposed. The first lens element 11 and the second lens element 12 are cemented together to form a cemented lens element (HIG1).

The first lens element 11 and the second lens element 12 may be made of a same material or different materials. Cementing the first lens element 11 and the second lens element 12 together can make ranges of a refractive index and an Abbe number of the cemented lens element larger, so that a thinner lens element with better performance is obtained more easily.

In this implementation, the first lens element 11 and the second lens element 12 are made of a double-cemented glass material. The third lens element 13, the fourth lens element 14, the fifth lens element 15, and the sixth lens element 16 are all made of plastic materials.

The cemented lens element formed by cementing the first lens element 11 and the second lens element 12 together has positive refractive power, an object side surface of the first lens element 11 is convex near an axis, and an image side surface of the first lens element 11 is concave near the axis. The third lens element 13 has negative refractive power, an object side surface of the third lens element 13 is convex near the axis, and an image side surface of the third lens element 13 is concave near the axis. The fourth lens element 14 has positive refractive power, an object side surface of the fourth lens element 14 is concave near the axis, and an image side surface of the fourth lens element 14 is convex near the axis. The fifth lens element 15 has positive refractive power. The sixth lens element 16 has negative refractive power, an object side surface of the sixth lens element 16 is convex near the axis, and an image side surface of the sixth lens element 16 is concave near the axis.

Based on the foregoing relations, design parameters of the optical lens 10 in the tenth implementation of this disclosure are shown in the following Table 37.

TABLE 37

Design parameters of the optical lens 10 in the tenth implementation

| | | | | | |
|---|---|---|---|---|---|
| BFL | 9.4 | BFL/EFL | 0.59 | TTL1/MIC | 0.77 |
| n1 | 1.69 | $R_{S11}/R_{S12}$ | 0.348 | $R_{S21}/R_{S22}$ | 1.77 |
| v1 – v3 | 29.7 | $f_{S1}/f$ | 0.689 | $f_{S2}/f$ | -0.802 |
| v1 – v4 | 29.7 | $R_{S31}/R_{S32}$ | 0.91 | $R_{S41}/R_{S42}$ | 1.21 |
| v1 – v6 | 29.7 | $f_{S3}/f$ | -15.21 | $f_{S4}/f$ | -2.902 |
| $d_{S1}/(d1 + d2 + d3 + d4 + d5 + d6)$ | 0.235 | $d_{S2}/(d1 + d2 + d3 + d4 + d5 + d6)$ | 0.154 | | |
| $d_{S3}/(d1 + d2 + d3 + d4 + d5 + d6)$ | 0.135 | $d_{S4}/(d1 + d2 + d3 + d4 + d5 + d6)$ | 0.126 | | |

In this implementation, the first constituent element S1 includes the first lens element 11 and the second lens element 12, the second constituent element S2 includes the third lens element 13, the third constituent element S3 includes the fourth lens element 14 and the fifth lens element 15, and the fourth constituent element S4 includes the sixth lens element 16. Therefore, the first lens element of the first constituent element S1 is the first lens element 11, the first lens element of the second constituent element S2 is the third lens element 13, the first lens element of the third constituent element S3 is the fourth lens element 14, and the first lens element of the fourth constituent element S4 is the sixth lens element 16. Therefore, $d_{S2}$ indicates an axial thickness d3 of the third lens element 13, $d_{S3}$ indicates an axial thickness d4 of the fourth lens element 14, and $d_{S4}$ indicates an axial thickness d6 of the sixth lens element 16. $R_{S21}$ indicates a curvature radius of the object side surface of the third lens element 13, $R_{S22}$ indicates a curvature radius of the image side surface of the third lens element 13, $R_{S31}$ indicates a curvature radius of the object side surface of the fourth lens element 14, $R_{S32}$ indicates a curvature radius of the image side surface of the fourth lens element 14, $R_{S11}$ indicates a curvature radius of the object side surface of the sixth lens element 16, and $R_{S42}$ indicates a curvature radius of the image side surface of the sixth lens element 16. v3 indicates an Abbe number of the third lens element 13, and v3 is the Abbe number $v_{S2}$ of the first lens element of the second constituent element S2. v4 indicates an Abbe number of the fourth lens element 14, and v4 is the Abbe number $v_{S3}$ of the first lens element of the third constituent element S3. v6 indicates an Abbe number of the sixth lens element 16, and v6 is the Abbe number $v_{S4}$ of the first lens element of the fourth constituent element S4. For meanings of other parameters in this implementation, refer to related descriptions in the ninth implementation.

Table 38 shows basic parameters of the optical lens 10 in the tenth implementation of this disclosure.

TABLE 38

Basic parameters of the optical lens
10 in the tenth implementation

| | |
|---|---|
| Focal length f | 14.542 mm |
| Aperture F value | 2.8 |
| Half FOV | 15° |
| Total track length TTL | 15.91 mm |
| Design wavelength | 650 nm, 610 nm, 555 nm, 510 nm, 470 and nm |

Table 39 shows a curvature radius, a thickness, a refractive index, and an Abbe number of each constituent lens element of the optical lens 100 in the tenth implementation of this disclosure.

TABLE 39

Curvature radius, thickness, refractive index,
and Abbe number of each lens element of the
optical lens 10 in the tenth implementation

| | R | Thickness | | nd | | Vd | |
|---|---|---|---|---|---|---|---|
| R1 | 6.5 | d1 | 1.0 | n1 | 1.69 | v1 | 53.2 |
| R2 (R3) | 18.7 | d2 | 1.0 | n2 | 1.55 | v2 | 71.7 |
| R4 | -355.2 | a2 | 0.1 | | | | |
| R5 | 5.1 | d3 | 0.7 | n3 | 1.64 | v3 | 23.5 |
| R6 | 2.9 | a3 | 0.9 | | | | |
| R7 | -3.0 | d3 | 0.6 | n4 | 1.64 | v4 | 23.5 |
| R8 | -3.3 | a4 | 0.5 | | | | |
| R9 | 36.2 | d4 | 0.5 | n5 | 1.54 | v5 | 55.9 |
| R10 | -10.6 | a5 | 0.1 | | | | |
| R11 | 3.8 | d5 | 0.5 | n6 | 1.64 | v6 | 23.5 |
| R12 | 3.2 | a6 | 0.5 | | | | |

In this implementation, because the image side surface of the first lens element 11 and the object side surface of the second lens element 12 are cemented together to form the cemented lens element, a curvature radius R2 of the image side surface of the first lens element 11 is the same as a curvature radius R3 of the object side surface of the second lens element 12. An axial distance a1 from the image side surface of the first lens element 11 to the object side surface of the second lens element 12 is 0, and therefore is not shown in the table. For meanings of other parameters in this implementation, refer to related descriptions in the ninth implementation.

Table 40 shows aspherical coefficients of the optical lens 10 in this implementation.

TABLE 40

| | Type | K | A0 | A1 | A2 | A3 | A4 | A5 |
|---|---|---|---|---|---|---|---|---|
| R1 | Q-type aspherical | 0.00E+00 | −7.65E−02 | −4.24E−02 | 9.92E−04 | −1.60E−03 | 1.31E−04 | −1.12E−04 |
| R2 (R3) | Q-type aspherical | 0.00E+00 | 7.46E−03 | −4.39E−02 | 3.01E−03 | −3.78E−03 | 1.79E−04 | 2.87E−04 |
| R4 | Q-type aspherical | 0.00E+00 | 1.29E−02 | −3.29E−02 | 4.37E−03 | −1.20E−03 | −4.73E−05 | −1.99E−04 |
| R5 | Q-type aspherical | 0.00E+00 | −3.87E−01 | 4.04E−02 | −1.67E−02 | 7.55E−04 | 3.56E−04 | −6.83E−05 |
| R6 | Q-type aspherical | 0.00E+00 | −7.09E−01 | 2.95E−02 | −3.72E−02 | 2.93E−03 | 1.11E−03 | −6.08E−04 |
| R7 | Q-type aspherical | 0.00E+00 | 1.10E+00 | −2.48E−02 | 6.14E−03 | −2.61E−03 | 3.56E−04 | −1.02E−05 |
| R8 | Q-type aspherical | 0.00E+00 | 1.06E+00 | 6.70E−03 | 3.03E−03 | −7.53E−03 | −1.66E−03 | 8.02E−04 |
| R9 | Q-type aspherical | 0.00E+00 | −4.38E−02 | 1.14E−01 | −4.68E−02 | −3.52E−03 | 1.02E−04 | 1.29E−03 |
| R10 | Q-type aspherical | 0.00E+00 | 2.96E−01 | 6.41E−02 | −3.61E−02 | −1.55E−03 | 2.31E−03 | 1.08E−03 |
| R11 | Q-type aspherical | 0.00E+00 | −7.34E−01 | −4.60E−02 | 4.19E−03 | −2.77E−03 | 1.54E−03 | −1.08E−03 |
| R12 | Q-type aspherical | 0.00E+00 | −1.33E+00 | −1.66E−02 | −1.78E−02 | −2.05E−03 | 6.61E−04 | −8.65E−04 |

By substituting the foregoing parameters into the formula:

$$x = \frac{cr^2}{1 + \sqrt{1 - Kc^2 r^2}} + u^4 \sum_{m=0}^{M} a_m Q_m^{con}(u^2)$$

where the first lens element 11, the second lens element 12, the third lens element 13, the fourth lens element 14, the fifth lens element 15, and the sixth lens element 16 of the optical lens 10 in this implementation can be designed.

In this implementation, different lens elements of the optical lens 10 obtained by using the foregoing design parameters can implement different functions respectively, so that the optical lens 10 having good imaging quality is obtained through cooperation of the lens elements. Further, in this implementation, the first lens element 11 and the second lens element 12 can properly implement functions of light concentration and chromatic aberration correction. In addition, cementing the first lens element 11 and the second lens element 12 into a double-cemented lens element can make the ranges of the refractive index and the Abbe number of the cemented lens element larger, so that a thinner lens element with better performance is obtained more easily. The third lens element 13 can implement a function of reducing an angle of emergence of light from an aperture stop. The fourth lens element 14 and the fifth lens element 15 can implement a function of diverging light to a larger image plane. The sixth lens element 16 can implement a function of correcting a field curvature and astigmatism of an optical system. It should be noted that only functions implemented by the lens elements in this implementation are provided herein. In other implementations of this disclosure, lens elements can implement other functions. The functions are not limited herein.

It should be noted that only functions implemented by the lens elements in this implementation are provided herein. In other implementations of this disclosure, lens elements can implement other functions. The functions are not limited herein.

Figure 41:
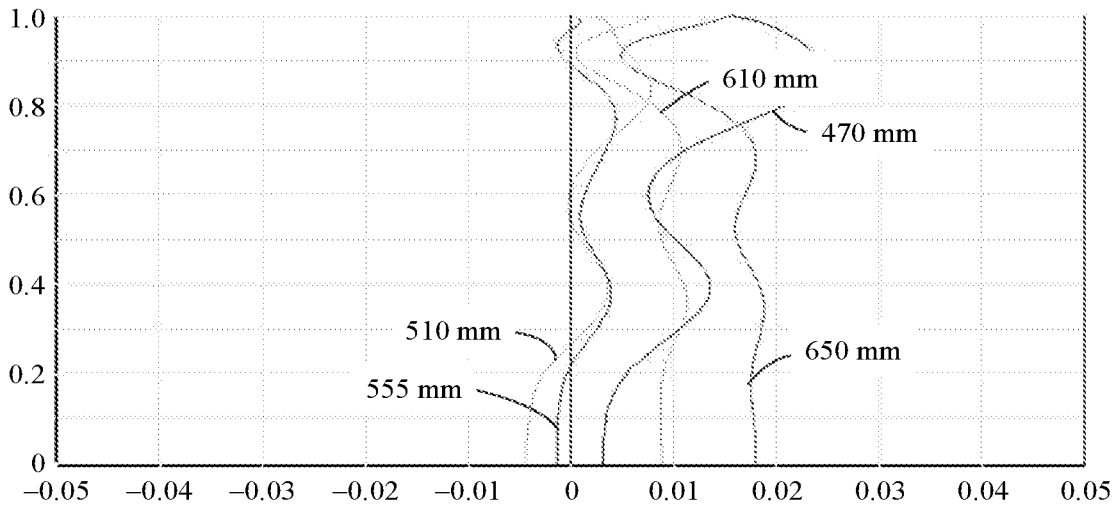
FIG. 41 is a schematic diagram of an axial chromatic aberration of the optical lens according to the tenth implementation of this disclosure.
Figure 42:
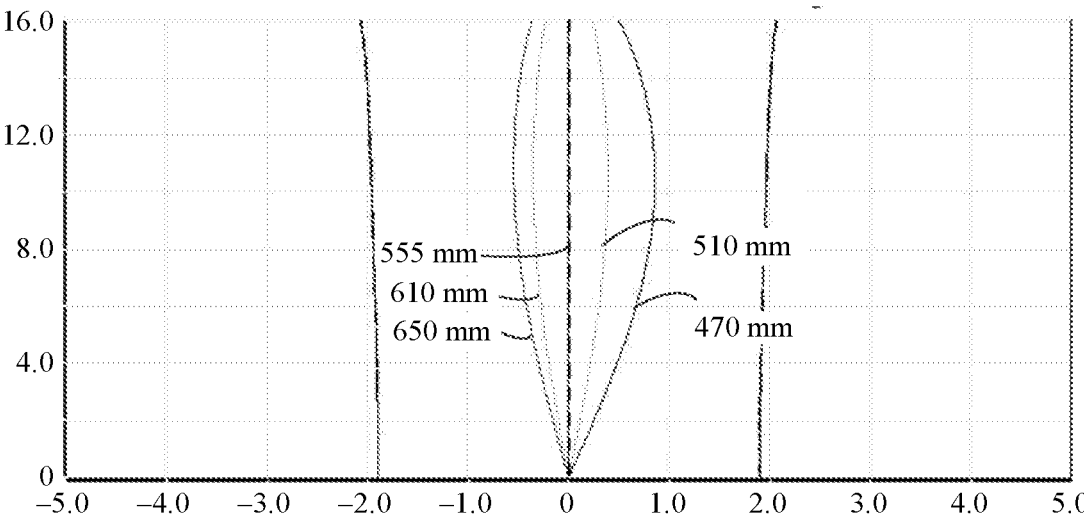
FIG. 42 is a schematic diagram of a lateral chromatic aberration of the optical lens according to the tenth implementation of this disclosure.
Figure 43:
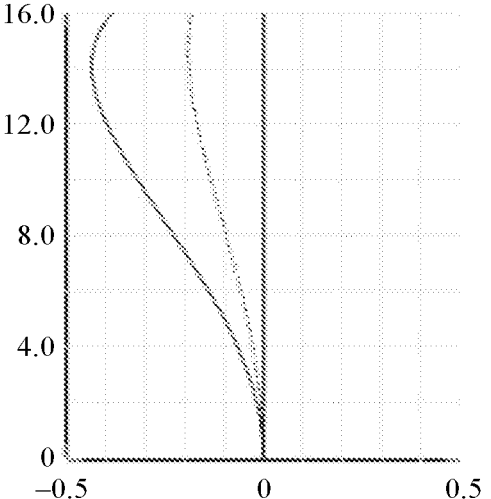
FIG. 43 is a schematic diagram of a field curvature and an optical distortion of the optical lens according to the tenth implementation of this disclosure.
Figure 43:
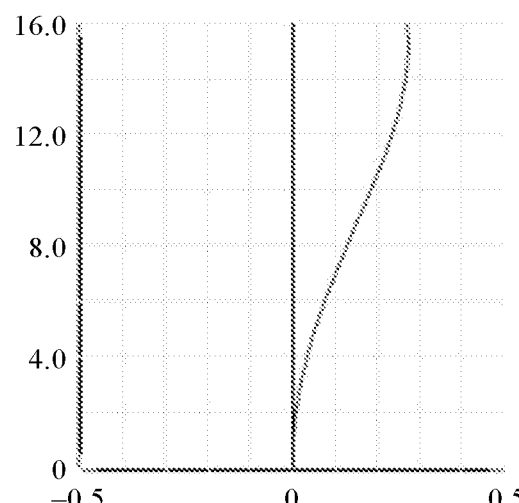

FIG. 41 to FIG. 43 are diagrams for representing optical properties of the optical lens 10 in the tenth implementation.

Further, FIG. 41 shows an axial aberration after light of wavelengths 650 nm, 610 nm, 555 nm, 510 nm, and 470 nm respectively passes through the optical lens 10 in the tenth implementation. In FIG. 41, a vertical coordinate represents a normalized pupil coordinate, and a horizontal coordinate represents an axial aberration, in units of milliseconds. As can be seen from FIG. 41, the axial aberration in this implementation is controlled within a relatively small range.

FIG. 42 shows a lateral chromatic aberration after light of wavelengths 650 nm, 610 nm, 555 nm, 510 nm, and 470 nm respectively passes through the optical lens 10 in the tenth implementation. In FIG. 42, a vertical coordinate represents a field of view, in units of degrees (°), and a horizontal coordinate represents a diffraction limit range, in units of microns (μm). A dashed line in FIG. 42 represents a diffraction limit range of the optical lens 10. As can be learned from the figure, the lateral chromatic aberration after light of each wavelength passes through the optical lens 10 in the tenth implementation is within the diffraction limit, that is, the lateral chromatic aberration after the light of each wavelength passes through the optical lens 10 in the tenth implementation basically does not affect imaging quality of the optical lens 10.

FIG. 43 is a schematic diagram of a field curvature and an optical distortion after light of the wavelength 555 nm passes through the optical lens 10 in the tenth implementation, used to indicate a difference between imaging deformation and an ideal shape after the light passes through the optical lens 10. In a left drawing in FIG. 43, a solid line is a schematic diagram of a field curvature in a meridional direction after the light of the wavelength 555 nm passes through the optical lens 10, and a dashed line is a schematic diagram of a field curvature in a sagittal direction after the light of the wavelength 555 nm passes through the optical lens 10. A right drawing in FIG. 43 is a schematic diagram of an optical distortion after the light of the wavelength 555 nm passes through the optical lens 10 in the tenth implementation. As can be seen from the figure, in this implementation, the optical system controls the distortion within a range recognizable by unaided eyes (2% and below unrecognizable by unaided eyes).

The BFL of the optical lens 10 provided in this implementation is 9.4 mm, and the TTL is 15.932 mm. In this case, the TTL1 is 6.53 mm. In this case, a thickness of a terminal 1000 may be slightly greater than 6.53 mm, that is, the terminal 1000 has a relatively small thickness while having good imaging quality.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An optical lens comprising:
an object side;
an image side; and
a plurality of constituent elements comprising:
a first constituent element having a positive refractive power and comprising a first lens element;
a second constituent element having a negative refractive power;
a third constituent element; and
a fourth constituent element,
wherein the first constituent element, the second constituent element, the third constituent element, and the fourth constituent element are arranged from the object side to the image side,
wherein each of the constituent elements comprises at least one lens element,
wherein each of the at least one lens element comprises:
an object side surface facing the object side; and
an image side surface facing the image side,
wherein the optical lens satisfies the following relations:

$$0.432 \leq f_{S1}/f \leq 0.689,$$

wherein $f_{S1}$ is a first focal length of the first lens element, and wherein f is a total focal length of the optical lens;

$$9.08 \leq BFL \leq 11.745; \text{ and}$$

$$0.6 \leq BFL/TTL \leq 0.67,$$

wherein BFL is a back focal length of the optical lens, and wherein the TTL is a total track length of the optical lens.

2. The optical lens of claim 1, wherein the first lens element has a positive refractive power, and wherein the first lens element comprises:
a first object side surface that is convex near an axis; and
a first image side surface that is convex or concave near the axis.

3. The optical lens of claim 2, wherein the optical lens further satisfies the following relations:

$$-0.345 \leq R_{S11}/R_{S12} < 0 \text{ or } 0 < R_{S11}/R_{S12} \leq 0.348; \text{ and}$$

$$0.2 \leq d_{S1}/\Sigma d \leq 0.4,$$

wherein $R_{S11}$ is a first curvature radius of the first object side surface,
wherein $R_{S12}$ is a second curvature radius of the first image side surface,
wherein $d_{S1}$ is a first axial thickness of the first lens element, and
wherein $\Sigma d$ is a sum of axial thicknesses of all lens elements in the constituent elements.

4. The optical lens of claim 1, wherein the second constituent element comprises a second lens element having a negative refractive power, wherein the second lens element comprises:
a second object side surface that is convex near an axis; and
a second image side surface that is concave near the axis, wherein the optical lens further satisfies the following relation:

$$-7.559 \leq f_{S2}/f \leq -0.494,$$

wherein $f_{S2}$ is a second focal length of the second lens element.

5. The optical lens of claim 4, wherein the optical lens further satisfies the following relations:

$$1 < R_{S21}/R_{S22} \leq 3; \text{ and}$$

$$0.1 \leq d_{S2}/\Sigma d \leq 0.2,$$

wherein $R_{S21}$ is a third curvature radius of the second object side surface,
wherein $R_{S22}$ is a fourth curvature radius of the second image side surface,
wherein $d_{S2}$ is a second axial thickness of the second lens element, and
wherein $\Sigma d$ is a sum of axial thicknesses of all lens elements in the constituent elements.

6. The optical lens of claim 1, wherein the third constituent element comprises a third lens element having a positive refractive power or negative refractive power, wherein the third lens element comprises:
a third object side surface that is convex or concave near the axis; and
a third image side surface that is convex near the axis, wherein the optical lens further satisfies the following relation:

$$-15.2 \leq f_{S3}/f \leq 7.3,$$

wherein $f_{S3}$ is a third focal length of the third lens element.

7. The optical lens of claim 6, wherein the optical lens further satisfies the following relations:

$$0.66 \leq R_{S31}/R_{S32} < 1.0; \text{ and}$$

$$0.1 \leq d_{S3}/\Sigma d \leq 0.3,$$

wherein $R_{S31}$ is a fifth curvature radius of the third object side surface,
wherein $R_{S32}$ is a sixth curvature radius of the third image side surface,
wherein $d_{S3}$ is a third axial thickness of the third lens element, and
wherein $\Sigma d$ is a sum of axial thicknesses of all lens elements in the constituent elements.

8. The optical lens of claim 1, wherein the fourth constituent element comprises a fourth lens element having a positive refractive power or a negative refractive power, wherein the fourth lens element comprises:
a fourth object side surface that is convex or concave near an axis; and
a fourth image side surface that is convex or concave near the axis, wherein the optical lens further satisfies the following relation:

$$-28 \leq f_{S4}/f \leq 8,$$

wherein $f_{S4}$ is a fourth focal length of the fourth lens element.

9. The optical lens of claim 8, wherein the fourth lens element satisfies the following relations:

$$0.9 \leq R_{S41}/R_{S42} \leq 1.8; \text{ and}$$

$$0.1 \leq d_{S4}/\Sigma d \leq 0.2,$$

wherein $R_{S41}$ is a seventh curvature radius of the fourth object side surface, wherein $R_{S42}$ is an eighth curvature radius of the fourth image side surface, wherein $d_{S4}$ is a third axial thickness of the fourth lens element, and wherein $\Sigma d$ is a sum of axial thicknesses of all lens elements in the constituent elements.

10. The optical lens of claim 1, wherein the first constituent element comprises a first lens element, wherein the second constituent element comprises a second lens element, wherein the third constituent element comprises a third lens element, wherein the fourth constituent element comprises a fourth lens element, wherein the optical lens further satisfies the following relations:

$$20.9 \leq v_{S1} - v_{S2} \leq 36.8;$$

$$-2.7 \leq v_{S1} - v_{S3} \leq 33.7; \text{ and}$$

$$-2.7 \leq v_{S1} - v_{S4} \leq 27.2,$$

wherein $v_{S1}$ is a first Abbe number of the first lens element, wherein $v_{S2}$ is a second Abbe number of the second lens element, wherein $v_{S3}$ is a third Abbe number of the third lens element, and wherein $v_{S4}$ is a fourth Abbe number of the fourth lens element.

11. A lens system comprising:

an optical lens comprising:
    an object side;
    an image side; and
    a plurality of constituent elements comprising:
        a first constituent element having a positive refractive power and comprising a first lens element;
        a second constituent element having a negative refractive power;
        a third constituent element; and
        a fourth constituent element,
        wherein the first constituent element, the second constituent element, the third constituent element, and the fourth constituent element are arranged from the object side to the image side,
        wherein each of the constituent elements comprises at least one lens element,
        wherein each of the at least one lens element comprises:
            an object side surface facing the object side; and
            an image side surface facing the image side,
        wherein the optical lens satisfies the following relations:

$$0.432 \leq f_{S1}/f \leq 0.689,$$

wherein $f_{S1}$ is a first focal length of the first lens element, and wherein f is a total focal length of the optical lens;

$$9.08 \leq BFL \leq 11.745; \text{ and}$$

$$0.6 \leq BFL/TTL \leq 0.67,$$

wherein BFL is a back focal length of the optical lens, and wherein the TTL is a total track length of the optical lens;

a photosensitive element located on the image side; and a driving part coupled to the optical lens and configured to drive the optical lens to move towards or away from the photosensitive element.

12. The lens system of claim 11, wherein the first lens element has a positive refractive power, and wherein the first lens element comprises:

a first object side surface that is convex near an axis; and a first image side surface that is convex or concave near the axis.

13. The lens system of claim 12, wherein the optical lens further satisfies the following relation:

$$-0.345 \leq R_{S11}/R_{S12} < 0 \text{ or } 0 < R_{S11}/R_{S12} \leq 0.348; \text{ and}$$

$$0.2 \leq d_{S1}/\Sigma d \leq 0.4,$$

wherein $R_{S11}$ is a first curvature radius of the first object side surface, wherein $R_{S12}$ is a second curvature radius of the first image side surface, wherein $d_{S1}$ is a first axial thickness of the first lens element, and wherein $\Sigma d$ is a sum of axial thicknesses of all lens elements in the constituent elements.

14. The lens system of claim 11, wherein the second constituent element comprises a second lens element having a negative refractive power, wherein the second lens element comprises:

a second object side surface that is convex near an axis; and a second image side surface that is concave near the axis, wherein the optical lens further satisfies the following relation:

$$-7.559 \leq f_{S2}/f \leq -0.494,$$

wherein $f_{S2}$ is a second focal length of the second lens element.

15. The lens system of claim 14, wherein the optical lens further satisfies the following relation:

$$1 < R_{S21}/R_{S22} \leq 3; \text{ and}$$

$$0.1 \leq d_{S2}/d \leq 0.2,$$

wherein $R_{S21}$ is a third curvature radius of the second object side surface, wherein $R_{S22}$ is a fourth curvature radius of the second image side surface, wherein $d_{S2}$ is a second axial thickness of the second lens element, and wherein $\Sigma d$ is a sum of axial thicknesses of all lens elements in the constituent elements.

16. A terminal comprising:

a lens system comprising:
    an optical lens comprising:
        an object side;
        an image side; and
        a plurality of constituent elements comprising:
            a first constituent element having a positive refractive power and comprising a first lens element;
            a second constituent element having a negative refractive power;
            a third constituent element; and
            a fourth constituent element,
            wherein the first constituent element, the second constituent element, the third constituent element, and the fourth constituent element are arranged from the object side to the image side,
            wherein each of the constituent elements comprises at least one lens element, wherein each of the at least one lens element comprises:

an object side surface facing the object side; and an image side surface facing the image side, wherein the optical lens satisfies the following relations:

$$0.432 \leq f_{S1}/f \leq 0.689,$$

wherein $f_{S1}$ is a first focal length of the first lens element, and wherein f is a total focal length of the optical lens;

$$9.08 \leq BFL \leq 11.745; \text{ and}$$

$$0.6 \leq BFL/TTL \leq 0.67,$$

wherein BFL is a back focal length of the optical lens, and wherein the TTL is a total track length of the optical lens;

a photosensitive element located on the image side; and a driving part coupled to the optical lens and configured to drive the optical lens to move towards or away from the photosensitive element; and an image processor communicatively coupled to the lens system and configured to:

receive image data from the lens system; and process the image data.

17. The terminal of claim 16, wherein the first lens element has a positive refractive power, and wherein the first lens element comprises:

a first object side surface that is convex near an axis; and a first image side surface that is convex or concave near the axis.

18. The terminal of claim 17, wherein the optical lens further satisfies the following relation:

$$-0.345 \leq R_{S11}/R_{S12} < 0 \text{ or } 0 < R_{S11}/R_{S12} \leq 0.348; \text{ and}$$

$$0.2 \leq d_{S1}/\Sigma d \leq 0.4,$$

wherein $R_{S11}$ is a first curvature radius of the first object side surface, wherein $R_{S12}$ is a second curvature radius of the first image side surface, wherein $d_{S1}$ is a first axial thickness of the first lens element, and wherein $\Sigma d$ is a sum of axial thicknesses of all lens elements in the constituent elements.

19. The terminal of claim 16, wherein the second constituent element comprises a second lens element having a negative refractive power, wherein the second lens element comprises:

a second object side surface that is convex near an axis; and a second image side surface that is concave near the axis, wherein the optical lens further satisfies the following relation:

$$-7.559 \leq f_{S2}/f \leq -0.494,$$

wherein $f_{S2}$ is a second focal length of the second lens element.

20. The terminal of claim 19, wherein the optical lens further satisfies the following relation:

$$1 < R_{S21}/R_{S22} \leq 3; \text{ and}$$

$$0.1 \leq d_{S2}/\Sigma d \leq 0.2,$$

wherein $R_{S21}$ is a third curvature radius of the second object side surface, wherein $R_{S22}$ is a fourth curvature radius of the second image side surface, wherein $d_{S2}$ is a second axial thickness of the second lens element, and wherein $\Sigma d$ is a sum of axial thicknesses of all lens elements in the constituent elements.

\* \* \* \* \*